July 21, 1964 W. A. CHIASSON 3,141,950
WELDING MACHINE CONTROL EQUIPMENT
Filed Jan. 28, 1958 23 Sheets-Sheet 7
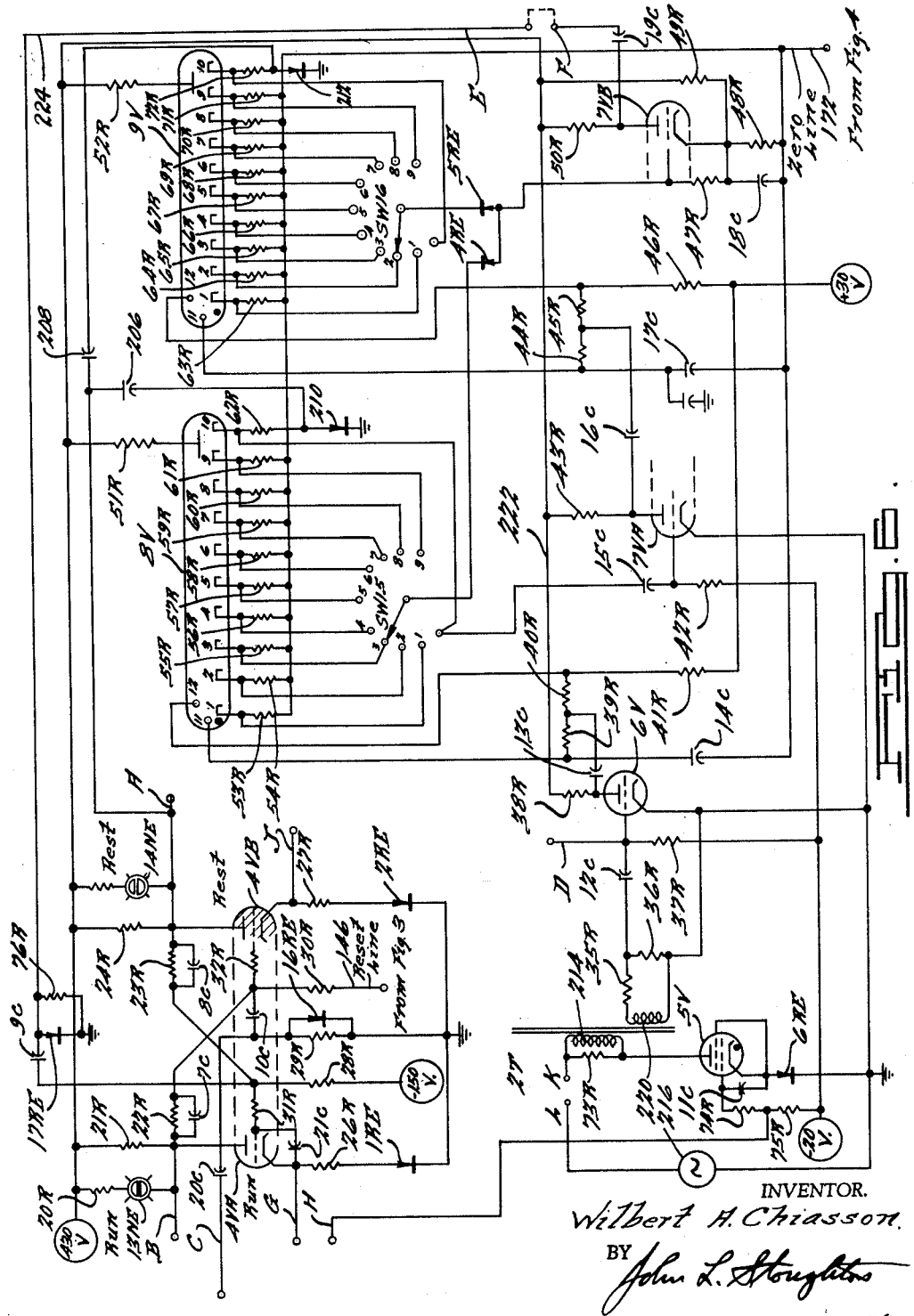
INVENTOR.
Wilbert A. Chiasson
BY John L. Stoughton
HIS ATTORNEY

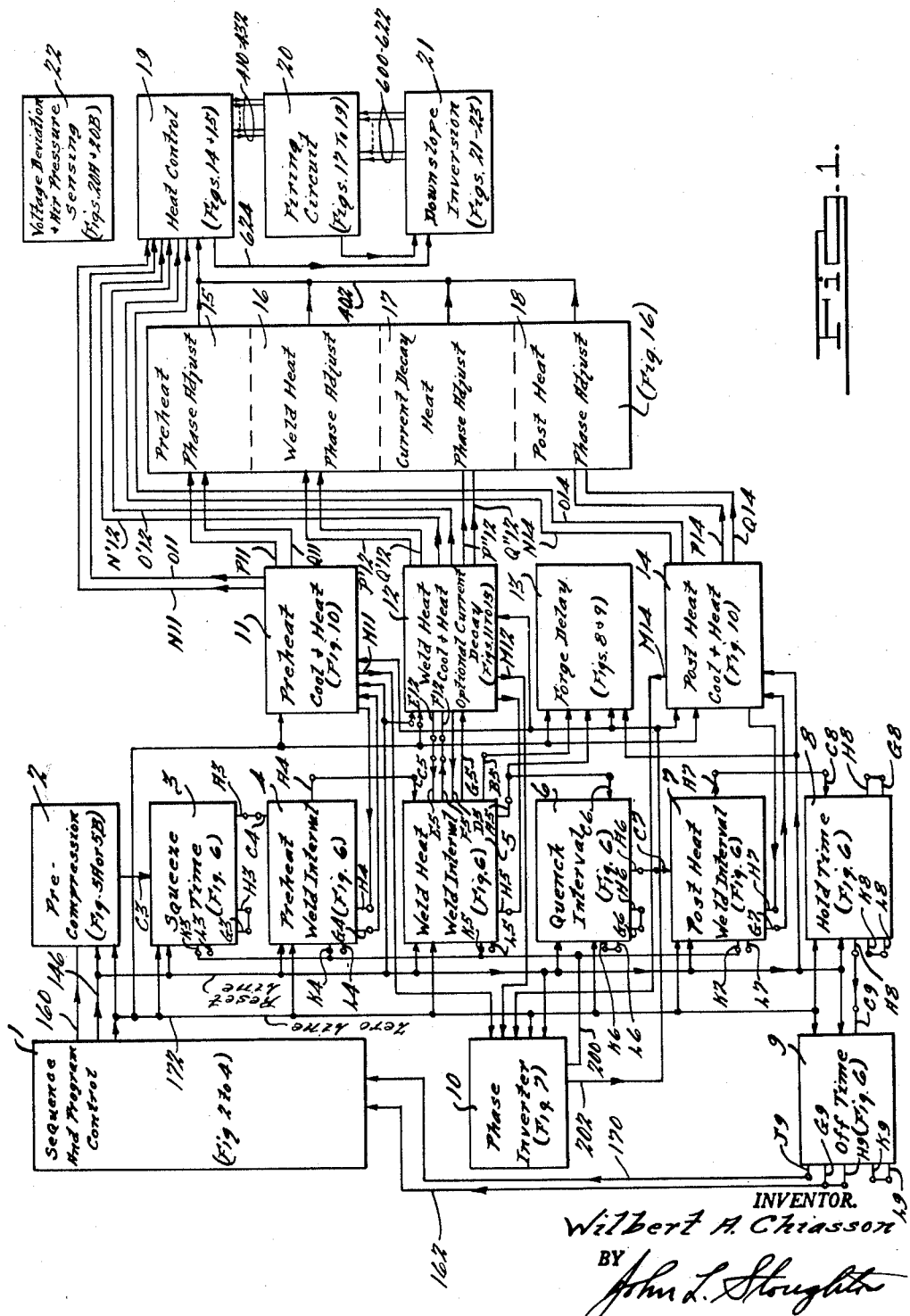

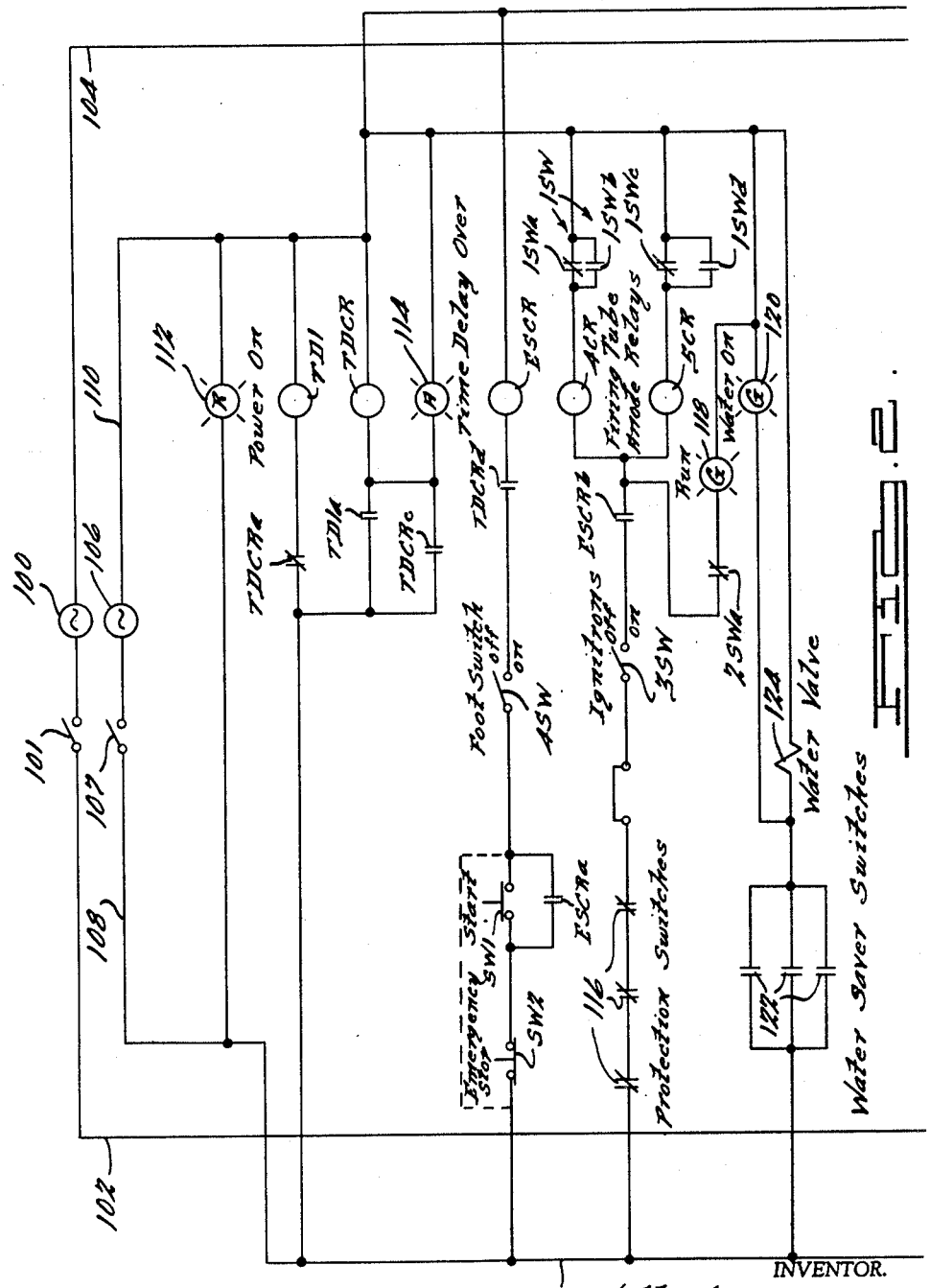

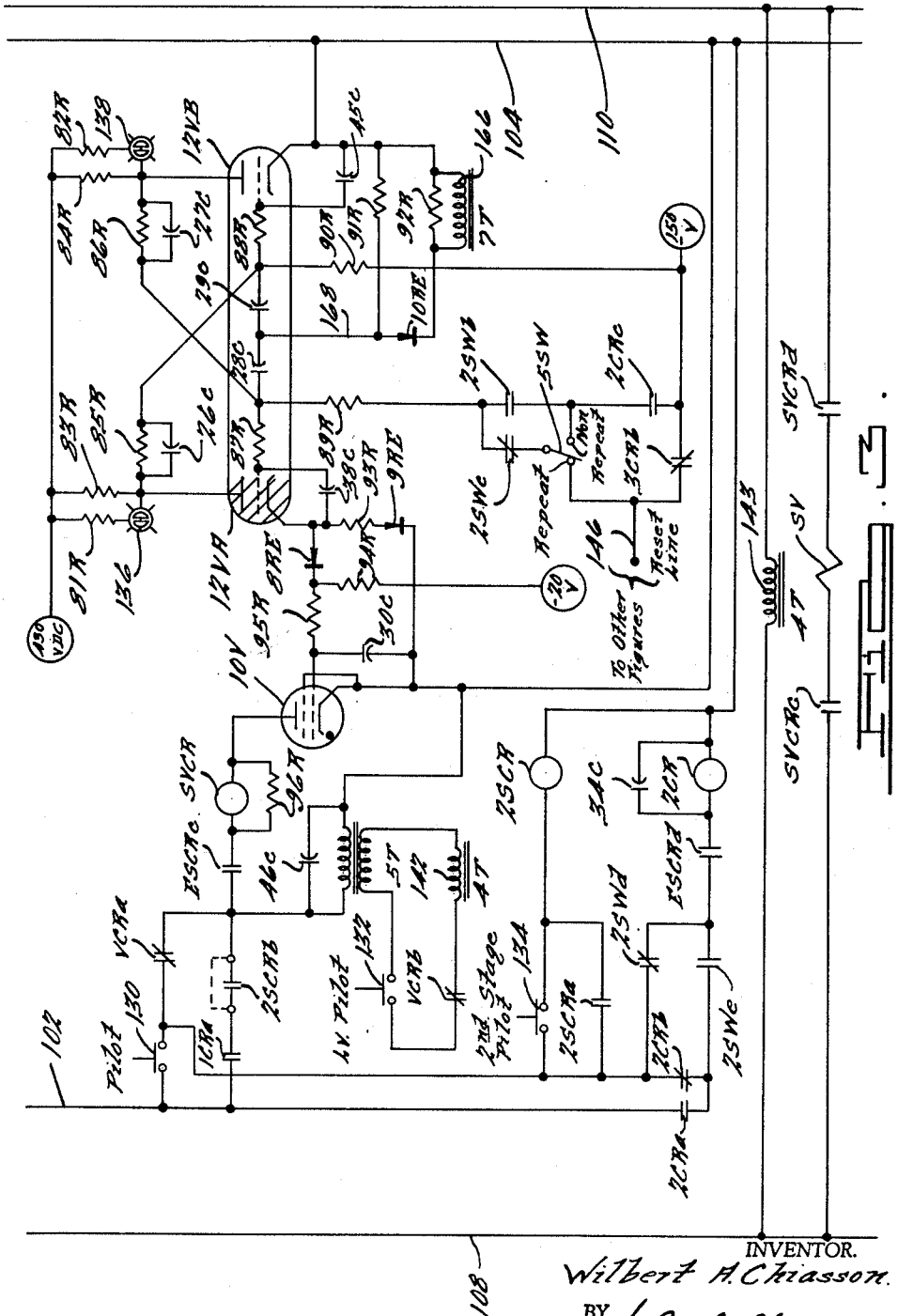

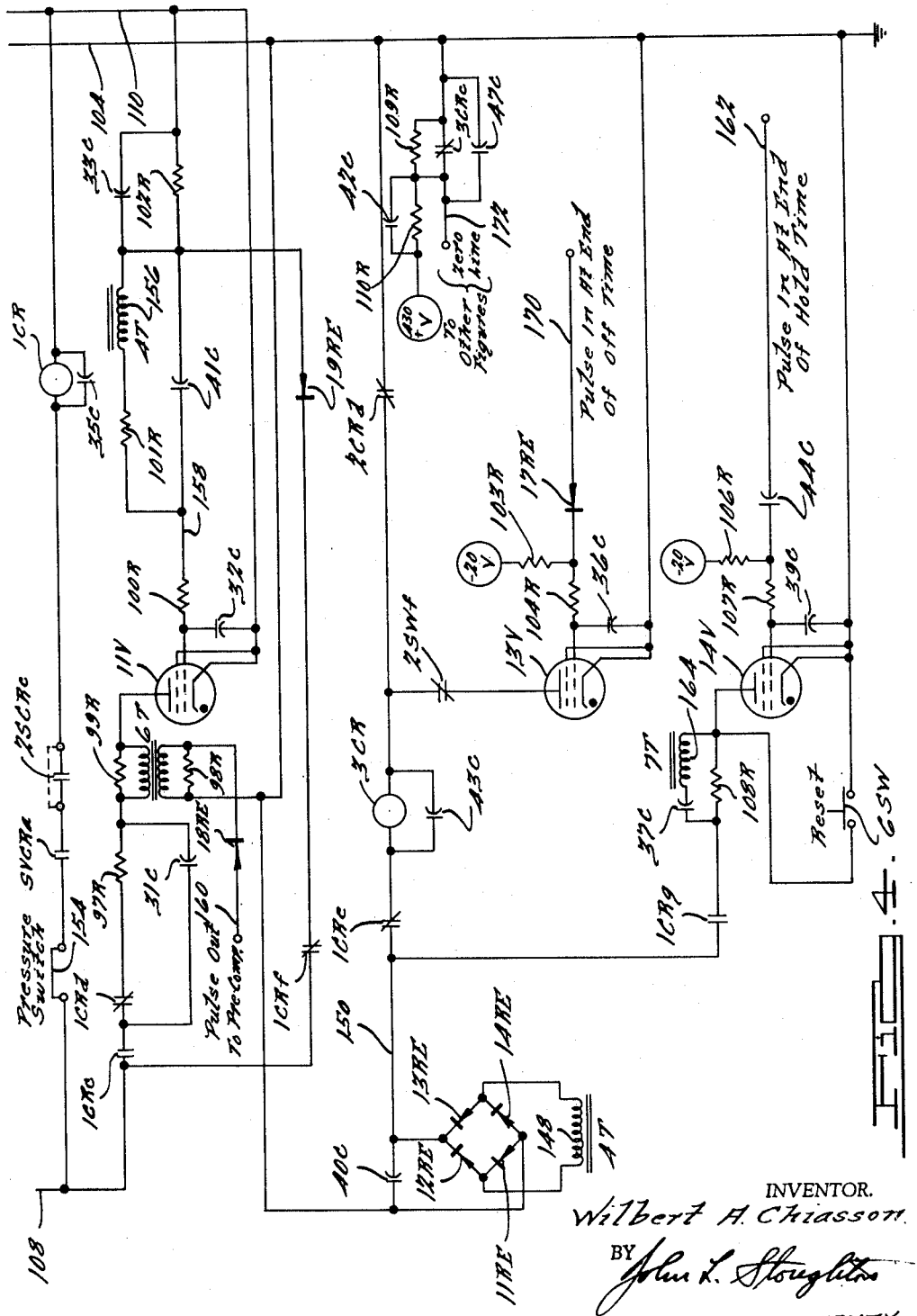

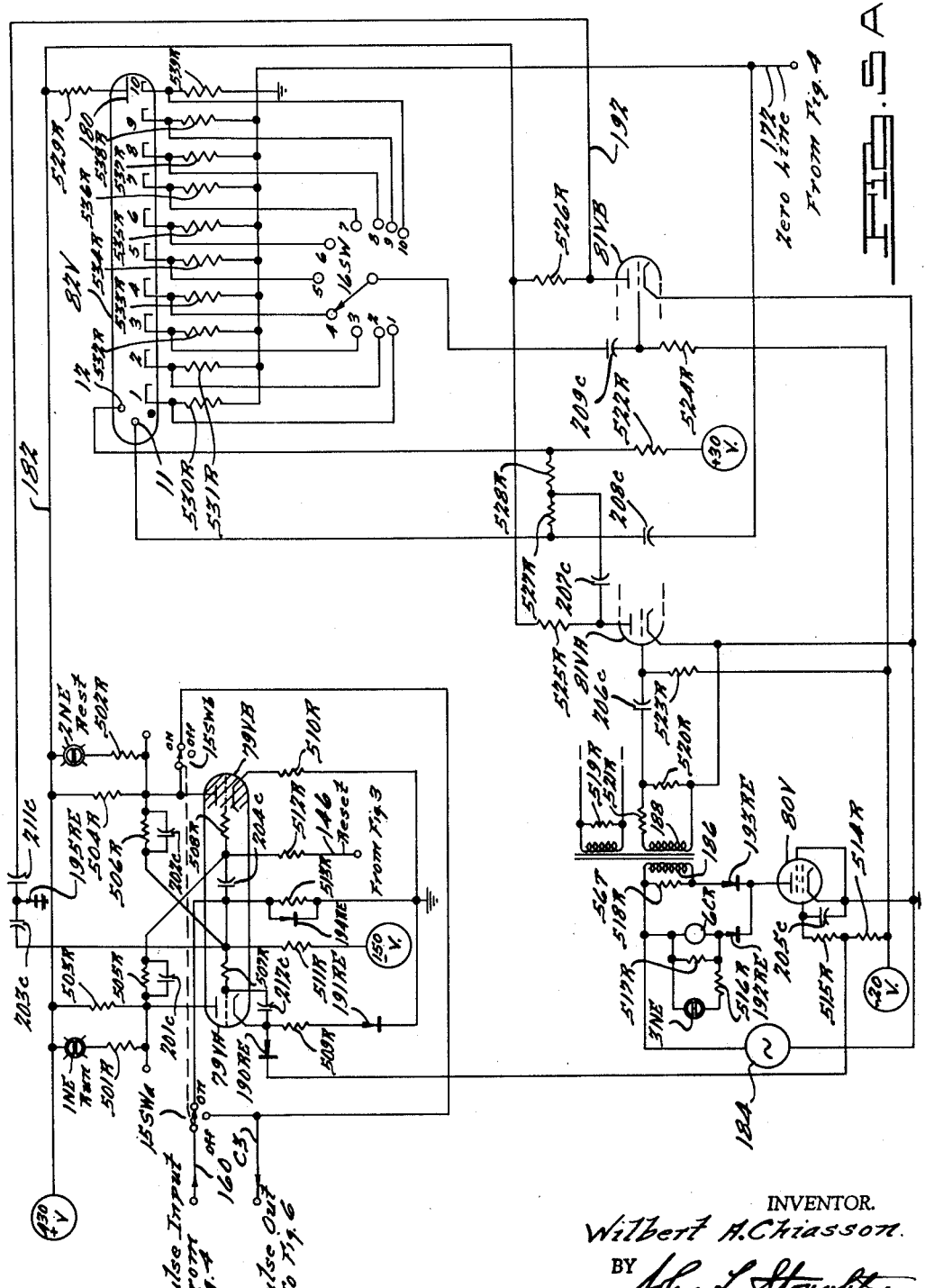

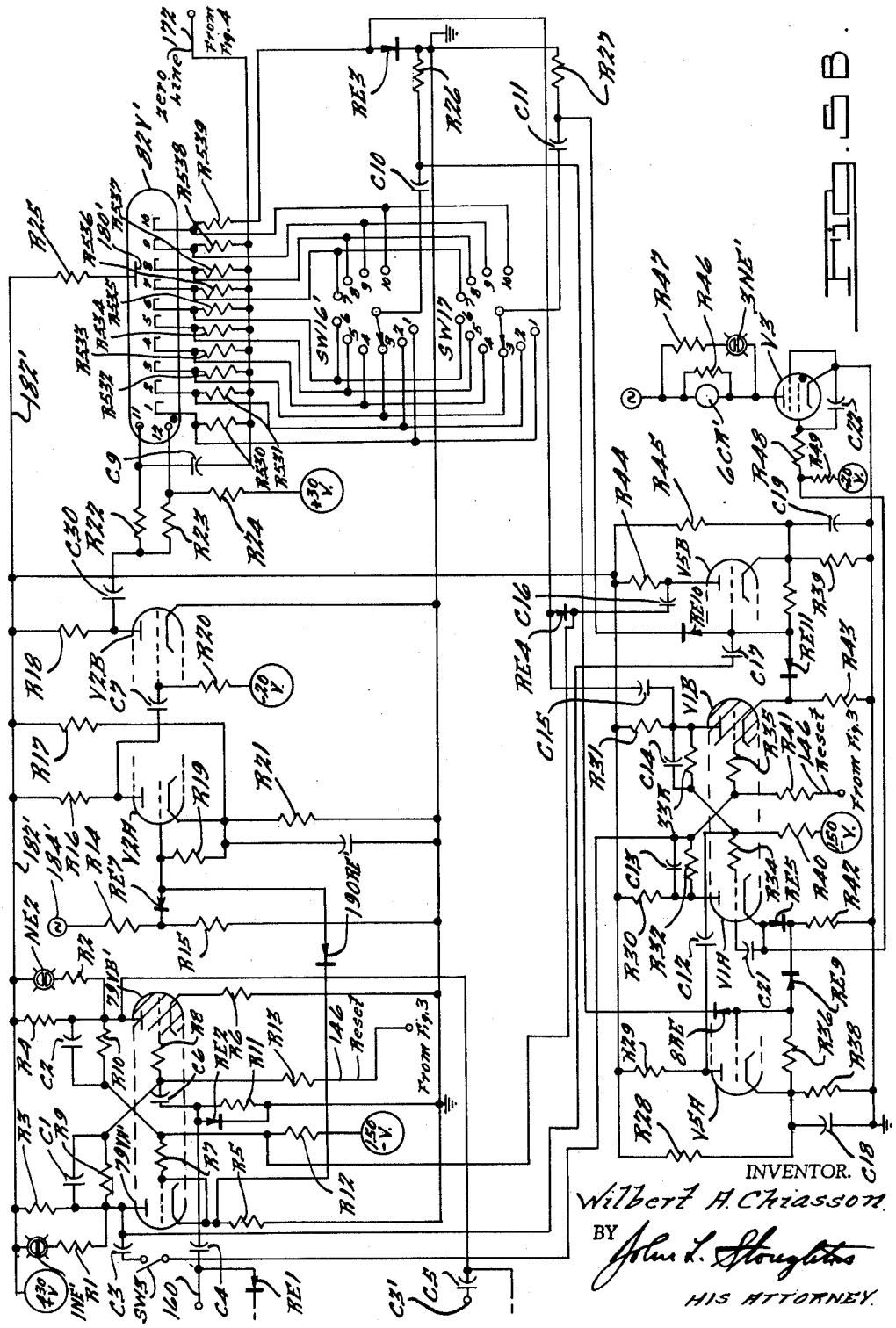

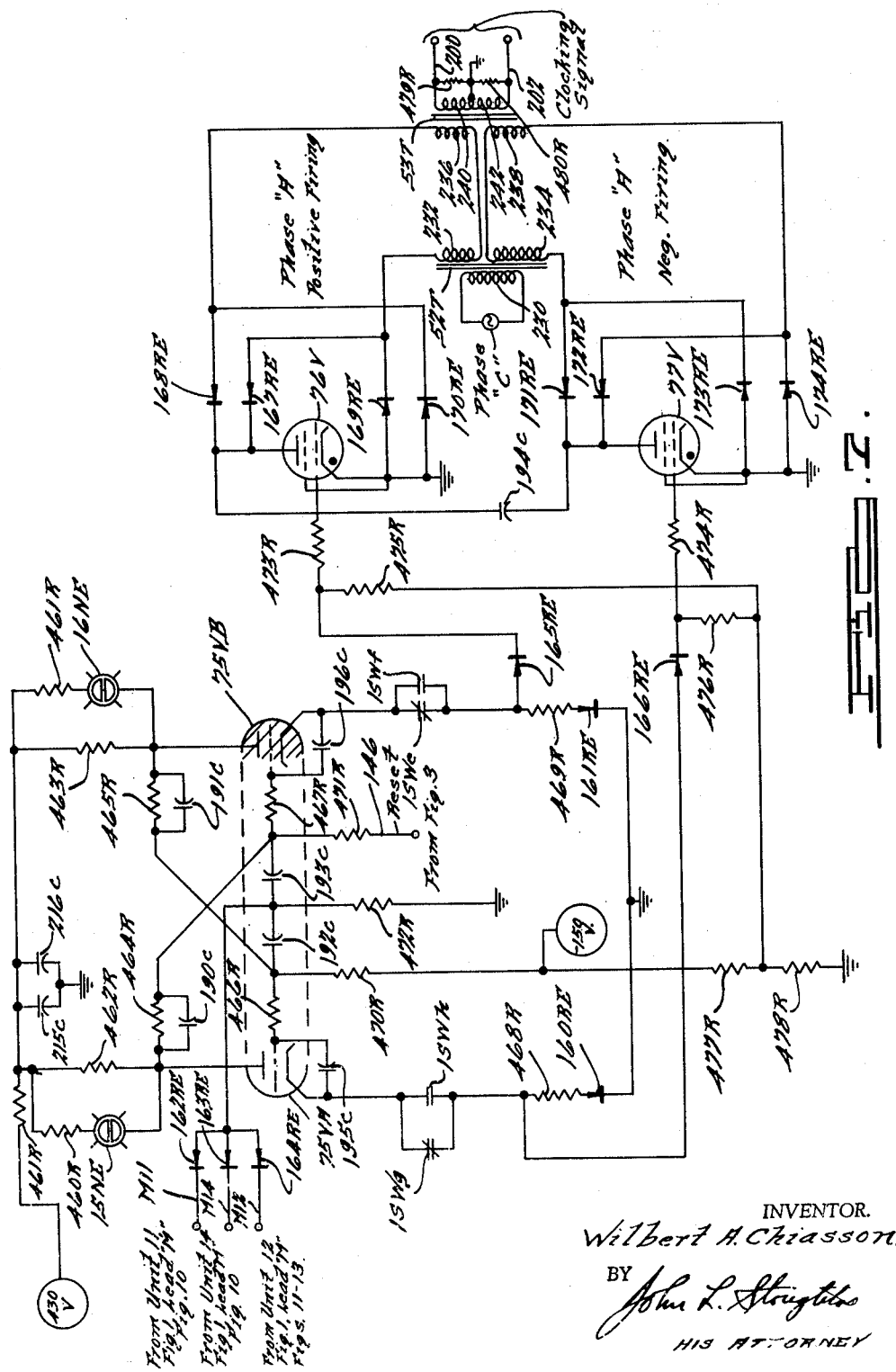

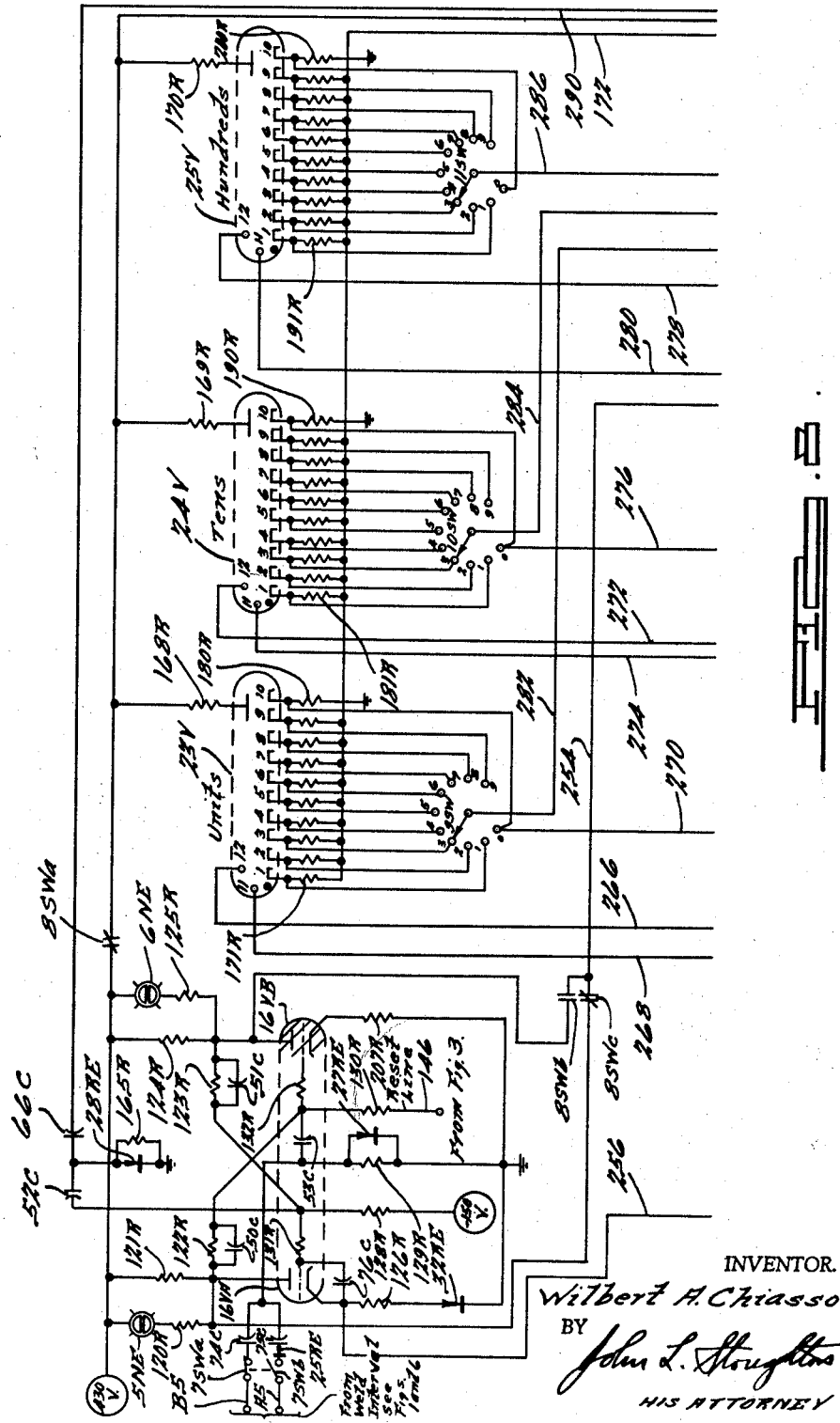

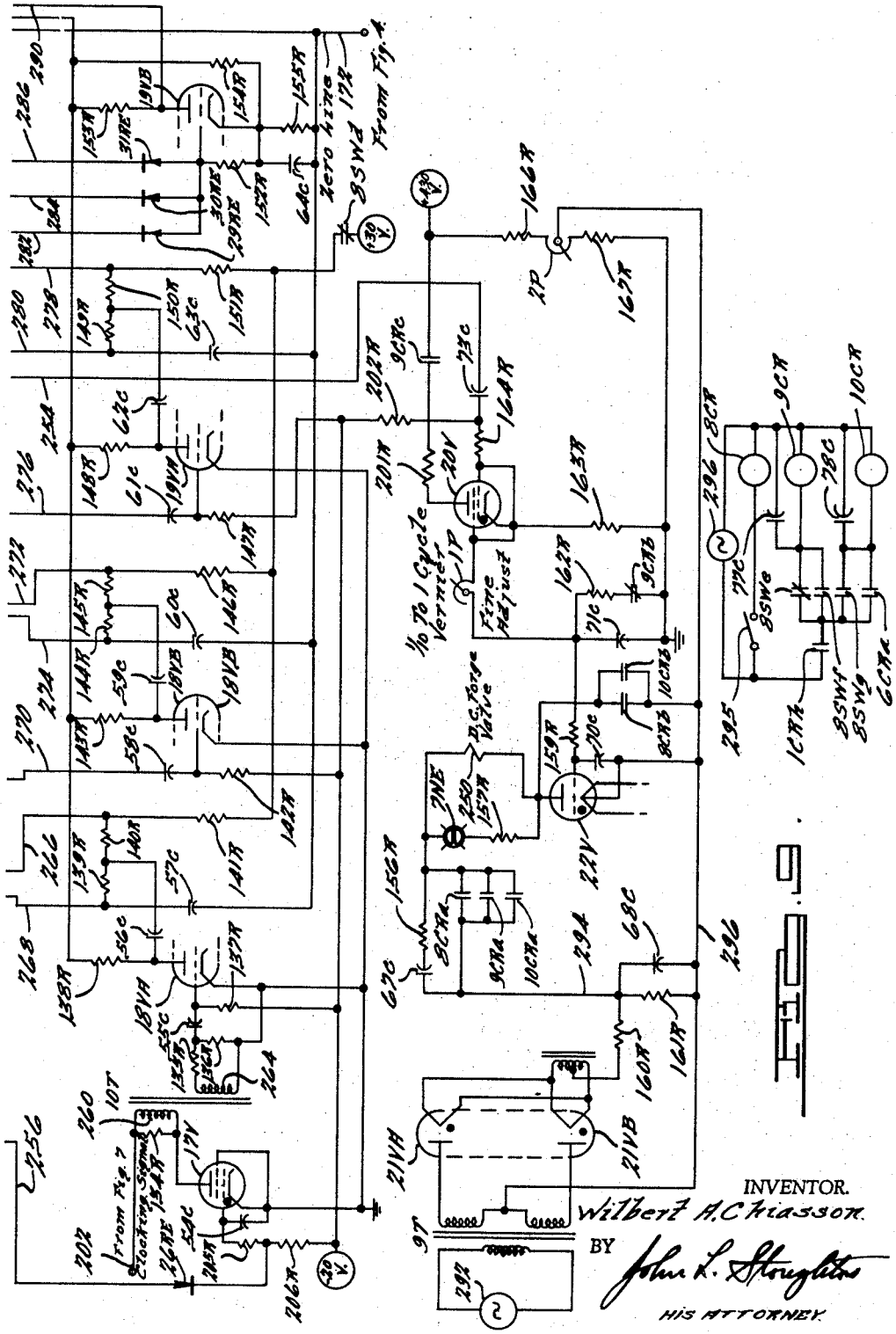

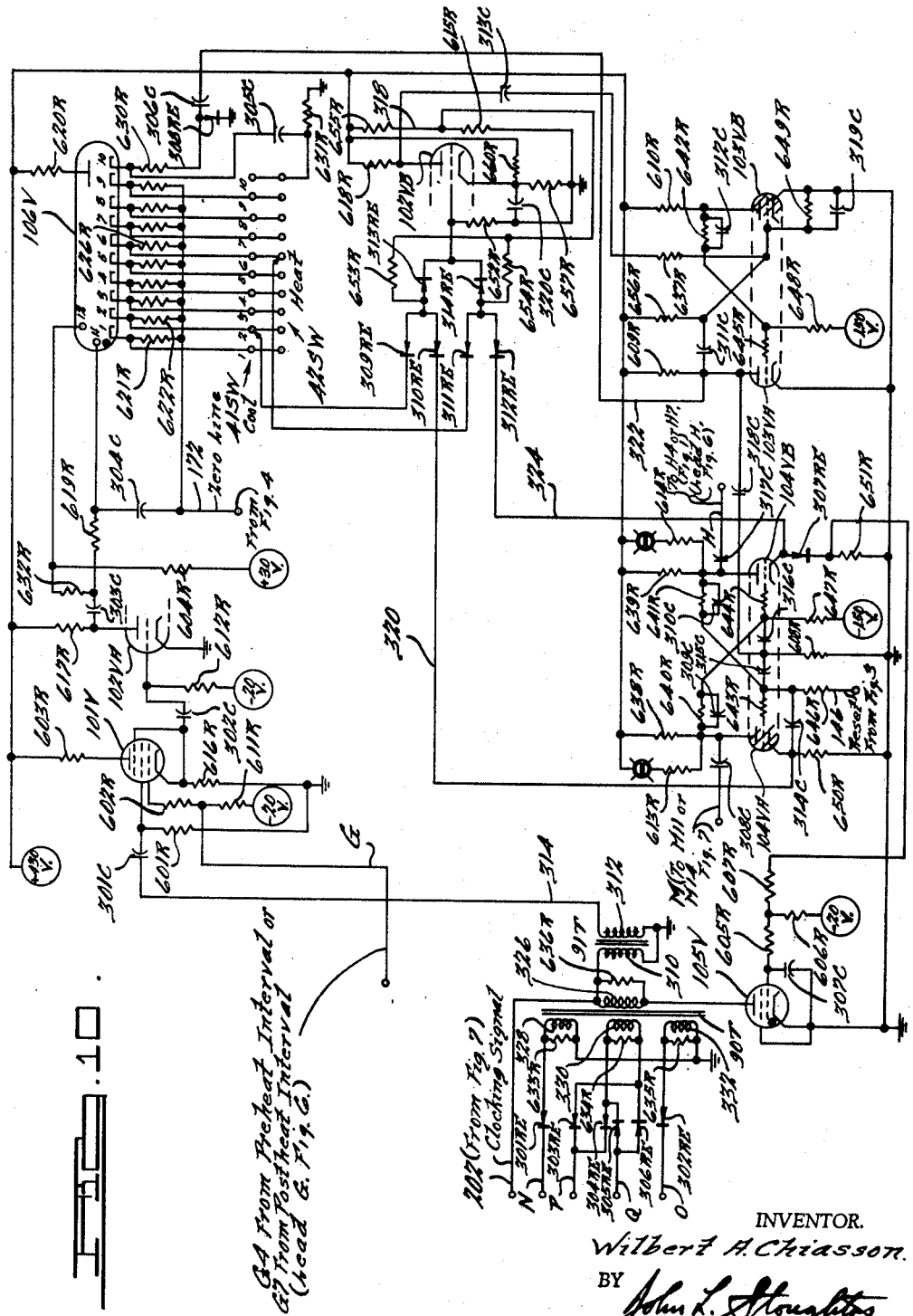

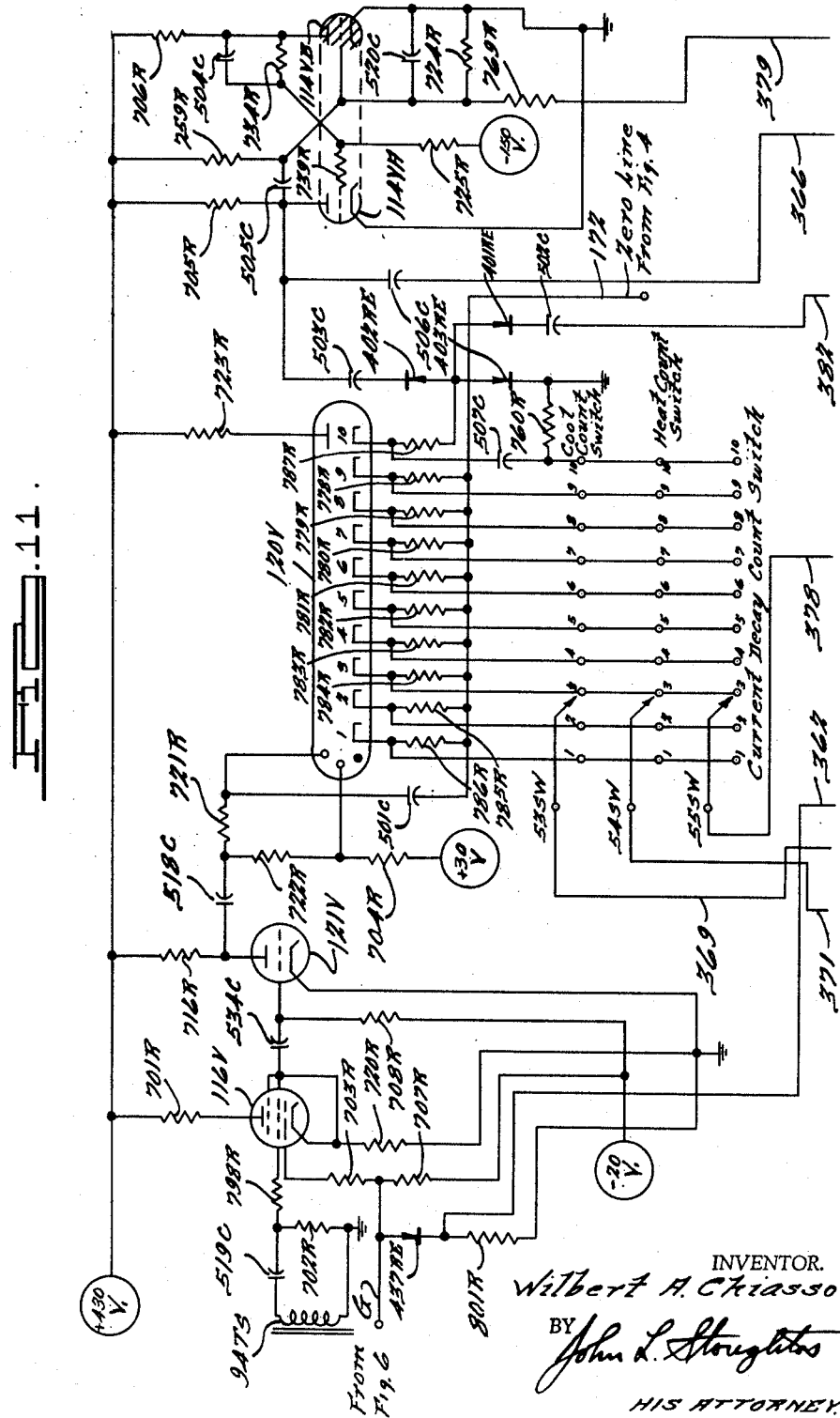

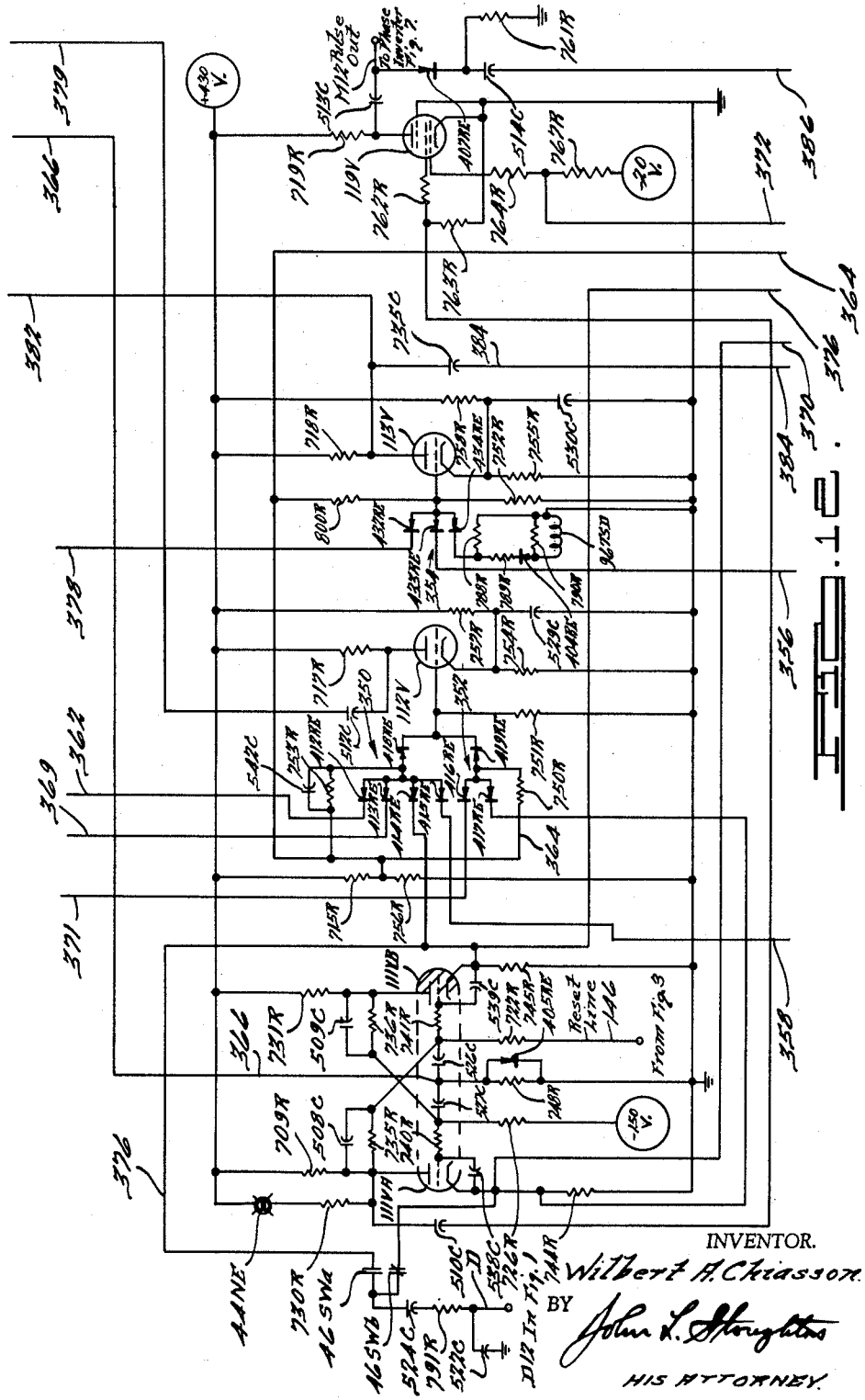

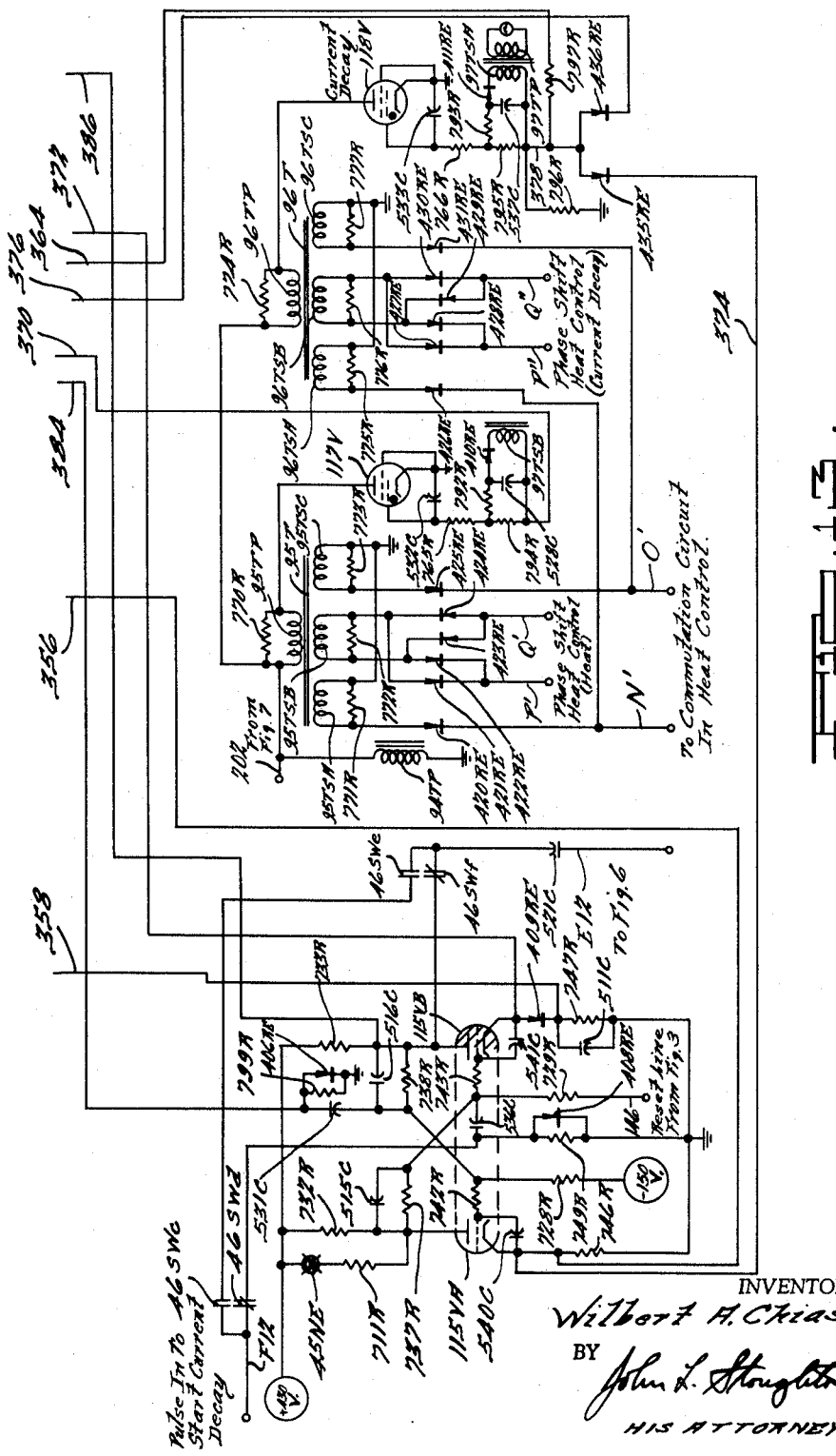

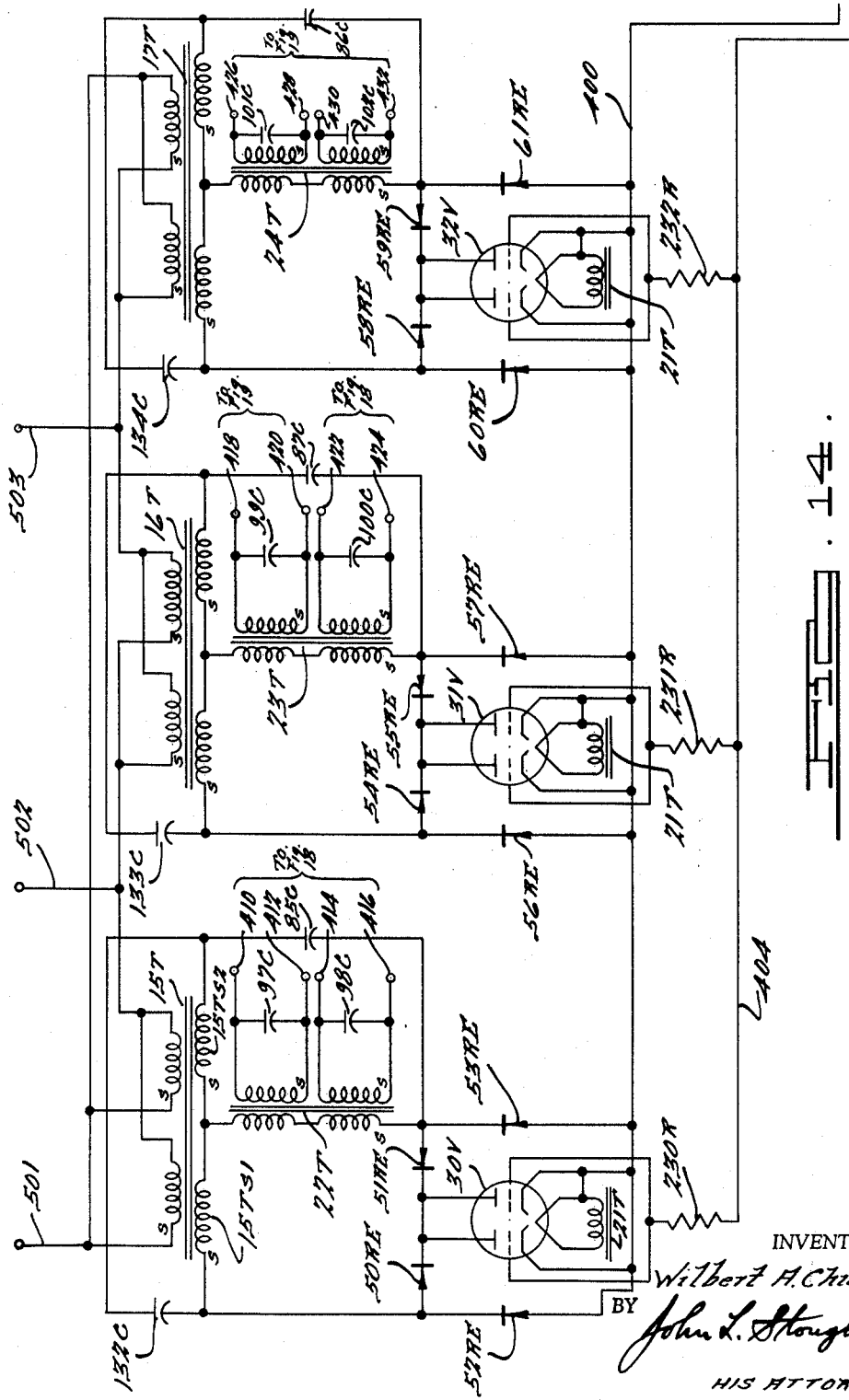

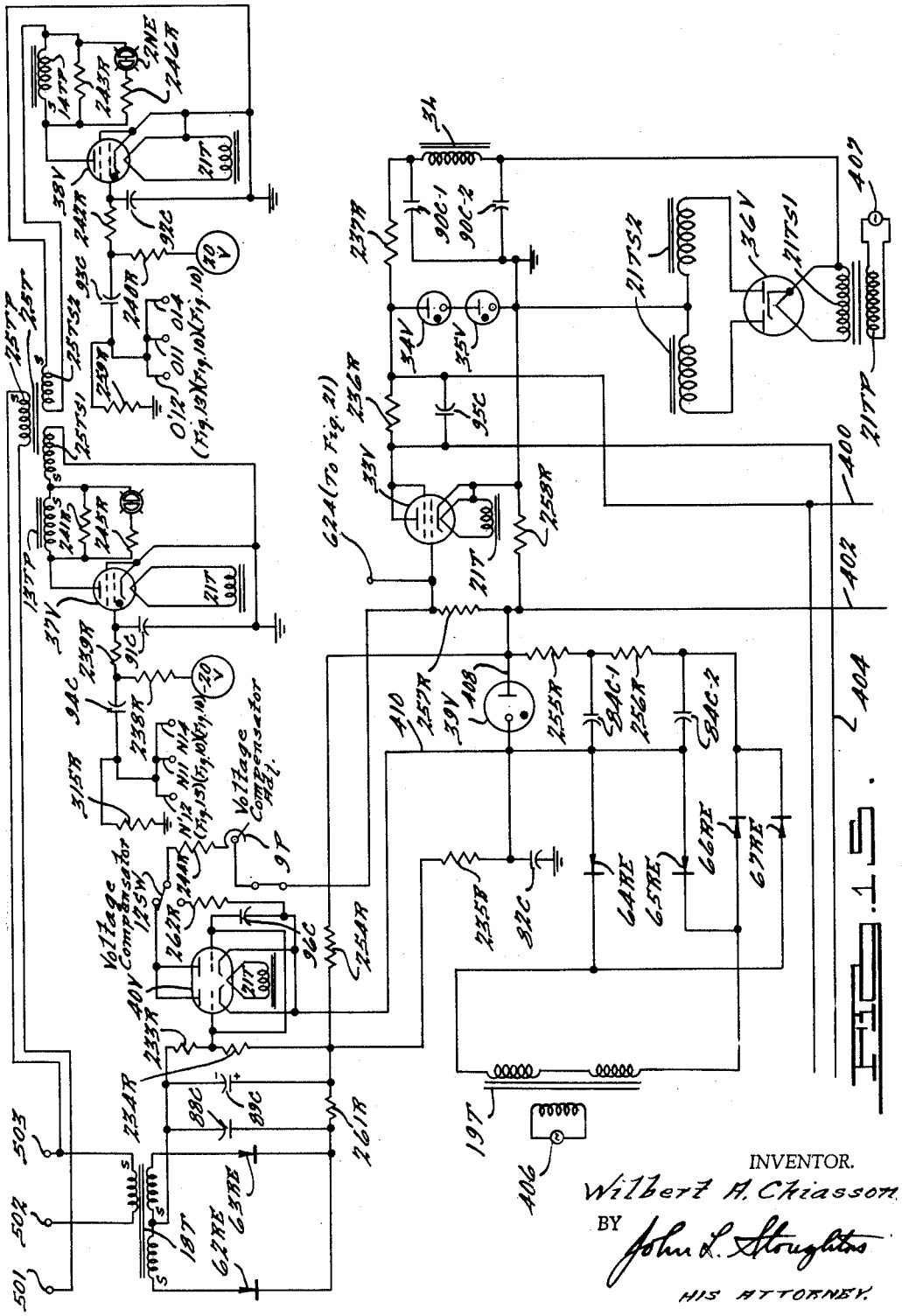

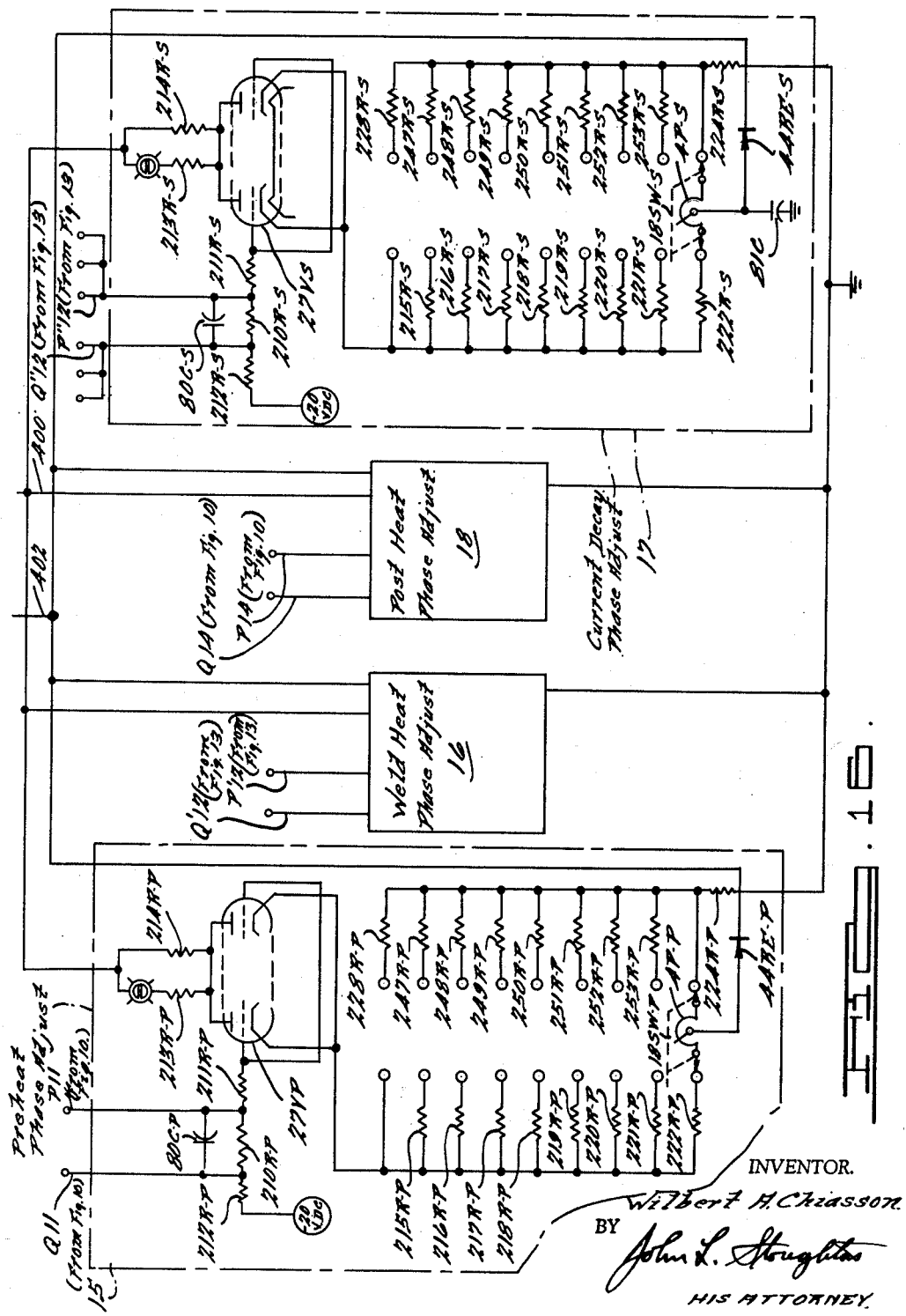

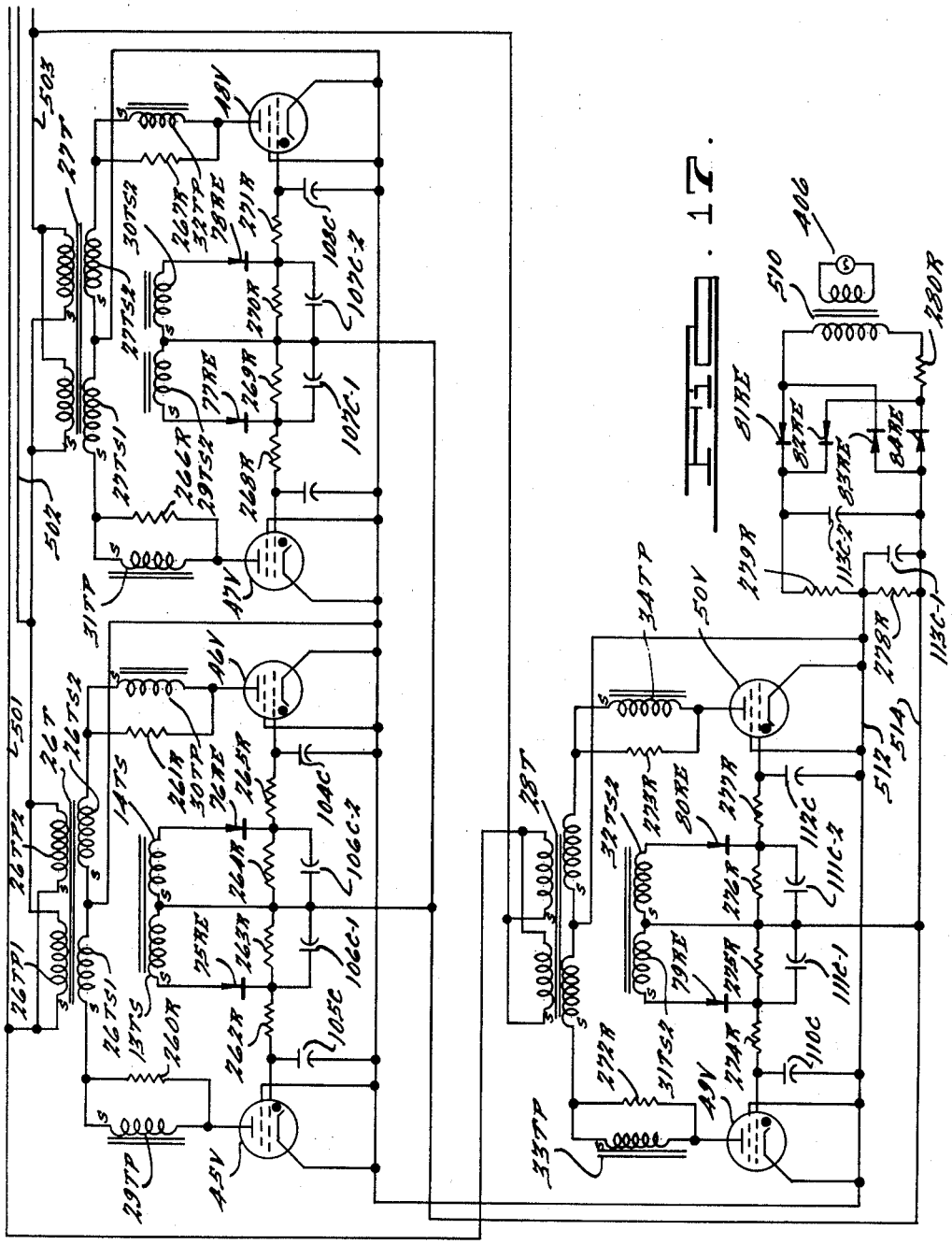

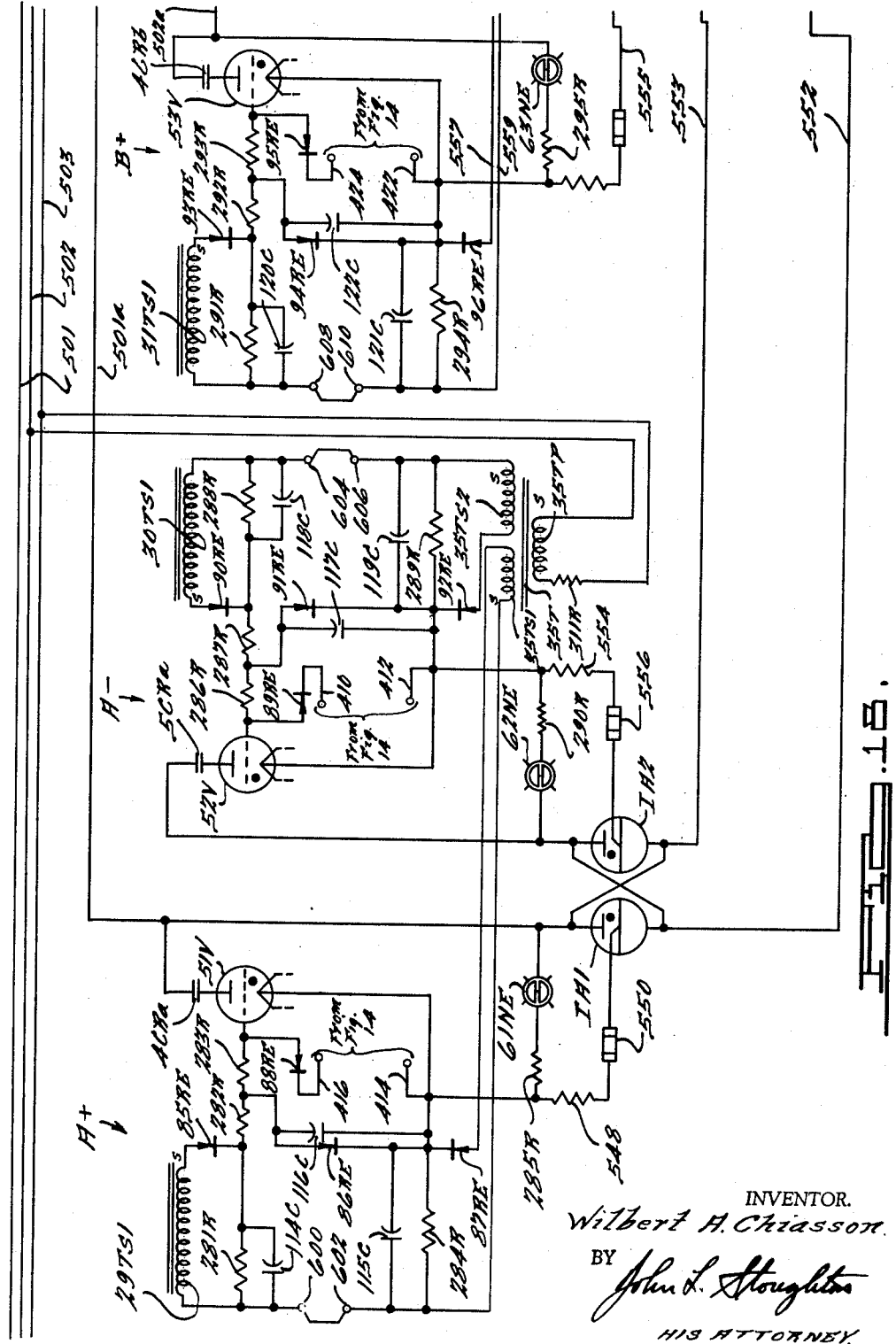

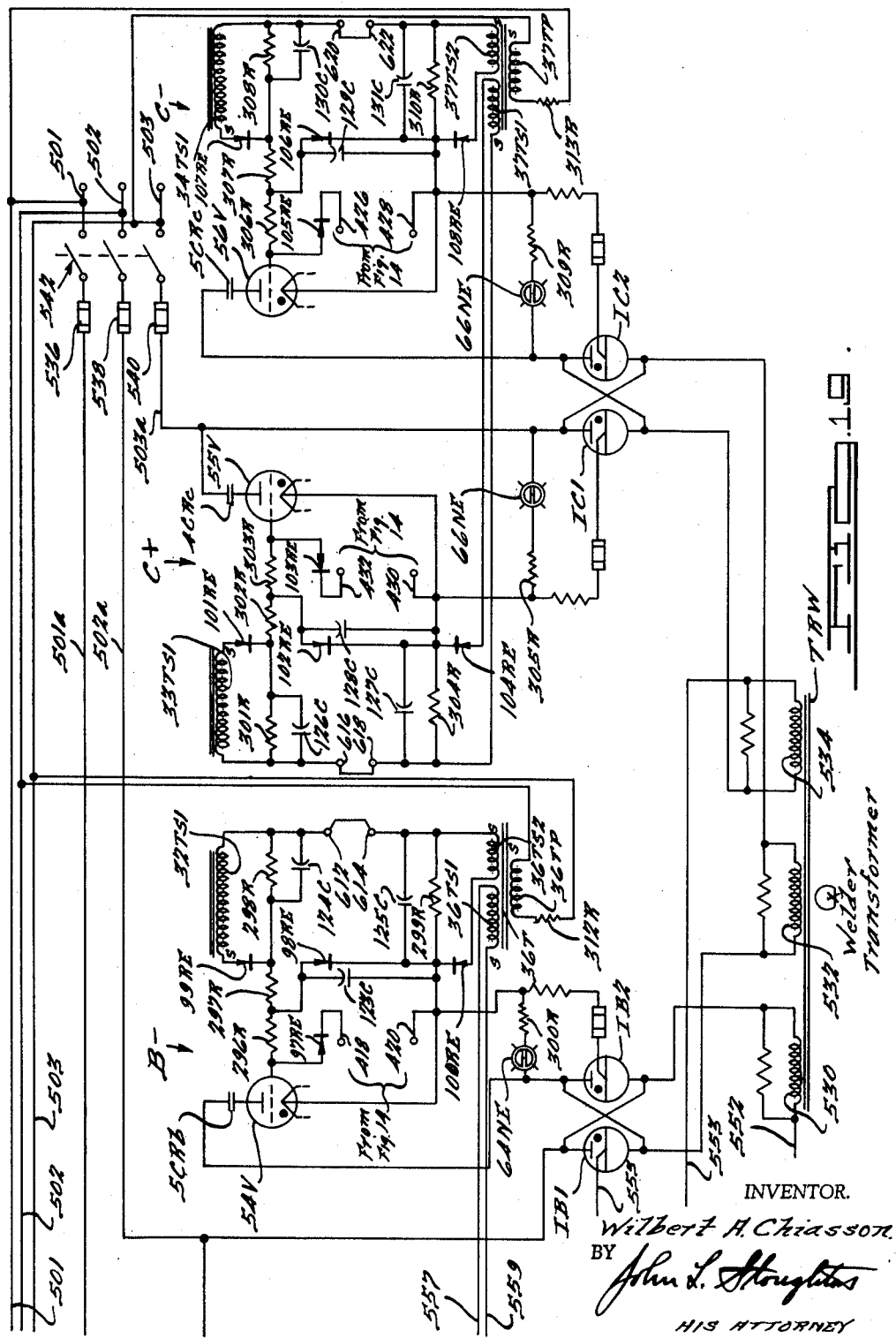

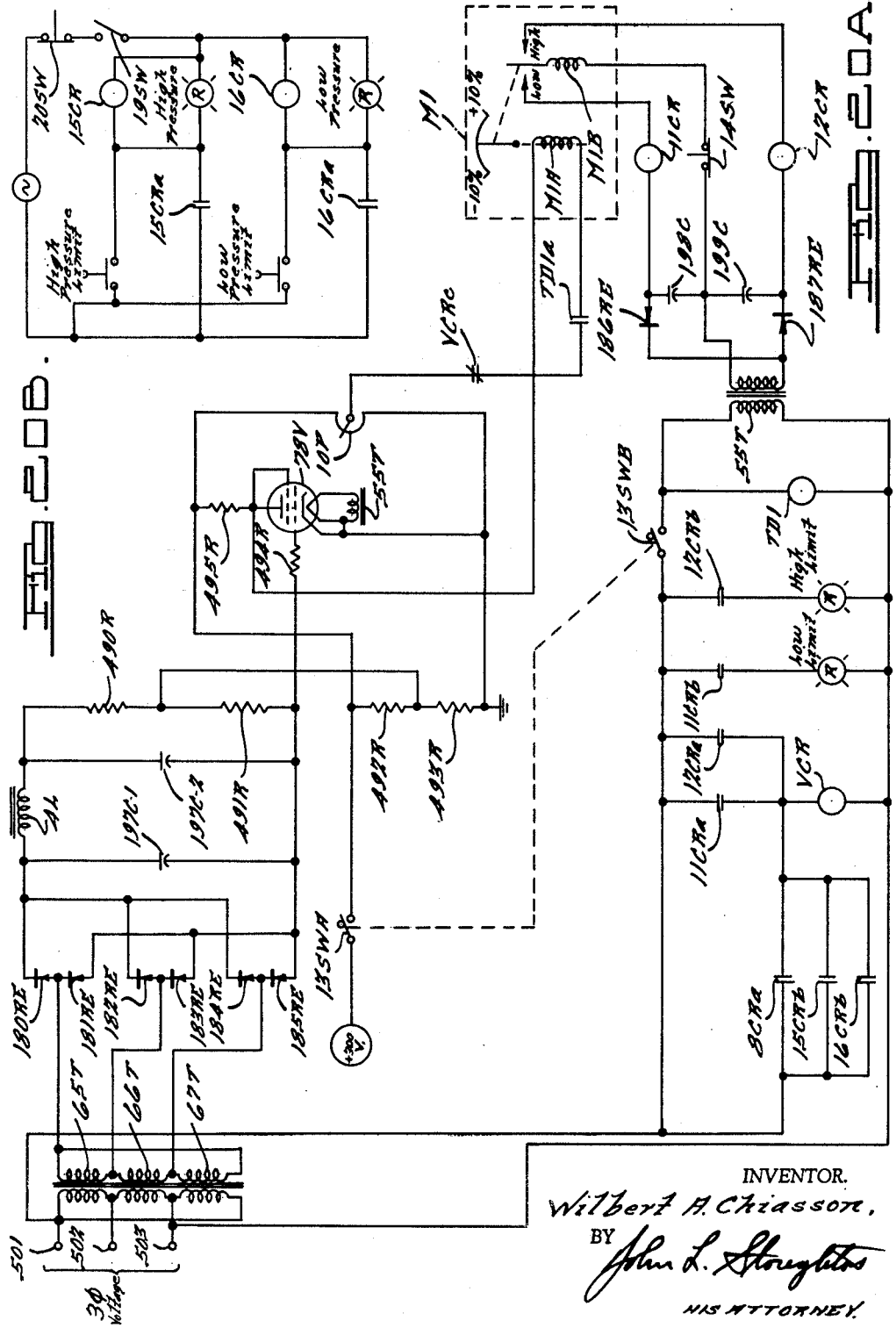

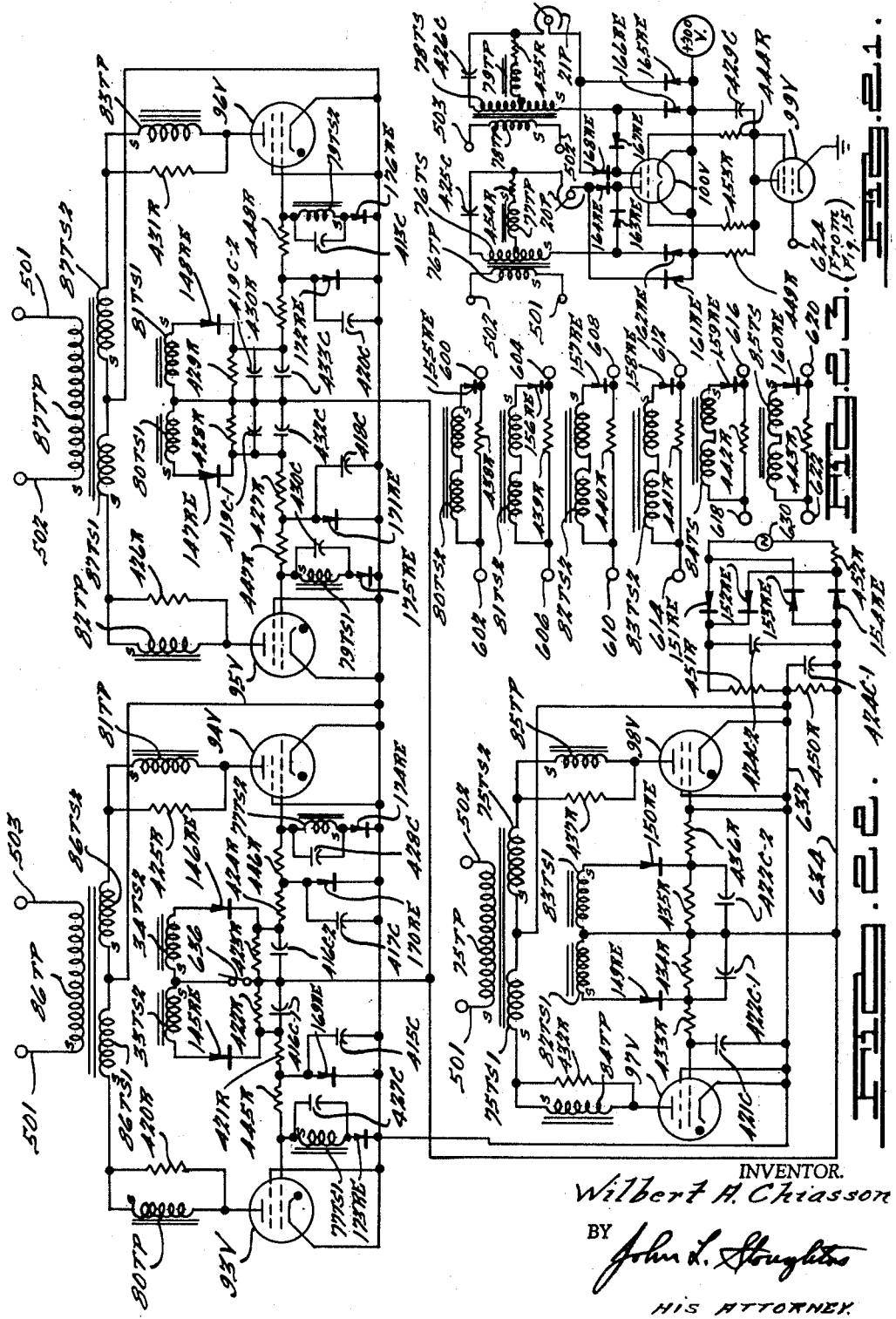

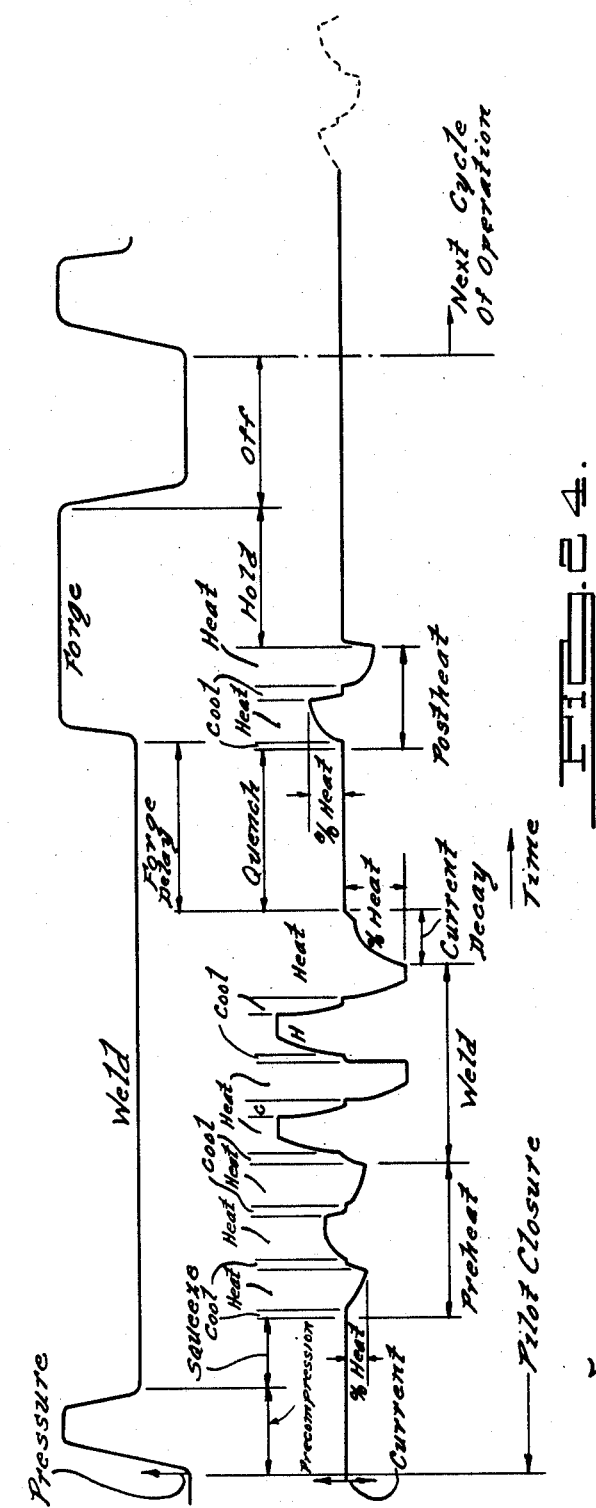

United States Patent Office 3,141,950
Patented July 21, 1964

3,141,950
WELDING MACHINE CONTROL EQUIPMENT
Wilbert A. Chiasson, Walled Lake, Mich., assignor to Weltronic Company, Detroit, Mich., a corporation of Michigan
Filed Jan. 28, 1958, Ser. No. 711,738
91 Claims. (Cl. 219—89)

This invention relates to welding apparatus and more particularly to equipment for controlling the operation of a welding machine.

An object of this invention is to improve the accuracy and consistency of the timing of the point of intiation and the duration of the energy pulses applied to the electrodes of a welder.

Another object of the invention is to improve the accuracy and flexibility of a welder by utilizing a plurality of electrical pulse counting equipments for individually controlling, at different or concurrent times during the weld, the welding currents and/or welding pressures.

Another object of the invention is to improve the balance between the positive and negative half-cycles of the welding currents at the welding electrodes during full-cycle welding.

A further object of this invention is to control the duration of both the successive heat and cool periods during a portion of a welding operation with a single counting equipment.

Another object of this invention is to control the duration of the alternating energy pulses to a full-cycle welder transformer by means of a pulse counter while insuring that the alternating of the energy pulses will not result in inaccurate counting.

Another object of the invention is to accurately control the application of selectable numbers of pulses of electrical energy to a welding machine transformer and to accurately control the application of a plurality of groups of individually selectable numbers of pulses of electrical energy to a welding machine transformer.

A further object of this invention is to accurately control the application of a selectable number of pulses of electrical energy or of a plurality of groups of individually selectable numbers of pulses of electrical energy to a welding machine transformer as well as to further control the durations of the inter-pulse times.

A further object of this invention is to accurately control the application of a selectable number of pulses of a selected energy content to a welding machine transformer and to accurately control the application of an additional energy pulse of lesser energy content to the welding machine transformer following the last one of the pulses of selected energy content, as well as to insure, in full cycle welding, that the polarity of the lesser energy pulse will be the same as the polarity of the noted last selected-energy pulse.

Another object of this invention is to establish a common control apparatus for a plurality of sequentially effective welding control units whereby after the completion of a sequence of operations all of those units are reset to a preselected initial condition.

A further object of this invention is to improve the operation of welding machine control equipment by controlling a voltage-responsive device with the voltage developed across a cathode resistor of a bistable multivibrator.

Another object of this invention is to improve the operation of welding machine control equipment by improving the functioning of means for detecting the concurrence of a plurality of events.

Another object of this invention is to improve the accuracy of control of the duration of an operational condition in a welding machine by counting a selected number of regularly recurring pulses followed by timing an additional selectable portion of one inter-pulse time.

A further object of the invention is to improve the accuracy of control of the duration of an operational condition in a welding machine by employing a two-state device to control a pulse counter.

Another object of this invention is to provide a plurality of sequentially effective pulse counters for welding machine control in which the initiation of counting by one counter is delayed, by a selectable number of counts, following the completion of counting by the immediately preceding counter.

A further object of this invention is to terminate the operation of a polyphase welding machine if the average polyphase supply voltage departs from its nominal value by more than a preselected amount.

Another object of this invention is to insure consistency of operation of a welding machine despite minor variations of the magnitude of the supply voltage.

A further object of this invention is to improve the accuracy of control of a welding machine by providing an improved phase-shifting circuit.

Another object of this invention is to improve the accuracy of the time of firing of an electron discharge device serving to control the energization of a welding transformer by absorbing transients without imposing a delay in the application of a signal to the device.

Another object of this invention is to improve the precision of control of a welding machine energization controller by utilizing both enabling and firing voltages to control an electron discharge device.

Another object of this invention is to produce an adjustable reduction in the magnitude of the current through a welding transformer following a welding current pulse of one magnitude and polarity and prior to a welding current pulse of the opposite polarity.

A representative preferred manner of accomplishing the foregoing objects, and other objects and features of the invention, will be understood from the following detailed description of an embodiment of the invention when read with reference to the accompanying drawings in which:

FIGURE 1 is a block schematic representation of a control equipment for a welder embodying the principles of the present invention;

FIG. 2 is a schematic representation of a portion of a sequence and program control equipment serving as a constituent part of the system of FIG. 1;

FIG. 3 is a schematic representation of an additional portion of the equipment shown in FIG. 2, FIG. 3 being placed below FIG. 2 for proper orientation;

FIG. 4 is a schematic representation of another portion of the equipment shown in FIGS. 2 and 3, FIG. 4 being placed below FIG. 3 for proper orientation;

FIG. 5A is a schematic representation of a precompression control panel which may be employed to serve as a constituent element of the system of FIG. 1;

FIG. 5B is a schematic representation of another form of precompression panel further including the capability of providing a delay after precompression, which may serve, alternatively to the panel of FIG. 5A, as a constituent element of the system of FIG. 1;

FIG. 6 is a schematic representation of a counting equipment, a plurality of which may be utilized as constituent parts of the system of FIG. 1;

FIG. 7 is a schematic representation of a phase inverter panel employed as a constituent part of the system of FIG. 1;

FIG. 8 is a schematic representation of a portion of a forge delay controlling equipment employed as a constituent part of the system of FIG. 1;

FIG. 9 is a schematic representation of another portion of the equipment of FIG. 8, FIG. 9 being placed below FIG. 8 for proper orientation;

FIG. 10 is a schematic representation of a cool-heat panel, a plurality of which are or may be employed as constituent parts of the system of FIG. 1;

FIG. 11 is a schematic representation of a portion of a cool and heat panel having an optional current decay capability suitable for use as a part of the system of FIG. 1;

FIG. 12 is a schematic representation of another portion of the equipment shown in FIG. 11, FIG. 12 being placed below FIG. 11 for proper orientation;

FIG. 13 is a schematic representation of another portion of the equipment of FIGS. 11 and 12, FIG. 13 being placed below FIG. 12 for proper orientation;

FIG. 14 is a schematic representation of a portion of a heat controlling equipment which may serve as a constituent part of the system of FIG. 1;

FIG. 15 is a schematic representation of another portion of the equipment of FIG. 14, FIG. 15 being placed to the right of FIG. 14 for proper orientation;

FIG. 16 is a schematic representation of a plurality of phase adjusting circuits suitable for use as a part of the system of FIG. 1;

FIG. 17 is a schematic representation of a portion of a firing control equipment suitable for use as a constituent part of the system of FIG. 1;

FIG. 18 is a schematic representation of another portion of the equipment of FIG. 17, FIG. 18 being placed to the right of FIG. 17 for proper orientation;

FIG. 19 is a schematic representation of another portion of the equipment shown in FIGS. 17 and 18, FIG. 19 being placed to the right of FIG. 18 for proper orientation;

FIG. 20A is a schematic representation of a voltage deviation sensing and controlling equipment suitable for inclusion as a part of the system of FIG. 1;

FIG. 20B is a schematic representation of an air-pressure sensing equipment suitable for inclusion as a part of the system of FIG. 1;

FIG. 21 is a schematic representation of a phase adjusting circuit forming a part of a downslope inversion equipment suitable for optional use as an element of the system of FIG. 1;

FIG. 22 is a schematic representation of another portion of the downslope inversion equipment of FIG. 21;

FIG. 23 is a schematic representation of another portion of the downslope inversion equipment of FIGS. 21 and 22; and FIG. 24 is a graphical representation of variations in welding pressure and variations of welding current with time in one type of operation of the system of FIG. 1.

GENERAL DESCRIPTION

*(FIGS. 1 and 24)*

While certain of the principles of the invention are of general applicability, the equipment diagrammatically illustrated in FIG. 1 of the drawings illustrates the application of the principles of the invention to a polyphase, resistance-type spot welder.

In general, the welding transformer is connected to the polyphase source of alternating voltage by means of a pair of ignitrons, connected back-to-back, for each phase, three pairs of ignitrons being provided for the disclosed three-phase welding equipment. A thyratron firing control circuit is provided for each ignitron, one for each half-cycle polarity for each of the phase voltages. A commutation control circuit establishes the sequence of firing of the thyratrons, the A, B, and C phase thyratrons of either polarity being fired in sequence. The welding transformer, the ignitrons, the thyratron control circuits and the commutation control circuits constituting the firing circuit 20 on the system of FIG. 1 and being detailed in FIGS. 17 to 19 of the drawings.

A major portion of the remainder of the equipment of the FIG. 1 system serves to control, directly or indirectly, the firing circuit 20. Under that control, the three thyratrons for one welding current polarity are fired in sequence, as, the A-positive, B-positive and C-positive thyratrons. In accordance with the setting of the equipment, this sequence may be repeated a plurality of times during any one heat period. In the illustrative welding-current versus time curve in FIG. 24, each heat period is labeled "heat."

For each heat period, there is a cool period, during which the magnetization of the transformer can return to zero, and in the disclosed system a cool period precedes each heat period, as is illustrated in FIG. 24. The cool period, as will be seen, may be of selectable duration, and the combination of a cool period and a heat period is here considered to constitute one impulse.

The equipment can be set so that all impulses are of the same polarity but the current curves of FIG. 24 and the ensuing specific description are based on full-cycle operation in which the impulses are of alternating polarities.

The control equipment is designed to additionally control the magnitude of the energy impulses—the percent heat. To this end, a heat control equipment 19 on FIG. 1 serves to apply alternating voltage signals to the thyratrons in the firing circuit 20 which are phase shifted from the respective phase voltages by an amount determined by the setting of the heat adjust equipment 15 to 18.

In the welding of various materials it is desirable that the welding machine be capable of providing different magnitudes of energy pulses at various times during the weld, and consequently the disclosed control equipment is imbued with the capability of supplying various selectable percentage heats during each of a preheat interval, a weld heat interval, a current decay interval, and a postheat interval, and the several elements 15 to 18 of the heat adjust equipment permit selection of the percentage heats during each of those intervals.

Means are additionally provided for determining the duration of those intervals in terms of numbers of impulses as well as for determining the duration of a delay interval between the current decay interval and the postheat interval, known as quench time, and the duration of a hold time and an off time sequentially following the postheat interval.

In the graph of FIG. 24, the preheat interval is represented as consisting of three impulses at a relatively low percent heat, the weld interval is represented as consisting of four impulses of a relatively high percent heat, the current decay interval is shown to be relatively short and with a percent heat setting which is lower than the preheat setting, the quench time is one of zero percent heat, the postheat interval is represented as consisting of two impulses of lower percent heat than the weld heat, and the hold time and the heat time are again at zero current level.

The pressure between the welding electrodes and the work is also variable between zero pressure, squeeze and weld pressure and a higher pressure employed for precompression prior to welding and for forging late in the weld cycle, both as illustrated in the pressure versus time curve of FIG. 24. The durations of the precompression period, of the squeeze interval, and of the forge and forge delay intervals are also selectable and controlled.

In the block schematic representation of FIG. 1 of the drawings, the sequence and program control equipment 1 (the details of which are presented in FIGS. 2 to 4 of the drawings) controls and programs the system including the establishing of conditions facilitating the initial setting up of the equipment, the selection of single or cyclic functioning, and the selection of the mode of operation. The sequence and program control equipment 1 transmits, at an appropriate time, a signal to initiate the operation of the forge delay equipment 13 and initiates the seriatim operation of equipments 2 to 9 by transmitting a pulse, at an appropriate time, via conductor 160 to the precompression panel 2, the first of that series. Equipment 1 further operates in response to the receipt of a pulse via conductor 162 transmitted at the termination of the operation of the hold-time unit 8 and a pulse received via conductor 170 at the termination of the operation of the off-time unit 9 to normalize itself and to transmit a zeroing signal and a resetting signal. The zeroing signal is applied as a voltage change to the zero line 172 which extends to the precompression unit 2, the squeeze unit 3, the preheat unit 4, the weld-heat weld-interval unit 5, the quench unit 6, the postheat unit 7, the hold-time unit 8, the off-time unit 9, the preheat unit 11, the weld-heat unit 12, the forge-delay unit 13, and the postheat unit 14, while the resetting signal is applied as a voltage change to the reset line 146 which extends to each of the units 2 through 14. These signals are employed to normalize the equipment at the end of one welding sequence in preparation for the next succeeding sequence.

The control unit 1, when actuated, initiates the sequence of operations by applying an input pulse via conductor 160 to pre-compression unit 2.

For completeness of disclosure, two types of precompression unit 2 are disclosed. The first of these, shown in FIG. 5A of the drawings, operates in response to the application of a pulse thereto from the sequence and program control panel 1 via conductor 160 to control a pneumatic or hydraulic system to increase the pressure between the welding electrode and the work to a precompression value, to terminate that increased pressure after the elapse of a preselected time, and to then transmit a pulse via conductor C3 to the squeeze unit 3 to initiate operation of that unit. The second of these precompression units, illustrated in FIG. 5B of the drawings, is designed not only to perform the above operations but also to establish a selected delay between the completion of the precompression time and the transmission of the output pulse via conductor C3 during which the force between the electrode and the work will have had ample opportunity to become stabilized, which is of particular significance if there is no squeeze time.

The precompression unit controls the duration of the precompression time (and of the delay after precompression, if any) by counting a selectable number of pulses derived from a clocking signal which is transmitted from a phase inverter unit 10 via conductor 200. This signal is an alternating voltage which is derived from the alternating voltage welding current source. The unit 10 concurrently transmits a clocking signal via conductor 202 to others of the units, those two signals being 180° out of phase with one another. In response to each input pulse via any one of the conductors M11, M12 and M14, the unit 10 inverts the phase of the clocking signal applied to both of the conductors 200 and 202.

The squeeze time or interval unit 3, the preheat weld-interval unit 4, the weld-heat weld-interval unit 5, the quench interval unit 6, the postheat weld-interval unit 7, the hold-time unit 8 and the off-time unit 9 are or may be identical to one another except in certain of their internal interconnections and in their connections with the other units in the system. To facilitate this uniformity and interchangeability, each such unit is provided with a plurality of inputs and outputs which are selectively employed in accordance with the system requirements.

Circuitry suitable for use as any one of the above-noted units 3 to 9, inclusive, is illustrated in FIG. 6 of the drawings. Each such unit includes a series of terminal leads designated A to L, inclusive. To facilitate identification, these terminal leads, in the representation of FIG. 1, are suffixed with the same number as the block of which they are a part. For example, terminal lead A in FIG. 6 of the drawings is designated A3 at the squeeze interval unit 3, A4 at the preheat weld-interval unit 4, A5 at the weld-heat weld-interval unit 5, etc. The terminal leads A to L in FIG. 6 to which connection is not made when that circuitry is employed as any one of the units 3 to 9 in FIG. 1 are in some instances omitted from the FIG. 1 representation.

As will be more detailedly explained hereinafter, in the squeeze interval unit 3, terminal leads G3 and H3 (leads G and H on FIG. 6) are interconnected or jumpered, output terminal lead A3 (terminal lead A in FIG. 6) is connected to terminal lead C4 of the preheat weld-interval unit 4 in FIG. 1, and the input terminal lead C3 (terminal lead C in FIG. 6) is connected to the precompression unit 2, as detailed in FIG. 5A or 5B, it being observed that conductor C3 is also designated as such in the detailed drawings of the alternatively employed FIGS. 5A and 5B.

In the preheat weld-interval unit 4, terminal leads G4 and H4 are individually connected to the preheat cool and heat unit 11, terminal lead K4 is connected to a clocking-voltage signal on conductor 200 from the phase inverter unit 10, and terminal lead A4 is connected to lead C5 of weld-interval unit 5.

In the weld-heat weld-interval unit 5, terminal leads D5, E5, F5, G5 and H5 are individually connected to the weld-heat cool and heat unit 12, terminal leads B5 and A5 are connected to the forge delay unit 13, terminal lead A5 also being connected to input lead C6 of the postheat cool and heat unit 14, and terminal lead K5 is connected to the clocking-signal conductor 200.

In the quench interval counter or unit, terminal leads G6 and H6 are jumpered as are terminal leads K6 and L6, and the output terminal lead A6 is connected to the input terminal lead C7 of the postheat weld-interval unit 7. In the latter unit, terminal leads G7 and H7 are connected to the postheat cool and heat unit 14, terminal lead K7 is connected to the clocking-signal lead 200, and terminal lead A7 is connected to input lead C8 of the hold-time counter 8.

In the hold-time unit 8, terminal leads H8 and G8 are interconnected as are leads K8 and L8, and output terminal lead A8 is connected to the input terminal lead C9 of the off-time unit 9. In the latter unit, terminal leads K9 and L9 are interconnected, terminal leads G9 and H9 are interconnected and are additionally connected to conductor 162 extending to the sequence and program control unit 1, and terminal lead J9 is connected to conductor 170 which also extends to unit 1.

Except for unit 5, terminal leads E and F are interconnected in each of the counter units, and are not illustrated for those other units.

The counter unit detailed in FIG. 6 is characterized as a 100-count unit, since it operates as a counter capable of transmitting an output signal after the receipt of a series of input signal pulses which may be varied in number from 0 to 99 in the illustrated arrangement. When the squeeze time unit 3 has completed the counting of a selected number of half waves of one polarity of the clocking signal, it transmits an output pulse via terminal leads A3 and C4 to initiate operation of the preheat weld interval unit 4. This unit immediately transmits a signal via terminal lead G4 to the preheat cool and heat unit 11 which may be of the type detailed in FIG. 10 of the drawings. In response to the input signal, unit 11 counts a selectable number of pulses derived from the clocking signal at conductor 202 to establish the first cool period of the preheat interval (see FIG. 24). At the completion of the count, the preheat cool and heat unit 10 transmits signals via leads P11 and Q11 to the preheat phase adjust unit 15 (detailed in FIG. 16) to cause that unit to transmit a direct voltage of selectable magnitude to the heat control unit 19 (detailed in FIGS. 14 and 15). The unit 10 further transmits, at the end of the cool-period count, signals via conductors N11 and O11 to the unit 19 to initiate operation of that unit. Heat controller 19 exerts control over the firing circuit 20 (detailed in FIGS. 17 to 19) by means including conductors 410–432 to cause unit 20 to fire the A, B and C firing control thyratrons (for one polarity) in sequence. The number of such sequences which will occur is determined by the preheat cool and heat unit 11, that unit counting one clocking-signal-derived pulse for each such sequence. When the preselected number of heat-period pulses have been counted by unit 11, the signals applied to leads P11, Q11, N11 and O11 are terminated to terminate energization of the welding transformer, the counter in unit 11 is reset in preparation for the counting of pulses to define the duration of the next cool period, and a pulse is transmitted via conductor H4 to the preheat weld interval unit 4. Unit 4 counts that pulse to record the completion of one preheat weld impulse. At this same time, unit 11 applies a pulse to lead M11 to cause the phase inverter 10 to invert the phase of the clocking voltages on conductors 200 and 202.

The equipment continues to produce and count those impulses until unit 4 has counted a preselected number of the input pulses on lead H4. At that time, the signal applied to lead G4 is terminated to prevent further operation of unit 11, unit 4 is reset, and a pulse is transmitted via terminal leads A4 and C5 to initiate the operation of the weld heat weld interval unit 5.

When unit 5 is actuated, it transmits a signal via terminal lead G5 to the weld heat cool and heat unit 12 which is herein assumed to be capable of providing, optionally, current decay at the end of the last impulse. Unit 12 operates in a manner generally similar to unit 11, counting pulses derived from the clocking signal on conductor 202 to define the successive cool and heat periods, and transmitting control signals to the weld heat phase adjust unit 16 via leads P'12 and Q'12 and to the heat controller 19 via leads N'12 and O'12. If the current decay capability of unit 12 is disabled, unit 12 transmits a pulse to unit 5 via lead H5 at the end of each heat period so that unit 5 can count the number of welding impulses during the weld interval. Additionally at the end of each heat period (except for the last heat period) unit 12 transmits a signal via conductor M12 to cause the phase inverter 10 to invert the phase of the clocking signals.

If the current decay capability of the unit 12 is utilized, the pulse to be counted is transmitted to unit 5 via conductor H5 not at the end of the heat period but rather at the end of the cool period. Consequently, unit 5 reaches its count at the end of the cool period of the last weld impulse and transmits a signal via lead F5 to unit 12. In response to that signal, unit 12 prepares to count out the current decay period and becomes disabled to transmit a pulse to the phase inverter at the end of the last heat period. This insures that the polarity of the current decay will be the same as the polarity of the last welding current impulse in the weld heat interval.

At the completion of the final heat period of the weld interval, unit 12 terminates the signal on output leads P'12 and Q'12 and transmits a signal via leads P''12 and Q''12 so that the percent heat during current decay will be determined by the setting of the current decay heat phase adjuster 17. At the end of the current decay, unit 12 resets itself, transmits a pulse via lead M12 to trip the phase inverter 10, and transmits a signal via lead E5 to terminate operation of unit 5.

The initiation of the operation of the forge delay unit 13 may occur at the beginning of the weld interval count (in response to a signal applied via lead B5), or at the end of the current decay following weld heat (in response to a signal applied via lead A5) or, if desired, at the beginning of current decay. The duration of the forge delay time is determined by counting pulses derived from the clocking voltage on conductor 202 and by means for measuring a selected portion of one interpulse period. Unit 13 controls the welding machine equipment which establishes the force of engagement between the welding electrodes and the work.

At the end of the weld interval (with or without current decay) a signal is also transmitted to the quench time counter 6 via leads A5 and C6. This unit times the quench interval as noted in FIG. 24 by counting pulses derived from the clocking signal on conductor 200 and, after having counted a selected number of pulses, initiates the operation of the postheat weld interval unit 7 by applying a signal thereto via leads A6 and C7.

Unit 7 cooperates with the postheat cool and heat unit 14 in a manner similar to that above noted in connection with units 4 and 11, and unit 14 controls the percent heat and the durations of the cool and heat periods by transmitting control signals to the heat controller 19 over leads N14 and O14 and to the postheat phase adjuster 18 via leads P14 and Q14.

At the end of the postheat weld interval, unit 7 trips unit 8 to count the hold time and that unit in turn trips unit 9 to count the off time. Unit 9 exerts control over the sequence and program control panel 1 by transmitting signals via conductors 162 and 170.

The voltage deviation and air pressure sensing equipment 22 (detailed in FIGS. 20A and 20B) serves to terminate operation of the machine if either the line voltage or the air pressure (assuming pneumatically operated welding-electrode control means to be employed) departs from a nominal value by more than a preselected amount.

The downslope inversion unit 21 may be optionally employed to force the current to zero at the end of a welding current pulse of either or both polarities.

For clarity of presentation and to avoid unnecessary complication of the drawings, the circuit elements have been functionally located on the several sheets of drawings. To insure that any pair of relay contacts can be properly identified with its associated relay winding, the same reference character which is applied to the winding is employed for the contacts, with individually distinguishing suffixes in the form of a lower case letter. Similarly, the primary and secondary windings of certain of the illustrated transformers are identified with the same reference characters except that the reference characters applied to the primaries also include the letter "P" and those applied to the secondaries include the letter "S."

In accordance with accepted practice, electrical switch or relay contacts are represented by a pair of spaced-apart parallel lines, with a normally closed pair of contacts further including an oblique line intersecting both parallel lines. A capacitor is represented by spaced-apart straight and curved lines. Rectifiers or unidirectional current conducting devices are represented with their arrows pointing in the direction of low impedance to conventional current flow. In most cases, both the alternating and the direct potential sources have been represented as identified circles. In the absence of a shown return conductor, it is to be understood that the source is returned to ground.

A plurality of certain of the equipments are employed in the FIG. 1 system. To avoid confusing duplication in such cases, each such equipment has been detailedly represented but once, with all utilized output and input terminal leads being identified and with their connections to other equipments being set forth in FIG. 1 and in the specification.

SEQUENCING AND PROGRAMMING

(FIGS. 2–4)

In the sequence and program control apparatus illustrated in FIGS. 2, 3 and 4 of the drawings, a suitable source of single phase alternating voltage 100 (FIG. 2) is connected, upon closure of switch 101, across conductors 102 and 104 which extend through each of those figures, and a second source of single phase alternating voltage 106 is effective, upon closure of switch 107, to establish an alternating voltage difference between supply conductors 108 and 110 which also extend over those three figures. The existence of an alternating potential difference between conductors 108 and 110 is evidenced by illumination of the power-on lamp 112.

The voltage between conductors 108 and 110 is applied across a circuit including now-closed contact TDCR*a* and the winding of time delay relay TD1. After an appropriate interval of time, time delay relay TD1 operates, closing its contact TD1*a* to connect the winding of relay TDCR as well as the "time delay over" lamp 114 between conductors 108 and 110. Relay TDCR, in operating closes its contact TDCR*c* to complete a locking circuit for itself and for lamp 114 and also opens its contact TDCR*a* to de-energize relay TD1. With contact TDCR*d* closed, the equipment can be placed in operation by conjointly operating start switch SW1 (which can be jumpered or omitted if desired) and switch 4SW, completing a circuit from conductor 108 through the emergency stop button SW2, switch SW1, switch 4SW, contact TDCR*d*, and through the winding of relay ESCR to conductor 110, operating relay ESCR.

If desired, the foregoing equipment may also be employed to initiate the energization of a separate direct-current power supply panel which is adapted to supply direct current to all of the equipment and which is herein represented by the local voltage sources, as above noted. In that event, the power transformers employed in the direct-current power supply may have their primary winding energizing circuits placed under the control of relay TDCR by inserting a normally open contact of relay TDCR in that primary circuit. To make certain that the D.C. power supply is operating before the rest of the equipment is enabled, a relay responsive to the development of the direct voltage by the D.C. power supply may be provided with a normally open contact connected in series with relay ESCR.

The operation of relay ESCR controls the firing tubes disclosed in the firing circuit shown in FIGS. 17 through 19 of the drawings, enabling the positive firing tubes, the negative firing tubes, all firing tubes, or none of the firing tubes, depending upon the setting of the control switches including switches 1SW and 3SW. Switch 3SW is an ignitron "on" or "off" control switch. Switch 1SW, the several banks of which are preferably mechanically ganged, selects the mode of operation.

Switch 1SW is provided with four normally closed contacts 1SW*a*, 1SW*c*, 1SW*e* and 1SW*g*, the latter two of which are shown in FIG. 7, and four normally open contacts 1SW*b*, 1SW*d*, 1SW*f*, 1SW*h*, the latter two of which also are shown in FIG. 7. In the illustrated, No. 1 position of switch 1SW, both the positive firing tube anode relay 4CR and the negative firing tube anode relay 5CR are capable of being operated and the two-state apparatus including tubes 75VA and 75VB in FIG. 7 (to be described) is enabled to function. In the No. 2 position of switch 1SW, contact 1SW*a* is open, contact 1SW*b* is closed, contact 1SW*c* is open, contact 1SW*d* is open, switch 1SW*e* is open, contact 1SW*f* is closed, contact 1SW*g* is open and contact 1SW*h* is open, whereby relay 4CR is subject to being operated but relay 5CR is not and whereby tube 75VB (FIG. 7) can be rendered conductive but tube 75VA cannot. In the No. 3 position of switch 1SW, contact 1SW*a* is open, contact 1SW*b* is open, contact 1SW*c* is open, contact 1SW*d* is closed, contact 1SW*e* is open, contact 1SW*f* is open, contact 1SW*g* is open, and contact 1SW*h* is closed, whereby relay 5CR is subject to being operated but relay 4CR is not and whereby tube 75VA (FIG. 7) can but 75VB cannot be rendered conductive. It will be assumed for purposes of description that switch 1SW is set in its No. 1 position, as illustrated, to permit full-cycle welding.

With the protection switches 116 closed, with the on-off switch 3SW closed, and with contacts 1SW*a* and 1SW*c* closed, upon the closure of contact ESCR*b*, both relays 4CR and 5CR will operate to enable the firing tubes as will hereinafter be described. Additionally, with manually controlled switch 2SW*a* closed, the "run" lamp 118 will be energized.

Water saver switches 122 are thermally actuated switches associated with the individual ignitrons, each such switch becoming closed if the ignitron with which it is associated becomes heated to a preselected temperature. Upon the closure of any one of the switches 122, solenoid 124 is energized to operate a water supply valve for initiating the flow of coolant to the ignitrons, lamp 120 becoming energized to indicate the fact that the water is on.

The operation of the system is under the control of a pilot switch 130 (FIG. 3) or of a low voltage pilot switch 132. If desired, a second stage pilot switch 134 may be employed. The second stage pilot may be effectively bypassed, if desired by jumpering contacts 2SCR*b* (FIG. 3) and 2SCR*c* (FIG. 4) as suggested by dotted lines. It will here be assumed that no such jumpers are provided.

Preliminary to the closing of any of these switches, the D.C. power supply is energized, applying plate voltage through load resistors 83R (FIG. 3) and 84R to the anodes of triodes 12VA and 12VB, those triodes being elements of an Eccles-Jordan trigger circuit or bistable multivibrator. The two triodes are cross-coupled in the normal fashion, the anode of section 12VA being coupled to the control grid of section 12VB by means including resistor 85R, shunted by capacitor 26C, and resistors 88R and 90R, and the anode of section 12VB is coupled to the control grid of section 12VA by means including resistor 86R, shunted by capacitor 26C, and resistors 87R and 89R. The cathode of section 12VB is directly grounded by conductor 104, while the cathode of section 12VA is connected to the ground on conductor 104 through resistor 93R and rectifier 9RE which is poled to pass conventional positive current to ground.

Resistors 85R and 90R serve as a voltage divider between the potential at the anode of section 12VA and a negative 150-volt source so that the control grid of section 12VB is held below the potential of the anode of section 12VA under all circumstances. The control grid of section 12VA is adapted to be connected to a similar voltage-divider network, but prior to the operation of the pilot switches, this circuit is not completed (as will be described) so that the control grid of section 12VA is at a higher potential than the control grid of section 12VB. As a consequence, section 12VA is rendered conductive and section 12VB is rendered nonconductive. These conditions are visibly represented by gaseous discharge diodes 136 and 138 connected (in series with individual resistors 81R and 82R) in shunt of the respective plate load resistors 83R and 84R.

The flow of plate current through section 12VA with the resultant voltage drop across cathode resistor 93R raises the voltage at the cathode of that tube to, for example, 30 volts positive, which is applied through rectifier 8RE and resistor 94R to the control grid of thyratron 10V, overcoming the normal negative 20-volt bias which is applied from the negative 20-volt source and through resistor 94R.

Tube 10V will not fire until either pilot switch 130 or switch 132 is closed. Upon the closure of pilot 130, the voltage at conductor 102 will be applied through normally closed contacts VCR*a* (contacts of relay VCR which is illustrated in FIG. 22 and which is operated only when certain trouble conditions exist as will be hereinafter described) and through now-closed contacts ESCR*c* and the winding of relay SVCR, shunted by resistor 96R, to the anode of tube 10V, the cathode of that tube being connected to the ground on conductor 104. As a result, tube 10V will ionize on the next positive half-cycle of the alternating supply voltage, and alternating-current relay SVCR will be operated and will remain operated so long as both anode voltage and the requisite position grid voltage are applied to tube 10V.

Since pilot 130, in the preferred arrangement, is connected to a 115-volt source, a low-voltage pilot 132 may be provided for safety purposes, if desired. With relay contact VCRb closed (which also is a contact of relay VCR noted above), operation of pilot 132 interconnects the secondary winding 142 of step-down transformer 4T (the primary 143 of which is connected between conductors 108 and 110) to the primary winding of step-up transformer 5T, so that the requisite voltage can be established at the anode of tube 10V without operation of switch 130.

The energization of the primary winding 143 of transformer 4T also results in the energization of secondary winding 148 (FIG. 4) of that transformer. The alternating voltage appearing across secondary winding 148 is rectified by a full-wave bridge rectifier including rectifiers 11RE to 14RE, is filtered by capacitor 40C (one terminal of which is connected to the ground at conductor 104), and the resultant direct voltage is applied to conductor 150. Since contacts 1CRe and 2CRd are closed at this time, relay 3CR, the winding of which is shunted by capacitor 43C, is operated. This normally occurs even before any of the pilot switches are closed.

Relay 3CR, in operating, opens its contacts 3CRc (at the right-hand side of FIG. 4) to disconnect the zero line 172 from the ground on conductor 104, so that a positive direct voltage in the order, for example, of 40 volts, is applied to the zero line 172 by means of a voltage-divider circuit including a positive 430-volt source, resistor 110R and resistor 109R, the zero line 172 being connected to the junction of those two resistors. Zero line 172 performs a resetting operation upon the multiple-stage counting tubes in other figures of the drawings as will hereinafter be described.

Relay 3CR, in operating, also opens its contact 3CRb (FIG. 3) to disconnect the negative 150-volt direct-voltage source from the reset conductor 146. Conductor 146 is connectible not only to the bistable multivibrator illustrated in FIG. 3 of the drawings but also to similar structures disclosed in other figures of the drawings as will be described.

Since contact 2CRc is also open at this point, there is no effective voltage connected to the lower end of grid return resistor 89R at this point in the operations, establishing the conditions for insuring that section 12VA of the bistable multivibrator will be initially conducting, as was above discussed. The absence of a negative 150-volt signal on conductor 146 also performs similar operations with respect to the other bistable multivibrators in the system.

The above-noted switch 2SWa (FIG. 2) is one of a group of mechanically ganged switches which also includes switches 2SWb, 2SWc, 2SWd and 2SWe on FIG. 3 of the drawings and switch 2SWf on FIG. 4 of the drawings. This is a two-position switch system having a "run" position and a "set-up" position. These several switches are illustrated in their "run" position and it will hereinafter be assumed that they so remain. During the set-up of the equipment, preliminary to running the machine, the shifting of the state of each of these several switches permits functions necessary to the setting-up operation to be performed and prevents sequencing from occurring, as will be apparent from the ensuing description.

With switches 2SWd closed and 2SWe open, as illustrated so that the equipment will operate normally, the closure of pilot switch 130 (or 132) completes a circuit from conductor 102 through switch 2SWd and through now-closed contact ESCRd to produce energization of relay 2CR, the winding of which is shunted by capacitor 34C. Relay 2CR, in operating, opens its contact 2CRb and closes its contact 2CRa, neither of which produces any effect under the run conditions, but which are provided to insure that relay 2CR will be held operated during set-up conditions.

Upon the operation of relay 2CR and the closure of its contact 2CRc (FIG. 3) the grid return resistor 89R at triode 12VA is connected to the negative 150-volt supply if the "repeat-nonrepeat" switch 2SW is set to the non-repeat position. If, as will here be assumed, switch 5SW is set for repeat operation, as illustrated, the operation of relay 2CR will not directly affect the voltage at the control grid of tube 12VA.

Upon the closure of the second stage pilot switch 134, relay 2SCR is operated and locks operated through its contact 2SCRa. Relay 2SCR also has a normally open contact 2SCRb in the locking circuit of relay SVCR, as will be noted, and a contact 2SCRc in the energizing circuit of relay 1CR.

When relay SVCR operates, as above described, it closes its contact SVCRa (FIG. 4) to prepare an energizing circuit for relay 1CR and it additionally closes its contacts SVCRc and SVCRd (FIG. 3) to operate solenoid SV which operates the pneumatic control valve associated with the electrode-carrying ram to initiate downward motion of that ram towards the work and engagement of the electrode with the work, as will be more fully discussed hereinafter. When the force of engagement between the electrode and the work is at a preselected value, pressure-sensitive switch 154 (a conventional and commercially available unit) (FIG. 4) is closed. This completes the previously prepared energizing circuit for relay 1CR and produces the operation of that relay.

The closure of contact 1CRa (FIG. 3) in conjunction with the closed (or shunted) condition of contact 2SCRb results in the establishment of a locking circuit for relay 2SCR including contact VCRa, and also results in the establishment of a circuit for continuing the supply of voltage to relay SVCR even though contact VCRa becomes opened as a result of the aforesaid trouble condition so that the operation of the equipment will not be terminated until the end of the cycle.

The closure of contact 1CRh (FIG. 9) results in the initiation of the operation of the forge delay panel in a manner to be described. The closure of contact 1CRc (FIG. 4) results in the application of an alternating voltage to the anode of thyratron 11V over a circuit including capacitor 31C and the primary winding of transformer 6T (shunted by resistor 99R). The opening of contact 1CRd relieves a previously existing shunt around capacitor 31C.

Prior to the operation of relay 1CR, contact 1CRf (FIG. 4) is closed, completing a circuit from the alternating voltage on conductor 108 through that contact, through rectifier 19RE, through capacitor 33C and resistor 102R in parallel with one another to return conductor 110. As a result, capacitor 33C is charged with its left-hand electrode negative relative to its right-hand electrode.

This direct voltage appearing across capacitor 33C and resistor 102R is connected in series with a phase shifted alternating voltage of lesser amplitude as produced by the network including secondary winding 156 of transformer 4T, resistor 101R and capacitor 41C, so that there appears between conductors 158 and 110 an alternating voltage which is shifted in phase with respect to and leads the alternating voltage which is applied to the anode of tube 11V plus a direct voltage of greater magnitude than the alternating voltage. Conductor 110 is connected to the cathode of thyratron 11V while conductor 158 is connected through resistor 100R to the control grid of that tube. The polarity and magnitude of the direct voltage across capacitor 33C is sufficient to prevent ionization of tube 11V. However, upon the operation of relay 1CR (FIG. 3) and the resultant opening of contact 1CRf (FIG. 4), the charging circuit for capacitor 33C is opened and that capacitor begins to discharge through resistor 102R, resulting in an exponential reduction in the magnitude of the negative biasing direct voltage across capacitor 33C. When this voltage has fallen sufficiently towards zero, thyratron 11V will fire, producing a flow of current through capacitor 31C and through the primary winding of transformer 6T.

During the positive half-cycle of applied plate energy, capacitor 31C becomes charged, and as a result, thyratron 11V becomes extinguished even though an enabling voltage is still periodically applied to its control grid. Therefore, a single pulse of energy appears across the secondary winding of transformer 6T (shunted by resistor 98R). One terminal of this secondary winding is connected to ground at conductor 104 and the other terminal is connected through negative-pulse passing rectifier 18RE to output conductor 160 which extends to and appears at both of the alternatively utilized precompression panels shown in FIGS. 5A and 5B of the drawings. This pulse initiates the operation of that panel as will be described.

As was previously discussed in connection with the FIG. 1 block schematic representation, the precompression panel circuit 2, the squeeze circuit 3, the preheat weld interval circuit 4, the weld-heat weld interval circuit 5, the quench circuit 6, the postheat weld interval circuit 7, the hold-circuit 8, and the off circuit 9 operate seriatim to control the remaining equipment to produce a weld of the preselected nature. At the termination of the hold interval, a pulse is transmitted from the hold circuit, as will be described in detail hereinafter, to initiate operation of the off circuit 9 and this same pulse is applied to conductor 162 which appears in FIG. 4. This positive-going pulse, which is transmitted at the end of the hold time, is applied through capacitor 44C and resistor 107R to the control grid of thyratron 14V. The cathode of that thyratron is connected to ground at conductor 104 and the anode of that tube is connected through a network comprising a series-interconnected capacitor 37C and primary winding 164 of transformer 7T (both of which are shunted by resistor 108R) and through now-closed contact 1CRg to the positive direct voltage appearing on conductor 150. It will be observed that reset switch 6SW is provided for connecting the anode of tube 14V to ground for resetting.

The resultant change of current through the primary winding 164 results in a corresponding current pulse in the secondary winding 166 (FIG. 3) of transformer 7T. One terminal of the transformer secondary 166 is connected to the ground at conductor 104 and the other terminal is connected through negative-poled rectifier 19RE. The resultant pulse is therefore applied to develop a voltage across resistor 91R, that is, a voltage between conductor 168 and ground. The voltage pulse appearing at conductor 168 is applied through capacitors 28C and 29C to the control grids of tube sections 12VA and 12VB. Since this bistable multivibrator has been prepared for triggering by the previously described closure of contacts 2CRc and 3CRb, this negative pulse will result in section 12VB becoming conductive and section 12VA being driven below cut-off. As a result, the voltage at the cathode of section 12VA will fall in value, carrying the voltage at the grid of thyratron 10V below the ionization potential so that at the next negative half-cycle of the voltage on conductor 102, tube 10V will become extinguished and relay SVCR will be released.

Relay SVCR, in releasing, opens its contact SVCRa (FIG. 4) to release relay 1CR. Relay 1CR, in releasing, opens its contact 1CRc (FIG. 4) to terminate the application of anode voltage to tube 11V and closes its contact 1CRd to complete a discharging circuit including resistor 97R for capacitor 31C. Relay 1CR, in releasing, also closes its contact 1CRf to re-establish the charging circuit for capacitor 33C to prepare that time delay network for subsequent operation during the next cycle. The closure of contact 1CRe partially completes the energizing circuit for relay 3CR.

The circuits of FIGS. 2, 3 and 4 remain static until the off circuit, shown as block 9 on FIG. 1 of the drawing and in detail in FIG. 6 of the drawings, has completed its count. At that time, the off circuit transmits via conductor 170 (which also appears in FIG. 4 of the drawings) a positive-going pulse which is applied through rectifier 17RE to the control grid of thyratron 13V. As a result, tube 13V is ionized to energize relay 3CR which is a direct current relay in view of the direct current supply at conductor 150.

Relay 3CR, in operating, opens its contact 3CRb (FIG. 3) to terminate the application of a negative 150-volt potential to the reset conductor 146 to reset the plural bistable multivibrators in the system. As a representative example, the termination of the application of negative 150-volt potential to conductor 146 results, with repeat operation, in a rise in the potential at the control grid of section 12VA of the bistable multivibrator illustrated in FIG. 3 of the drawings. This will result in section 12VA become conductive and result in the driving of section 12VB below cut-off, restoring the bistable multivibrator to its initial and illustrated state.

Relay 3CR has an additional normalizing function. While relay 3CR is operated, its contact 3CRc (FIG. 4) is open so that there is applied to the zero line 172 (which also appears in a number of others of the figures of the drawings) a positive direct voltage of substantial magnitude as developed across resistor 109R which is an element of the voltage divider including the positive 430-volt source, resistor 110R and resistor 109R which is connected to ground at conductor 104. Upon the release of relay 3CR, contact 3CRc closes to connect conductor 104 to conductor 172, so that the zero line is grounded for a normalizing purpose hereinafter to be described in detail.

The resetting of the multivibrator including sections 12VA and 12VB results in the re-ionization of tube 10V and the reoperation of relay SVCR which results in the re-initiation of the cycle including the operating of relay 1CR (FIG. 4) which opens its contacts 1CRe to de-energize relay 3CR to restore that relay to normal.

PRECOMPRESSION

(FIG. 5A)

It will recalled that at an appropriate point in the operation of the equipment 1 (FIG. 1), a pulse is transmitted via conductor 160 to the precompression unit 2 (FIG. 1) to set that unit into operation.

This unit serves the function of controlling the pneumatic equipment associated with the welding head and electrode to cause the electrode to engage the work with an increased force. Adjustment of the magnitude of this force is accomplished in the pneumatic control circuits (conventional and not detailed herein) rather than in the disclosed precompression unit, but the precompression unit does control the duration of time during which precompression will occur. If desired, the precompression unit may be imbued with the additional capability of delaying initiation of the next operation in the sequence for a selected period following precompression in order to insure that the force between the electrode and the work will have stabilized prior to the initiation of welding. A precompression unit possessing this capability is illustrated in FIG. 5B of the drawings and it is intended that these two units be used alternatively.

The precompression unit illustrated in FIG. 5A of the drawings comprises a multivibrator including tubes 79VA and 79VB, a relay tube 80V also serving a gating function, a tube 81VA serving as a clipper and pulse shaper, an amplifier 81VB and a pulse counter 82V. In the representative arrangement illustrated, the counter is in the form of a cold cathode glow transfer or stepping tube which may be, for example, of the type manufactured by Ericson Telephone, Ltd., of Great Britain, type GS10C. These tubes are commercially available in the United States of America. In general, stepping tube 82V comprises a plurality of cathodes designated 1 to 10, inclusive, an anode 180 common to all of those cathodes, and a first and second plurality of intermediate or transferring electrodes interposed the main cathodes 1 to 10. Since the electrodes in each of these groups of intermediate electrodes are electrically interconnected, the two groups of electrodes are, for convenience of illustration designated as single electrodes 11 and 12.

The anode 180 is connected through resistor 529R to a source of positive direct potential on conductor 182, the main cathodes numbered 1 to 9 are connected to the zero line 172 through individual load resistors 530R to 538R, respectively, and main cathode 10 is connected to ground through load resistor 539R. The tube is designed so that with the properly selected value of resistor 529R, discharge can be supported, at any one time, between the anode and but one of the main cathodes 1 to 10 so that the tube will commutate. The discharge path is advanced so that it exists between the anode and the successive cathodes by applying suitable pulses to the transfer or guide electrodes 11 and 12, the direction of advance being selected by the sequence of pulsing of those two groups of electrodes.

In the disclosed arrangement, the tube is initially set so that conduction exists between anode 180 and main cathode 10 and the discharge path is advanced from cathode to cathode in forward numerical order, the discharge first transferring from cathode 10 to cathode 1, etc. This is accomplished by applying a pulse to transfer electrodes 12 slightly in advance of the application of a pulse to transfer electrodes 11. It will be appreciated that other forms of counting devices may be employed including other forms of cold cathode gaseous discharge counting tubes and that if the direction of discharge advance is established inherently in the tube by the construction and configuration of the cathodes or otherwise, the necessity for providing two phased input pulses can be avoided.

As will be seen, the function of tube 82V is to count a plurality of serially received input pulses and to transmit an output signal when a selected number of those pulses has been received. The 60-cycle alternating line source is employed as a pulse source in the present system so that the counter 82V in effect counts cycles of the 60-cycle line frequency. (It will be observed, as a result of the ensuing description, that it is possible to utilize the clocking pulses for this purpose if that is advantageous in any particular installation.)

At the time that direct voltage is first applied to the system of FIG. 5A and before an input pulse is received, relay 3CR (FIG. 4) is operated so there is no voltage on reset conductor 146. Conductor 146 is connected through resistor 512R (FIG. 5A) and resistor 508R to the control grid of triode 79VB which is an element of a bistable multivibrator circuit also including tube 79VA. In view of the similarities between this circuit and the previously described multivibrator circuit in FIG. 3, of the drawings, a detailed redescription is not believed to be necessary.

In view of the disparity between the potentials of the control grids of triodes 79VA and 79VB resulting from the fact that relay 3CR is operated initially, conduction initially occurs in triode 79VB, section 79VA being driven below cut-off. With the precompression unit enabled as a result of the movement of switch 15SW to the "on" position, the negative pulse which is received via conductor 160 from the control panel (and more particularly from the system including tube 11V in FIG. 4 of the drawings) is developed across resistor 513R which is shunted by rectifier 194RE to bypass any received positive-going signals. The resultant voltage is applied through capacitor 204C and resistor 508R to the control grid of triode 79VB. Since the multivibrator including section 79VB has been prepared for triggering prior to the receipt of the pulse on conductor 160 by the connection of the negative 150-volt potential to conductor 146, this pulse will result in the conduction in triode 79 VB being terminated and in conduction being established in section 79VA.

The flow of plate current through cathode resistor 509R will result in a rise in potential at the cathode of section 79VA. This increased potential is applied through rectifier 190RE to the upper terminal of resistor 514R, the lower terminal of which is connected to a negative 20-volt source of biasing potential. As a result, a voltage is applied through resistor 515R to the control grid of vacuum tube 80V which is of sufficient magnitude to cause that tube to conduct upon the application of appropriate plate voltage.

The cathode of tube 80V is connected to ground and the anode of that tube is connected to a source 184 of alternating voltage (or, as noted, a clocking voltage source) through, in one branch, a rectifier 193RE and the primary winding 186 of transformer 56T shunted by resistor 518R and, in a second branch, rectifier 192RE and the winding of control relay 6CR. Relay 6CR is shunted by resistor 517R to limit current through the relay winding and the voltage developed across resistor 517R is applied across a serially interconnected current limiting resistor 516R and neon indicator diode 3NE.

As a result, half-wave current pulses of the alternating voltage frequency are applied through the winding of relay 6CR and through the primary winding 186 of transformer 56T. Relay 6CR, in operating, changes the state of its contacts (shown in FIG. 9) to perform operations to be described.

The pulsating current through the primary winding 186 of transformer 56T results in the development across the secondary winding 188 of that transformer and across resistor 520R of a pulsating wave form including positive components which are applied through the coupling network including capacitor 206C and resistor 523R to the control grid of tube 81VA. The cathode of tube 81VA is connected to ground and the anode is connected to the 430-volt source on conductor 182 through plate load resistor 525R. The input signal to that tube includes a positive pulse component each cycle of the 60-cycle alternating voltage source 184 and the magnitude of that signal is sufficient to drive tube 81VA to saturation. As a result, tube 81VA acts as a clipper, producing, essentially, one negative-going square-wave pulse each cycle of the 60-cycle line frequency. These pulses are applied through capacitor 207C and to a voltage divider network including resistors 528R and 522R and a positive 30-volt source, so that at each such pulse, the potential at the plurality of transfer cathodes 12 is abruptly reduced, producing a transfer of the discharge so that it exists between the anode 180 and the transfer electrode 12 adjacent the last conducting main cathode.

Each of the series of negative-going pulses at the anode of tube 81VA is further applied through capacitor 207C, resistor 527R, capacitor 208C, and to the zero line 172 which, as will be recalled by referring to the description of FIG. 4 of the drawings is at the this time at a potential of 30 to 40 volts positive. The time constant of the network including elements 527R and 208C is selected so that the application of a negative-going pulse to the transfer electrodes 11 will be delayed for an appropriate interval relative to the time that the pulses are applied to the transfer electrodes 12. At each such application, the discharge path in tube 82V is transferred so that it exists between the anode 180 and the next adjacent transfer electrodes 11 and, upon the termination of the negative pulse to transfer electrodes 11, conduction is established between anode 180 and the next succeeding main cathode. Since the zero line 172 is at a positive potential relative to ground for a period after the application of direct voltage to the system of FIG. 5A, initial conduction in tube 82V will occur between anode 180 and cathode 10. Prior to the receipt of the initiating pulse via conductor 160, this voltage on conductor 172 is removed so as to enable tube 82V to step. As a result, the first output pulse from tube 81VA will result in the discharge being transferred so that it exists between the anode 180 and the No. 1 cathode, and succeeding pulses will cause the discharge to transfer to the No. 2, No. 3, No. 4, etc. cathodes.

The several cathodes are connected to individual correspondingly numbered terminals of a selector switch 16SW which the operator sets in accordance with the desired precompression period. Switch 16SW is representatively shown to be set at its No. 4 position so that the precompression period will continue for a time equal to four periods of the 60-cycle-per-second supply voltage.

When the counter tube 82V has been stepped so that conduction exists between anode 180 and cathode No. 4, the rise in voltage due to the drop across resistor 533R will be applied through switch 16SW, capacitor 209C, resistor 524R and to the negative 20-volt biasing potential for tube 81VB. As a result, the grid potential at that tube is raised to render tube 81VB conductive, its cathode being connected to ground and its anode being connected to the positive 430-volt potential on conductor 182 through plate load resistor 526R. As a result, a negative-going reset pulse is applied via conductor 192 and through capacitors 211C and 203C and resistor 507R to the control grid of section 79VA of the multivibrator. It will be observed that the junction of capacitors 211C and 203C is connected to ground through a rectifier 195RE, which is poled to pass any positive signals appearing at the left-hand electrode of capacitor 211C to ground.

This reset pulse causes the multivibrator to be triggered back to its initial state, with section 79VB conducting and section 79VA nonconducting. The resultant fall in the potential at the anode of tube 79VB is applied via conductor C3 to the squeeze unit 3 (FIG. 1) to initiate operation of that unit.

The termination of conduction through triode 79VA also results in a fall in the potential at the cathode of that tube, terminating conduction of tube 80V and resulting in the release of relay 6CR. The resultant shifting of state of the contacts of that relay terminates the increased precompression pressure. The rendering of tube 80V nonconductive also terminates the application of pulses to tube 82V, and the equipment illustrated in FIG. 5A remains in this condition until the end of the "off" time. It will be recalled that at that time, relay 3CR (FIG. 4) is reoperated to restore the positive potential to the zero line 172, resetting tube 82V, and to open the reset conductor 146, insuring that triode 79VB will remain conductive and triode 79VA will remain nonconductive preparatory to the next utilization of the precompression unit.

PRECOMPRESSION WITH DELAY (FIG. 5B)

If the alternative unit shown in FIG. 5B be employed, the control by the unit shown in FIGS. 2 to 4 is the same and the output signal to the squeeze unit is also the same except for the interposition of an additional delay. In the same manner as was above discussed in connection with FIG. 5A, relay 3CR (FIG. 4) is initially operated so that the reset conductor 146 (FIG. 5B) is open to insure that the multivibrator including sections 79VA' and 79VB' will become initially conducting on its right-hand side, with section 79VA' being nonconductive, and so that a positive potential is applied to the zero line 172 to reset the cold cathode gaseous discharge stepping tube 82VB' so that conduction initially exists between the anode 180' thereof and the No. 10 cathode. And as before, the state of relay 3CR is changed prior to the receipt of an input pulse on conductor 160 so that the multivibrator including sections 79VA' and 79VB' is prepared for triggering to its other stable state and so that counter tube 82V' is prepared for stepping. Additionally, in the FIG. 5B arrangement, an additional bistable multivibrator including tube sections V1A and V1B is provided and this also must be similarly preset and accordingly the control grid of section V1B is connected through resistor R35 and resistor R41 to the the reset conductor 146 to insure that that multivibrator will also be conductive on its right-hand side, with section V1A cut off when the equipment is first powered.

The receipt of the input pulse via conductor 160 triggers the bistable multivibrator including sections 79VA' and 79VB' so that triode 79VA' is conducting and section 79VB' is cut off.

With switch SW3 closed, the conduction in section 79VA' results in the production of a negative-going pulse through capacitor C3 and switch SW3 and the grid-return resistor R41 to the negative 150-volt potential which is now applied to reset conductor 146, as above noted. This negative pulse triggers the bistable multivibrator comprising sections V1A and V1B, producing conduction in section V1A and terminating conduction in section V1B. The resultant current through section V1A produces a voltage drop across cathode resistor R42, resulting in the application of a positive voltage to the right-hand electrode of rectifier RE9 to partially enable a coincidence circuit including tube V5A.

This rise in the voltage at the cathode of section V1A also results in the development of a voltage at the control grid of thyratron V3 of sufficient magnitude to produce ionization and discharge of that tube, the cathode of thyratron V3 being connected to ground and the anode being connected to a suitable source of alternating voltage through the winding of relay 6CR' which is shunted both by a resistor R46 and by serially connected resistor R47 and indicator lamp 3NE'. If FIG. 5B is employed instead of FIG. 5A in the system, the correspondingly designated contacts shown in FIG. 9 and previously discussed, are to be a part of relay 6CR'.

Additionally, when the bistable multivibrator is triggered so that triode 79VA' is conducting and section 79VB' is cut off, there is a substantial rise in the potential at the cathode of section 79VA' which appears at the left-hand electrode of rectifier 190RE'. The other electrode of this rectifier is connected to the control grid of an amplifier triode V2A, the anode of which is connected to a positive 430-volt potential at conductor 182' through plate load resistor R16 and the cathode of which is connected to ground through biasing resistor R21. The cathode and grid of tube V2A are interconnected by resistor R19 having a high value of resistance. The control grid of tube V2A is also connected through rectifier RE7 to a point on a voltage divider circuit including a source of 60-cycle-per-second alternating voltage 184', and resistors R14 and R15.

Prior to the triggering of the multivibrator including sections 79VA' and 79VB', the left-hand electrode of rectifier 190RE' is essentially at a relatively low positive potential (approaching ground potential). The cathode of tube V2A is at a substantial positive value since it is connected both to ground through resistor R21 and to the positive 430-volt potential on conductor 182' through resistor R17. As a result, a substantial current flow exists from the positive voltage at the cathode of tube V2A, through resistor R19 and through rectifier 190RE' and through resistor R5 to ground, the voltage drop across resistor R19 being sufficient to bias tube V2A below cutoff.

When the multivibrator is triggered so that section 79VA' becomes conducting, the potential at the left-hand electrode of rectifier 190RE' attains a substantial positive value. The potential difference across resistor R19 is thereby reduced so that tube V2A is rendered conductive, the grid-to-cathode voltage being well above the point of grid cut-off, so that the degree of conduction is substantial. As a result, the series of negative-going pulses which are applied to the control grid of tube V2A by the halfway rectification of the alternating voltage appearing across resistor R15 by rectifier RE7 are amplified by tube V2A, resulting in the production of a series of positive-going pulses at the anode of that tube and consequently at the control grid of tube V2B.

The cathode of tube V2B is connected to ground and the anode is connected to the positive 430-volt potential on conductor 182' through plate load resistor R18, and the tube is driven to saturation by the input signal so that it acts as a clipper, applying a series of negative-going pulses through capacitor C30 and via a coupling network including resistors R23 and R24, to the No. 12 transfer electrodes of counting tube 82V' and through a coupling network including resistors R22 and capacitor C9 to the No. 11 transfer electrodes of that tube, the application of each pulse to transfer electrodes 11 being delayed relative to the application of the pulses to transfer electrodes 12 by virtue of the time delay effects of the network including resistor R22 and capacitor C9.

Tube 82V' counts in a manner similar to that previously discussed in connection with FIG. 5A, with the duration of the precompression period being selected by appropriate setting of switch 16SW', which is representatively set to the No. 3 position. When the count is advanced to the No. 3 cathode, the voltage at that cathode rises, resulting in the application of a positive pulse through capacitor C10 to the upper electrode of rectifier 8RE, the other electrode of which is connected both to the control grid of tube V5A and, through resistor R36, to the midpoint of a voltage divider including the 430-volt supply, resistor R28 and resistor R38.

The application of a positive potential both to the upper electrode of rectifier RE8 and the right-hand terminal of rectifier RE9 establishes coincidence and results in the voltage drop across resistor R36 being reduced to the point where triode V5A will conduct, desirably to saturation. The potential drop across plate load resistor R29 will result in a reduction in the potential at the anode of tube V5A and the application of a negative pulse to the control grid of multivibrator section V1A through the coupling circuit including capacitor C12 and resistor R40. As a result, section V1A is driven below cut-off and section V1B is rendered conductive, restoring the multivibrator to its initial condition. The termination of conduction through section V1A reduces the potential at the control grid of thyratron V3 so that at the next half-cycle of the applied alternating plate voltage, relay 6CR' releases, resulting in a reversal of the state of the contacts of that relay in FIG. 9, terminating precompression.

The establishing of conduction in section V1B results in the application of a negative-going pulse through capacitor C15 and through resistor R539 to the No. 10 cathode of the counter tube 82V', resetting that tube to zero in preparation for the counting of the delay-after-precompression interval. Conduction through tube V1B further results in the production of a positive voltage at the cathode of that tube which is applied to the left-hand electrode of rectifier RE11 establishing one of the elements of the coincidence required to render tube V5B conductive.

Since the state of the multivibrator including sections 79VA' and 79VB' has not been changed, pulses to be counted continue to be applied to the counter tube 82V' so that counting proceeds without loss of any of the input pulses. The duration of the delay-after-precompression period is established by the setting of switch SW17, representatively set to the No. 3 terminal in the drawing. Therefore, when conduction has been stepped so that it exists between anode 180' and the No. 3 cathode of tube 82V', a positive signal is applied through switch SW17 and through capacitor C11 to the upper terminal of rectifier RE10. This completes the coincidence, driving tube V5B to saturation.

The resultant drop in potential at the anode of tube V5B is applied through capacitor C16 and resistor R7 to trigger the multivibrator back to its original condition in which section 79VB' is conducting and section 79VA' is not conducting. The resultant rise in potential at the anode of section 79VA' is communicated through capacitor C17 to the control grid of tube V5B to insure that that tube remains fully conductive for the requisite period.

Conduction in tube V5B also results in the transmission of a negative-going pulse through capacitor C16 and rectifier RE4 and resistor R539 to the No. 10 cathode of tube 82V' to reset that tube. In the meantime, the termination of conduction through multivibrator section 79VA' has terminated the coincidence at tube V2A so that the application of pulses to the transfer electrodes of tube 82V' has terminated, whereby that counter tube remains reset at zero.

As was described in connection with FIG. 5A, the apparatus remains in this condition until the termination of the off time at which the application of a negative 150-volt potential to the reset conductor 146 is terminated to insure that the multivibrators are reset with conduction occurring in section 79VB' and V1B in preparation for the next cycle of operation. The application of a positive voltage to the zero line 172 at this same time also insures that tube 82V' is reset to its zero cathode.

COUNTERS

(FIG. 6)

The general nature and functioning of the counters employed in units 2 through 9, including a discussion of the connections between each such unit and other elements of the system, was above presented as a part of the general description of the system.

The unit illustrated in FIG. 6 includes a bistable multivibrator comprising two triode sections or tubes 4VA and 4VB, a thyratron 5V, switching tubes 6V and 7VA, a coincidence tube 7VB, and counting tubes 8V and 9V. The bistable multivibrator and counting tubes are similar to those previously described.

When power is first applied to the unit shown in FIG. 6, reset conductor 146 is not connected to a negative 150-volt potential (as was previously discussed in connection with FIG. 3 of the drawings) so that the multivibrator initially conducts on its right side, that is, section 4VB is conducting and section 4VA is not conducting. At this same time, the zero line 172 is at an appreciable positive voltage which is applied to the Nos. 1 to 9 cathodes of tubes 8V and 9V through the provided individual cathode resistors. As a result, it is insured that both of those tubes will be reset so that conduction exists between their anodes and their No. 10 cathodes. When the pilot switch in FIG. 2 is closed, a negative 150-voltage is applied to reset conductor 146, as before described, to prepare the multivibrator for triggering and the zero line 172 is grounded to enable the counting tubes 8V and 9V to count.

When a negative-going pulse is applied to the control grid of section 4VB from terminal lead C and via a coupling network including capacitor 20C, resistor 29R (shunted by rectifier 16RE for positive-pulse suppression), capacitor 10C, resistor 30R and resistor 32R, the multivibrator is triggered so that section 4VA becomes conductive and section 4VB is cut off. This triggering results in an increase in the voltage at terminal lead A (producing a positive pulse through each of the capacitors 206 and 208 which are connected to ground through rectifiers 210 and 212, respectively), a reduction in the potential at the cathode of section 4V and hence at terminal lead J to approximately ground potential, a reduction in the potential at the anode of section 4VA and hence at terminal lead B and a rise in potential at the cathode of section 4VA and hence at terminal lead G. Neither the rise in potential at terminal lead A nor the fall in potential at terminal lead J is employed to perform any useful function in the system as disclosed.

The fall in potential at terminal lead B, at this time, is utilized only in the weld head weld interval unit 5 (FIG. 1) in which case terminal lead B5 is connected to the forge delay unit 13 to signal that unit that the counting of the weld interval is being initiated. In the squeeze interval unit 3, the postheat weld interval unit 7 and the hold-time unit 8, terminal lead G is connected only to its associated terminal lead H, while in the case of the off-time unit 9, those terminals are not only interconnected (terminal lead G9 being connected to terminal lead H9) but also those two terminal leads are connected to conductor 162 to transmit to the sequence and control panel 1 of the previously described signal connoting the beginning of off-time and hence, as will be seen, the termination of hold-time. Terminal lead G4 in unit 4 is connected to the preheat cool and heat unit 11, terminal lead G5 of unit 5 is connected to the weld heat cool and heat unit 12, and terminal lead G7 of the postheat weld interval unit 7 is connected to the postheat cool and heat unit 14, so that each of the units 11, 12 and 14 receives a signal when its associated counter 4, 5 and 7, respectively, commences counting.

With terminals G and H (FIG. 6) interconnected as they are in the case of units 3, 6, 8 and 9, as above noted, the rise in potential at the cathode of unit 4VA is applied, as a direct voltage to the junction of resistors 74R and 75R, the upper terminal of the former being connected to the control grid of thyratron 5V and the lower terminal of the latter being connected to a negative 20-volt source of potential to maintain thyratron 5V extinguished in the absence of the input signal. The cathode of thyratron 5V is connected to ground through appropriately poled rectifier 6RE.

The anode of thyratron 5V is connected to terminal lead K through the primary winding 214 of transformer 2T. In the preheat weld interval unit 4 (FIG. 1), the weld heat weld interval unit 5, and the postheat weld interval unit 7, terminal K is connected to conductor 200 at the phase inverter 10 over which is supplied a 60-cycle alternating voltage having a preselected (but variable) relationship to one phase of the three-phase welding voltage as will be described, and units 4, 5 and 7 consequently operate in response to that voltage, herein termed a clocking signal or voltage. In the remaining similar units, terminal leads K and L are interconnected and consequently a 60-cycle-per-second alternating voltage is applied from source 216 through primary winding 214 to the anode of thyratron 5V.

Upon the receipt of the signal from the cathode of section 4VA of the multivibrator, thyratron 5V is rendered conductive and the resultant pulsating plate current flow through the primary winding 214 of transformer 2T will result in the induction in the secondary winding 220 of that transformer, the lower terminal of which is grounded, of a pulsating signal which is developed across a voltage divider including resistor 35R and 36R. The pulsating voltage appearing across resistor 36R is applied to the control grid of vacuum tube 6V through a coupling network including capacitor 12C and resistor 37R, the lower terminal of which is returned to a negative 20-volt source of biasing potential.

It will be recalled that in units 4, 5 and 7, terminal lead G is not connected to terminal lead H (terminal leads H4, H5 and H7, respectively). In each of those cases the firing of thyratron 5V and the resultant production of pulses at the secondary winding 220 of transformer 2T (FIG. 6) is produced by the application of positive pulses to terminal lead H from the associated cool-heat panel. Thus, at an appropriate time (e.g., at the end of each heat interval) the preheat cool and heat unit 11 applies a positive pulse via conductor H4 to the preheat weld interval unit 4, at an appropriate time the weld heat cool and heat unit 12 applies a positive pulse via terminal lead H5 to the weld heat weld interval unit 5, and at an appropriate time the postheat cool and heat unit 14 applies a positive pulse via terminal lead H7 to the postheat weld interval unit 7. Each of these pulses produces conduction in tube 5V for one-half cycle of the clocking signal, as will be further discussed hereinafter in connection with FIG. 10 of the drawings.

The operation of the guide or transfer-cathode switching tube 6V is similar to, for example, the operation of tube 81VA previously described in connection with FIG. 5A of the drawings. The input signal applied to the control grid of this tube is an alternating signal, the positive half waves of which are reasonably undistorted from the sinusoidal form, and the negative half waves of which are substantially distorted and tend to be peaked. The cathode of tube 6V is connected to ground and the anode is connected to the positive 430-volt potential on conductor 222 through load resistor 38R. At each positive-going undulation of the input voltage to tube 6V, the anode of that tube falls in potential, resulting in the application of a negative-going pulse to guide or transfer cathode 12 of tube 8V via a network including capacitor 13C, resistor 40R and resistor 41R which is connected to a positive 30-volt source of biasing potential. As a result conduction in tube 8V transiently exists between the anode thereof and electrode 12. The same reduction in anode potential of tube 6V results in the application of a negative-going pulse to guide or transfer cathode 11 of tube 8V via a circuit including capacitor 13C, resistor 39R and capacitor 14C, the lower terminal of which is connected to the zero line 172, which at this time is at an appropriate positive potential. This sharp negative-going pulse applied to guide electrode 11 is delayed in time with respect to the negative-going pulse applied to guide electrode 12 by virtue of the time constant of the network including resistor 38R and capacitor 14C. Since the pulse at guide electrode 12 has become partially reduced in magnitude by the time the peak of the negative pulse is applied to guide electrode 11, the discharge in the tube 8V is transferred so as to exist between the anode and the transfer electrode 11. As the pulse on transfer electrode 11 attenuates, the discharge is transferred so that it exists between the anode and the next succeeding main cathode, which, at the first pulse, is main cathode No. 1.

Tube 8V will remain in this condition until the next succeeding pair of time-spaced pulses is applied to guide electrodes 12 and 11 which will result in the discharge in the tube being transferred so as to exist between the anode and the No. 2 main cathode. Stepping occurs in response to the applied input pulses until the discharge path includes the one of the main cathodes of the tube 8V which is connected to the movable element of switch SW15.

Switch SW15 is illustratively shown set to its No. 3 position so that when conduction occurs between the anode and the No. 3 cathode of tube 8V, the positive potential appearing at that cathode as a result of the potential drop across cathode resistor 55R is communicated to the upper electrode of rectifier 4RE. As will be seen, this rectifier is an element of a coincidence circuit including tube 7VB. Since the other requisites for coincidence have not been established, the existence of conduction between the anode and the No. 3 cathode of the units counter 8V at this time will produce no useful effect.

As a consequence, counting will continue, the discharge in tube 8V being successively stepped to the No. 4, No. 5, No. 6, No. 7, No. 8, No. 9 and to the No. 10 main cathode. The resultant rise in potential at the No. 10 cathode of tube 8V is applied, independently of the setting of switch SW15, as a pulse to the control grid of guide-switching tube 7VA through a network including capacitor 15C and resistor 42R, the lower terminal of resistor 42R being returned to a negative 20-volt source of biasing potential. The cathode of triode 7VA is connected to ground and the anode is connected to the positive 430-volt potential on conductor 222 through load resistor 43R, so that the incoming pulse causes switching tube 7VA to become abruptly conductive. As a result, time-spaced negative-going pulses are applied to guide electrodes 12 and 11 of the tens counter 9V by means of circuitry similar to that just described in connection with tube 6V, that circuitry including resistors 45R and 46R and the RC network including resistor 44R and capacitor 17C. As a result, the discharge in the tens counter tube 9V is transferred so that it exists between the anode of that tube and the No. 1 main cathode, producing a registration of the fact that ten input pulses have been received and counted.

It will be observed that upon the initial application of potential to the system, conduction exists between the anode and No. 10 cathode of tube 8V, tending to produce a pulse of energy through tube 7VA to the guide electrodes of tube 9V. However, at this time the zero line is at a substantial positive potential so that transfer cannot occur in the tens counter 9V. By the time the zero line is grounded to prepare the counters 8V and 9V to operate, capacitors 15C, 16C and 17C will have been charged to the new value. When the discharge is transferred from the No. 10 cathode of units tube 8V, the only possible effect is the production of a positive signal by tube 7VA which will not affect the condition of the tens counter tube 9V.

At the next succeeding pulse, discharge will be transferred in the units counter tube 8V so as to exist between the anode and the No. 1 cathode thereof and successive input pulses will result in the successive transfer of the discharge from cathode to cathode. When the transfer again exists between the anode and the No. 10 cathode, another signal will be transmitted by tube 7VA to produce a stepping of the discharge in the tens counter tube 9V so that it exists between the anode and the No. 2 cathode. When this occurs, the potential at the No. 2 cathode of the tens counter tube 9V rises due to the potential drop across cathode resistor 64R, and this positive potential is communicated through switch SW16, which has been set to its No. 2 position, to the upper electrode of rectifier 5RE, partially enabling the coincidence circuit including tube 7VB. The units tube continues to count the following three incoming pulses, after the receipt of which the discharge path will include the anode and the No. 3 cathode of the units tube 8V. Since the coincidence circuit including tube 7VB has already found one of the two requisite elements for coincidence, the application of a positive potential to the upper electrode of rectifier 4RE will complete the requirements for coincidence, and tube 7VB will be rendered conductive.

The operation of tube 7VB may best be understood by observing the conditions which exist when that tube is not conducting and when the discharge path in the units tube 8V does not include the No. 3 cathode and the discharge in the tens counter tube 9V does not include the No. 2 main cathode. Under these conditions, the potential at the cathode of tube 7VB is determined primarily by a voltage-divider network including the 430-volt potential on conductor 222, resistor 49R and resistor 48R, the lower terminal of which is connected to the now-grounded zero line 172. The sizes of resistors 49R and 48R are selected so that a positive potential of appropriate value exists at the cathode of the tube 7VB and across resistor 48R and its bypass capacitor 18C, this potential being, for example, in the order of 30 volts with respect to ground. The 30-volt potential at the cathode of tube 7V results in the flow of current through resistor 47R and, via one path, through unidirectional current conducting device or rectifier 5RE, No. 2 contact of switch SW16, and through resistor 64R to the ground potential at the zero line 172, and, via a second path, through unidirectional current conducting device or rectifier 4RE, No. 3 contact of switch SW15, resistor 55R and to the now-grounded conductor 172. The resistance of resistor 47R is many times greater than the resistance of either resistor 55R or 64R, and, in a practical embodiment of the invention, was selected to have a value of 4.3 megohms. As a result, a major portion (e.g., 25 volts) of the 30-volt potential difference between the cathode of tube 7VB and ground appears across resistor 47R, biasing tube 7VB negatively. The magnitude of the voltage appearing across resistor 47R is reduced whenever the potential at either the No. 3 cathode of units tube 8V or the No. 2 cathode of the tens tube 9V rises during the count of the pulses. But in the absence of both cathodes being included in the respective discharge paths in tubes 8V and 9V, the voltage appearing across resistor 47R is still sufficient to maintain tube 7VB nonconductive. However, when the discharge path in units tube 8V includes the No. 3 cathode at the same time that the discharge path in the tens counter tube 9V includes the No. 2 cathode of that tube (with the shown switch settings), the voltage difference between the cathode of tube 7VB and the No. 3 cathode of tube 8V and the No. 2 cathode of tube 9V is reduced substantially to zero so that tube 7VB reaches or approaches a condition of zero bias and hence conducts substantially to saturation, producing a large voltage drop across the plate load resistor 50R which is connected to the 430-volt potential on conductor 222.

The abrupt reduction in potential at the anode of tube 7VB results in the application of a negative-going pulse through capacitor 19C to terminal lead F. In all illustrated units except unit 5 (FIG. 1) terminal lead F is connected to terminal lead E so that the negative-going pulse is developed across resistor 76R, resistor 76R being shunted by rectifier 17RE poled to bypass to ground the positive pulses which appear on conductor 224 when conduction terminates in tube 7VB. The pulse voltage appearing across resistor 76R is applied through capacitor 9C and through resistor 31R to the control grid of multivibrator section 4VA, triggering the multivibrator back to its original state in which conduction occurs in section 4VB and does not occur in section 4VA.

In unit 5 (FIG. 1) the pulse at terminal lead F (lead F5, FIG. 1) is applied via terminal lead F12 to the weld heat panel 12 which, at an appropriate time, transmits a pulse via its terminal lead E12 to terminal lead E5 of unit 5 (lead E on FIG. 6) to produce the restoration to normal of the multivibrator including sections 4VA and 4VB.

This reversal of state of the bistable multivibrator results in an abrupt rise of potential at terminal lead B which produces no useful function), and an abrupt rise in the potential at terminal lead J. This positive potential appearing at terminal lead J is utilized only in connection with the off-time unit 9 (FIG. 1), in which case it is used as a positive signal indicative of the completion of off-time and applied via conductor 170 to the sequence and control panel 1 and, more particularly, to the control grid of thyratron 13V (FIG. 4) to fire that thyratron to operate relay 3CR, as was before described. This results in the application of a positive voltage to the zero line 172 to reset the units and tens counter tubes 8V and 9V in all of the FIG. 6 units and in the removal of the negative 150-volt potential from reset conductor 146 to insure that section 4VB of the multivibrator in all of the FIG. 6 units will be conductive.

The abrupt fall in potential at the anode of tube 4VB as a result of the restoration of the multivibrator to its initial state is or may be employed (via capacitors 206 and 208) to reset the units and tens counter tubes 8V and 9V in each of the other counters 3 through 8 (FIG. 1) at the termination of their individual operations, since it is only at the end of off-time that relay 3CR is operated to perform the resetting operation by changing the potential on the zero line 172.

Additionally, the reduction in potential at the anode of tube 4VB (FIG. 6) is applied to terminal lead A as an output signal which is transmitted to the next succeeding unit 4 to 9 (FIG. 1) in the sequence. Thus, terminal lead A3 of the squeeze interval counter 3 is connected to input lead C4 of the preheat weld interval counter 4; output terminal lead A4 of the preheat weld interval unit 4 is connected to input lead C5 of the weld heat weld interval unit 5; output lead A5 thereof is connected both to lead C6 and to the forge delay unit 13; output terminal lead A6 of the quench interval timer 6 is connected to the input lead C7 of the postheat weld interval timer 7; terminal lead A7 from unit 7 is connected to the input lead C8 of the hold-time unit 8, and output terminal lead A8 of the hold-time unit 8 is connected to the input terminal lead C9 of the off-time unit 9, in each case, the lead A signal serving to initiate operation of the counter to which it is applied. It will be apparent that any step in the sequence may be omitted by switching of the above noted connections.

The reduction in the potential at the cathode of tube 4VA upon the resetting of the multivibrator, results in the termination of the application of a discharge potential to thyratron 5V if terminal lead G is connected to terminal lead H. In the cases of units 4, 5 and 7 (FIG. 1) the application of a firing voltage to terminal lead H is terminated by units 11, 12 and 14, respectively.

The extinction of thyraton 5V at the next negative half-cycle of the applied alternating plate voltage results in the termination of the production of a voltage across secondary winding 220 of transformer 2T and a termination of the input signal to guide switching tube 6V. As a result, the system of FIG. 6 is fully reset and is prepared for the next cycle of its operation.

It has been found that under certain circumstances it is advantageous to apply the pulses from units 11, 12 and 14 to the D-series terminal leads rather than to the H-series terminal leads of units 4, 5 and 7. To make this change, the designations H4, H5 and H7 in FIG. 1 should read D4, D5 and D7, respectively, with no connection being made to the H-series leads. It will be observed that with this change it is also not necessary to connect the source of clocking voltage to units 4, 5 and 7.

PHASE INVERTER

(FIG. 7)

It will be recalled that the preheat weld interval unit 4 (FIG. 1), the weld heat weld interval unit 5, and the postheat weld interval unit 7 control the operation of the phase inverter 10 and that an alternating voltage was supplied via conductor 200 to those same units 4, 5 and 7 from the phase inverter 10, that alternating voltage being termed a clocking signal and serving to synchronize the operation of those counting units with the welding currents. The phase inverter 10, also supplies via conductor 202 a clocking signal which is 180° out of phase with the signal on conductors 200 to the preheat cool and heat unit 11, to the weld heat cool and heat unit 12, to the forge delay unit 13, and to the postheat cool and heat unit 14 for purposes which become apparent in the ensuring description. The details of a suitable phase inverter circuit are illustrated in FIG. 7 of the drawings.

The function of the equipment illustrated in FIG. 7 is to supply to various of the control units an alternating voltage having a predetermined phase relationship to the welding current. To establish the requisite relationship, the primary winding 230 of a dual secondary transformer 52T is connected to one of the three phases of the welding voltage, representatively to the phase C voltage (as it appears between conductors 501 and 503 in FIG. 15 of the drawings). Secondary windings 232 and 234 of transformer 52T are 180° out of phase with one another and are connected, respectively, to the two independent primary windings 236 and 238 of an output transformer 53T. As will be seen, means are provided for alternatively enabling the current path including windings 232 and 236 or the current path including windings 234 and 238 so that the primary windings 236 and 238 of transformer 53T are only employed alternatively. Windings 236 and 238 are wound upon a common core with secondary windings 240 and 242, so that current through either of the windings 236 and 238 will induce alternating currents in both of the secondary windings 240 and 242. Secondary winding 240 is connected across resistor 479R and between ground and terminal lead 200, whereas secondary winding 242 is connected across resistor 480R and between ground and terminal lead 202. As a result, whenever the unit is in operation, alternating voltages which are 180° out of phase with one another are applied between the terminal leads 200 and 202 and ground. Whether it is the alternating voltage appearing between conductor 200 and ground or the alternating voltage appearing between conductor 202 and ground which is in phase with the C phase welding voltage will be determined by whether it is primary winding 236 or primary winding 238 which is energized at any given time.

The energization of primary winding 236 is controlled by a circuit including thyratron 76V and the energization of primary winding 238 is controlled by means of a circuit including thyratron 77V. A negative biasing voltage is impressed across the grid to cathode input circuit of each of the thyratrons 76V and 77V. This biasing voltage is derived from a voltage divider comprising a negative 150-volt source and resistors 477R and 478R. The voltage between the upper terminal of resistor 478R and ground is applied to the control grid of thyratron 76V through resistors 475R and 473R and is applied to the control grid of thyratron 77V through resistors 476R and 474R. In the absence of the application of an additional voltage to these control grids, this negative biasing voltage is such as to maintain the thyratrons nonconductive. Means are provided for selectively applying an additional signal voltage to the control grid of one or the other of the thyratrons 76V and 77V, this control means taking the form of a bistable multivibrator including tubes 75VA and 75VB, the circuitry of which will not be described in detail in view of its similarity to the previously discussed bistable multivibrators employed in the system.

When the unit of FIG. 7 is first energized, tube 75VB is rendered conductive and section 75VA is cut off in view of the fact that reset conductor 146 is not connected to a negative 150-volt source at this time, as was previously discussed in connection with FIG. 3. Shortly thereafter, conductor 146 is connected to a negative 150-volt source to prepare the multivibrator to change state.

Selectively actuable means are also provided for controlling the operation of the multivibrator in accordance with whether the system is being employed for full-cycle welding, positive half-cycle welding, or negative half-cycle welding. In the previous discussion of FIGS. 2 to 4 of the drawings, the operation of the multiple position switch 1SW was discussed, including the ganged switch elements 1SWa to 1SWh of which switch elements 1SWe to 1SWh are shown in FIG. 7 of the drawings. As was noted in the No. 1 position of the switch in which the system is set for full-cycle welding, switches 1SWe and 1SWg are closed and switches 1SWf and 1SWh are open, the condition illustrated in FIG. 7 of the drawings. In this setting, the multivibrator including tubes 75VA and 75VB can operate normally, switching from state-to-state. For positive half-cycle welding, the switch is moved to a position in which contact 1SWf is closed and contacts 1SWe, 1SWg and 1SWh are all open. In this setting section 75VB will conduct upon the initial application of voltage to FIG. 7 so that, as will be seen, thyratron 76V will be fired. However, section 75VA cannot become conductive since its cathode circuit is open so thyratron 77V cannot be fired under this setting of switch 1SW. For negative half-cycle welding, the switch is moved to a position in which contact 1SWh is closed while contacts 1SWe, 1SWf and 1SWg are open. In this position of the switch, tube 75VB cannot be rendered conductive, and thyratron 76V will not be fired. However, the cathode circuit for tube 75VA is closed so that thyratron 77V will be fired. Since the phase inverter circuit of FIG. 7 has primary utility during full-cycle welding, it will be assumed that the several switch sections 1SWa to 1SWh are set as shown so that the multivibrator is fully operative.

With tube 75VB conducting, a positive voltage is developed across resistor 469R and is applied through rectifier 165RE to the control grid of thyratron 76V, causing that thyratron to fire. That thyratron is connected in a full-wave bridge circuit so that it fires on both half-cycles of the input alternating voltage. Thus, when the upper terminal of secondary winding 232 of transformer 52T is positive, conventional current will flow through rectifier 167RE, through thyratron 76V, rectifier 170RE, primary winding 236 of transformer 53T and back to the lower terminal of secondary 232. When the lower terminal of secondary winding 232 is positive, during the next half-cycle, conventional current will flow through transformer primary winding 236, rectifier 168RE, thyratron 76V, rectifier 169RE, and back to the upper terminal of secondary winding 232. As a result, an alternating voltage appears across the primary winding 236 of transformer 53T and an alternating voltage is induced in each of the secondary windings 240 and 242 of that transformer.

The phase inverter will remain in this condition until a negative-going pulse is applied to one of the input terminal leads M11, M14, or M12. It will be recalled from the description of the block schematic representation of FIG. 1 that the preheat cool and heat unit 11, the weld heat cool and heat unit 12 and the postheat cool and heat unit 14 will apply negative-going pulses to terminal leads M11, M12 and M14, respectively, at appropriate points in their operation.

The first of these instances (in normal operation) occurs when the preheat cool and heat unit 11 applies a negative-going pulse to terminal lead M11 (FIG. 7). That pulse is applied through rectifier 162RE and across resistor 472R and thence via a coupling circuit including capacitor 193C and resistors 471R and 467R to the control grid of tube 75VB as well as via a coupling network including capacitor 192C and resistors 470R and 466R to the control grid of section 75VA. As a result, conduction is established in section 75VA and discontinued in section 75VB. The resultant fall in potential at the cathode of section 75VB terminates the conductivity of thyratron 76V, while the increased potential at the cathode of section 75VA is applied through rectifier 166RE and resistor 474R to the control grid of thyratron 77V to cause that thyratron to fire. Thyratron 77V operates in a full-wave bridge circuit identical to that previously described in connection with thyratron 76V, producing energization of primary winding 238 of transformer 53T. As a result, alternating voltages continue to be induced in secondary windings 240 and 242 (180° out of phase with one another) but the alternating voltage at terminal leads 200 and 202 are both shifted 180° in phase from what they were prior to the change of state of the multivibrator. It will be apparent that the extinction of thyratron 76V and the firing of thyratron 77V are simultaneous so that there is no loss of signal at the terminal leads 200 and 202, the voltage on each of those conductors effectively instantaneously changing phase 180°.

The unit of FIG. 7 remains in this condition until (again, in normal operation) an input pulse is received via terminal lead M12 from the weld heat cool and heat unit 12 (FIG. 1), which negative-going pulse is applied through rectifier 164RE (FIG. 7) to the control grids of both sections 75VA and 75VB, triggering the multivibrator back to its original state in which section 75VB is conductive and section 75VA is cut off. As a result, conduction through thyratron 77V is terminated and thyratron 76V is discharged so that the output voltage on each of the conductors 200 and 202 again instantly changes phase, reverting to the originally described phase relationship. The negative-going pulse which is applied to terminal lead M14 by the postheat cool and heat unit 14 (FIG. 1) is applied through rectifier 163RE (FIG. 7) to again trigger the multivibrator so that section 75VA is conductive and section 75VB is cut off, again shifting the phase of the output by terminating the conductivity of thyratron 76V and firing thyratron 77V. The equipment of FIG. 7 will remain in this condition until the completion of the cycle of system operation, as denoted by the re-operation of relay 3CR in FIG. 3 of the drawings to apply the resetting condition to lead 146 to set the multivibrator including sections 75VA and 75VB to its initial state.

FORGE DELAY

(FIGS. 8 and 9)

It is herein assumed that the welding machine with which the disclosed equipment is associated employs a pneumatic system to control the pressure between the welding electrode and the work, and it is furthermore assumed in accordance with customary practice, that the pneumatic control is exercised through a cylinder having a piston coupled to the electrode. Pressure on the upper side of the piston, as controlled by a valve solenoid SV (FIG. 3), tends to force the electrode toward the work while pressure on the lower side of the piston, as controlled by valve solenoid 250 (FIG. 9) tends to force the electrode away from the work. When solenoid SV is deenergized, the upper portion of the cylinder is exhausted to the atmosphere and when solenoid 250 is deenergized, air pressure is supplied to the lower portion of the cylinder. Under these conditions the electrode is raised from the work. When solenoid SV is thereafter energized (as noted above in the discussion of FIGS. 2 to 4) pressure is established in the upper portion of the cylinder which is greater in its effect than the bucking pressure in the lower cylinder portion so that the electrode is forced into engagement with the work under the herein labeled weld pressure. With the same pressure being exerted on the upper side of the piston, if the bucking pressure is dumped or relieved by energizing solenoid 250, the welding electrode will engage the work with a much greater pressure, herein termed the precompression or forge pressure. If the pressure is relieved from both sides of the piston by releasing solenoid SV and energizing solenoid 250 so that the electrode engages the work with a force determined only by its weight, a so-called tip-dress pressure is exerted. The purpose of the forge delay circuits of FIGS. 8 and 9 is to control the operation and the duration of operation of valve solenoid 250.

The forge delay circuits include a bistable multivibrator comprising tubes 16VA and 16VB (FIG. 8) for controlling three cascaded decade counter tubes 23V, 24V and 25V, a pulse generating and shaping system including tubes 17V and 18VA (FIG. 9), a tens carry tube 18VB, a hundreds carry tube 19VA, a coincidence circuit including tube 19VB, a direct voltage supply including tubes 21VA and 21VB, a forge valve solenoid control tube 22V, and a short-interval timer including tube 20V. The manual controls include three selector switches 11SW, 10SW and 9SW for setting the hundreds, tens and units digits, respectively, of the forge delay count, a pair of ganged switches 7SWa and 7SWb for establishing whether the commencement of forge delay is to be initiated at the start of squeeze time or at the end of weld time, and a plurality of ganged switches 8SWa through 8SWg forming a part of a four-position switch for setting the forge delay unit for both coarse and fine timing, for fine timing alone, for a continuous high welding electrode-to-work pressure, or for a continuously low welding electrode-to-work pressure. These switches are shown in the condition in which they are placed to establish both coarse and fine delay control, and it will be assumed during the initial description of the operation of the forge delay unit that those switches are in their illustrated positions.

When the unit of FIGS. 8 and 9 is first energized, reset line 146 (FIG. 8) is not connected to a negative 150-volt source of potential, as was previously described in connection with FIG. 3 of the drawings, so that the bistable multivibrator is initially conductive on its right-hand side, with section 16VB conductive and section 16VA nonconductive. Since the circuitry of the multivibrator is quite similar to that previously described, a detailed redescription is not believed to be necessary. Prior to the receipt of an input pulse, a negative 150-volt potential is applied to the reset line 146 to prepare the multivibrator for triggering and changing its state.

Upon the operation of relay 1CR, as previously described with reference to the sequencing and programing circuits of FIGS. 2 to 4 of the drawings, and the resultant closure of its contact 1CRh (FIG. 9), voltage is applied from source 296 through that contact and through now-closed contact 8SWe to operate relay 9CR. Relay 9CR, in operating, closes its contact 9CRa to connect plate voltage to thyratron 22V, opens its contact 9CRb to disable the discharging circuit shunting capacitor 71C, and closes its contact 9CRc to connect plate voltage to thyratron 20V.

The circuits of FIGS. 8 and 9 will remain in this condition until an input pulse is received via conductor A5 or B5 which extend from the weld heat weld interval unit 5 of FIG. 1 and which are the specific counterparts of the generic terminal leads A and B, respectively, illustrated in FIG. 6 of the drawings. As was previously discussed in connection with a representative 100-count unit (FIG. 6), a negative-going pulse is applied to conductor B5 at the beginning of the interval (in this case, the beginning of the welding interval), and a negative-going pulse is applied to conductor A5 at the end of the counted interval (in this case, the end of the weld interval). Which of these pulses is effective to trigger the multivibrator including tubes 16VA and 16VB (FIG. 8) is determined by the setting of the ganged switches 7SWa and 7SWb, and it will now be assumed that the switches are in their shown positions so that terminal lead B5 rather than terminal lead A5 is operatively connected to the forge delay unit.

When a negative-going pulse is applied to terminal B5, it is communicated through switch section SWa and capacitor 74C and developed across resistor 129R, the latter of which is shunted by rectifier 27RE to pass any positive-going pulses to ground. The pulse appearing across resistor 129R is applied to the control grid of section 16VB through a network including capacitor 53C and resistors 130R and 132R, terminating conduction in that section and thereby producing conduction in triode 16VA. Since switch 8SWb is open under the assumed conditions, the resultant change in potential at the anode of tube 16VB is not effective to produce any change in the remaining circuits on FIGS. 8 and 9. Additionally, while the abrupt reduction in potential at the anode of section 16VA resulting from its conduction is communicated through now-closed switch section 8SWc and via conductor 254 (which extends to FIG. 9), resulting in the application of a pulse to the control grid of thyratron 20V through a coupling network including capacitor 73C, resistor 164R and resistor 202R, which is returned to a negative 20-volt source of biasing potential, this pulse is negative going and will not produce any change in the nonconductive condition of thyratron 20V.

Conduction through section 16VA (FIG. 8) produces rise in the potential of the cathode of that section due to the voltage drop across cathode resistor 126R, and this increase in potential is applied to the control grid of thyratron 17V (FIG. 9) via a circuit including conductor 256, rectifier 26RE, resistor 206R (which is connected to a negative 20-volt source of biasing potential) and resistor 205R. Thyratron 17V therefore discharges since its cathode is grounded and since its anode is connected to the clocking signal on conductor 202 through the primary winding 260 of transformer 10T. This circuit and that of tube 18VA operates similarly to those previously described, with the pulsating energy in the primary winding 260 inducing a signal in secondary winding 264 of transformer 10T. The signal at the secondary winding 264 is shaped by means including capacitor 55C and resistor 137R and applied to the control grid of tube 18VA which serves a guide switching function. The positive-going portions of the input signal to tube 18VA drive that tube effectively to saturation, resulting, in a manner similar to that previously described, in the application of one negative-going spike via conductor 266 to the No. 12 guide electrodes of the units tube 23V (FIG. 8) for each positive half-wave of the signal from the source 202 and, following each such pulse, a negative-going spike via conductor 268 to the guide electrodes 11 of tube 23V.

Since in the representative illustration the forge delay is set for a count of 333 by the setting of the hundreds switch 11SW, the tens switch 10SW, and the units switch 9SW, each to the No. 3 terminals, tube 18VA will continue to apply pulses to the units tube to step the discharge in that tube from cathode to cathode repetitively and cyclically. Each time the discharge path in tube 23V includes the No. 10 cathode, a positive voltage is applied via conductor 270 and to the control grid of tube 18VB via a coupling network including capacitor 58C and resistor 142R, the lower end of which is returned to a negative 20-volt source of biasing potential. Tube 18VB and its associated circuits transmit a negative-going pulse via conductor 272 to the No. 12 guide electrodes of the tens tube 24V and, slightly thereafter, a negative-going pulse via conductor 274 to the No. 11 guide electrodes of that tens counter tube, tube 18VB operating similarly to tube 18VA. As a result, conduction in the tens counter tube is stepped so as to exist between the anode and the No. 1 cathode. Thereafter, each time the units tube has completed its count of ten, the tens tube will be stepped once. Similarly, when the discharge path in the tens counter tube 24V includes the No. 10 cathode, a positive voltage is applied via conductor 276 and a coupling network including capacitor 61C and resistor 147R to the control grid of the hundreds-carry tube 19VA, resulting in the application to the No. 12 and No. 11 guide electrodes of the hundreds tube 25V and via conductors 278 and 280 of a pair of time-spaced negative-going pulses to step the hundreds tube 25V so that conduction is established between the anode and the No. 1 cathode thereof.

Counting continues in this manner until the conduction in the hundreds tube 25V exists between the anode and the No. 3 cathode thereof at the same time that conduction exists in the tens and units tubes 24V and 23V between the anodes and the No. 3 cathodes thereof. When these events concur, positive voltages are applied through switches 9SW, 10SW and 11SW, and via conductors 282, 284 and 286, respectively, to the upper electrodes of the rectifiers 29RE, 30RE and 31RE, respectively.

These rectifiers are elements of a three-condition "and" circuit similar to the two condition "and" circuit hereinbefore described. Resistor 152R has a high value of resistance so that the current flow therethrough is sufficient, if any one of the rectifiers 29RE, 30RE and 31RE is connected effectively to ground potential as a result of the lack of conduction at its associated cathode, to maintain tube 19VB cut off. However, with coincidence being met, the magnitude of the current flow through and the magnitude of the voltage drop across resistor 152R is reduced to the point where tube 19VB conducts, producing a drop in the potential at the anode of that tube as a result of the voltage drop across plate load resistor 153R. This change of potential in the negative direction is transmitted to the control grid of tube 16VA (FIG. 8) via conductor 290 and a network including capacitors 66C, 52C and resistors 165R, 128R and 131R, resulting in the termination of conduction in tube 16VA and a reinitiation of conudction in tube 16VB.

The termination of conduction through tube 16VA results in a reduction of the voltage appearing between conductor 256 and ground to approximately ground potential, permitting thyratron 17V to terminate conductivity at the next negative half-cycle of the supply voltage, and consequently terminating application of the pulses to counter tubes 23V, 24V and 25V, by guide switching and carry tubes 18VA, 18VB and 19VA.

The rise in positive potential at the anode of section 16VA at the termination of conduction in that tube is applied through now-closed switch 8SWc and via conductor 254 to produce the application of a positive pulse to the control grid of thyratron 20V (FIG. 9) by virtue of the action of the coupling network including capacitor 73C, resistor 202R (returning to a negative 20-volt biasing potential), resistor 164R and resistor 163R. Thyratron 20V and its associated circuits serve to provide a "fine count" operative following the completion of the main count. The apparatus is adjustable by means of the potentiometer 1P to provide an additional delay which is selectively variable over a less than one-cycle increment, that is, in the preferred arrangement, from 0.1 to 1.0 period of the 60-cycle-per-second line frequency.

The anode of tube 20V is connected to a positive 430-volt source of potential through resistor 201R and now-closed contacts 9CRc while the cathode is connected to ground through resistor 163R so that when the tube fires, a voltage is developed across load resistor 163R which is applied across a series resistance-capacitance timing network including potentiometer 1P and capacitor 71C, shunting resistor 162R having been disconnected by virtue of the opening of contact 9CRb, as above described. As a result, capacitor 71C will charge at an exponential rate determined by its size and the setting of potentiometer 1P, it being observed that thyratron 20V remains conductive since its anode is supplied with a direct voltage.

The rise in voltage across capacitor 71C is applied through resistor 159R to the control grid of thyratron 22V. The anode supply for thyratron 22V is derived from a direct-current supply system including gaseous discharge tubes 21VA and 21VB which are connected as a full-wave rectifier of the alternating voltage appearing across the center-tapped secondary winding of transformer 9T, the primary voltage of which is supplied by a source 292. As a result of the rectifying action of these tubes and the filtering action of resistors 160R and 161R and capacitor 68C (which preferably has a high value of capacitance) a direct voltage is developed between conductors 294 and 296, the latter of which is connected to the center tap of the secondary winding of the transformer 9T as well as to the movable element of a potentiometer or variable voltage divider 2P. The resistive element of potentiometer 2P is connected, in series with resistors 166R and 167R, between the positive 430-volt source of potential and ground so that conductor 296 will be at a positive voltage relative to ground determined by the setting of potentiometer 2P. Since conductor 294 will be positive relative to conductor 296 by a relatively fixed value determined by the rectifier circuit, conductor 294 will be positive relative to ground by an amount equal to the sum of the voltage across resistor 161R and the voltage between conductor 296 and ground.

With relay 9CR operated so that contact 9CRa is closed (shunting capacitor 67C and resistor 156R), the positive voltage appearing at conductor 294 is applied to the anode of thyratron 22V through the winding 250 of the solenoid which controls the forge valve. Since the cathode of thyratron 22V is connected to conductor 296, the point in time at which thyratron 22V will fire is determined not only by the voltage developed across capacitor 71C but also by the initial setting of potentiometer 2P, the latter of which is provided primarily for calibrating purposes. When the grid-to-cathode potential of thyratron 22V reaches the requisite value, that thyratron will discharge, operating the solenoid 250 of the forge valve. It will be observed that the initial current flow will be relatively large due to the initial discharging of capacitor 68C, insuring that the forge valve will be operated immediately upon the firing of thyratron 22V.

The circuits of FIGS. 8 and 9 will remain in this condition until the end of the weld sequence, at which time the circuits of FIGS. 2 to 4 function as previously described and serve to shift the voltages upon the reset line 146 and upon the zero line 172, as previously discussed, to reset the circuits of FIGS. 8 and 9. Additionally, the release of relay 1CR (FIG. 4) and the resultant opening of its contact 1CRh (FIG. 9) results in the release of relay 9CR. Relay 9CR, in releasing, opens its contact 9CRa to extinguish thyratron 22V, closes its contact 9CRb to complete a discharging path including resistor 162R for capacitor 71C, and opens its contact 9CRc to extinguish thyratron 20V.

In the above described mode of operation in which the several switches 8SWa through 8SWg are set in their illustrated positions, the total delay period is determined by the setting of the switches associated with the counter tubes 23V, 24V and 25V plus the time delay established by the network between thyratrons 20V and 22V. If the switch including the above identified elements is set to its No. 2 or fine position, the tubes 23V, 24V and 25V are disabled to count, so that the total forge delay is equal to the period (in the disclosed arrangement) of one cycle of the 60-cycle-per-second line frequency or less. In this second position, switch sections 8SWb and 8SWf are closed and all of the other switch sections 8SWa and 8SWc through 8SWe and 8SWg are open. The opening of switch section 8SWa disables the counter tubes, the opening of section 8SWc with the closure of section 8SWb transfers control of thyratron 20V from the right-hand section to the left-hand section of the multivibrator including tubes 16VA and 16VB, and the opening of switch section 8SWd opens the biasing circuits for the guide electrodes of the counter tubes. Switch contact 8SWf, in closing, permits relay 9CR to be operated by contact 1CRh despite the opening of switch contact 8SWe. Switch contact 8SWg remains open so that relay 10CR will not be operated except by the precompression circuit as will be hereinafter described.

Relay 9CR, in operating, performs its previously described functions including completing the anode circuits for thyratrons 20V and 22V and relieving the discharge path around capacitor 71C. When an input pulse is received via terminal leads A5 or B5 (FIG. 8) to change the state of the multivibrator, the resultant rise in potential at the anode of section 16VB is communicated through now-closed switch section 8SWb and to conductor 254 to fire thyratron 20V. As a result, an exponentially increasing voltage is applied to the control grid of thyratron 22V which will fire after the selected delay period to operate solenoid 250, as previously described.

For continuous application of a high electrode-to-work pressure, the switch including ganged contacts 8SWa through 8SWg is set to its No. 3 position in which all of the switch contacts but switch contact 8SWg are open. Therefore, when relay 1CR (FIG. 4) operates to close its contact 1CRh (FIG. 9), relay 10CR is operated, closing its contacts 10CRa and 10CRb to complete an energizing circuit for the solenoid 250 which controls the D.C. forge valve, operating that valve, this occurring independently of and before any input signal is received by the multivibrator of FIG. 8.

For continuous low pressure to be exerted between the electrode and the work, the switch including sections 8SWa through 8SWg is switched to its No. 4 position in which all of its switch elements are open so that the solenoid 250 cannot be energized.

It will be recalled that in the previous discussion of the precompression circuit of FIG. 5A and of the precompression and delay circuit of FIG. 5B, the ultimate output signal was produced as a result of the operation of relay 6CR or relay 6CR'. A normally open contact of either of those relays is connected in the circuit of FIG. 9 and is designated contact 6CRa. When contacts 1CRh and 6CRa are both operated, relay 10CR operates immediately to operate solenoid 250 to actuate the D.C. forge valve and cause forging pressures to be applied.

For tip-dressing operation, in which the electrode engages the work with a force determined only by the weight of the welding head, switch 295 (FIG. 9) is closed to operate relay 8CR.

COOL-HEAT
(FIG. 10)

Apparatus suitable for use as either of the units 11, 12 and 14 of FIG. 1 is disclosed in FIG. 10 of the drawings. Alternatively, if it is desired to imbue the equipment with the capability of establishing a controlled current decay, an alternative unit, illustrated in FIGS. 11 to 13, may be employed. In the representative system which is diagrammatically illustrated in FIG. 1, it is assumed that cool-heat equipment such as that illustrated in FIG. 10 of the drawings are employed for the preheat cool and heat unit 11 and for the postheat cool and heat unit 14, while a cool and heat unit having the additional current decay controlling capacity, as illustrated in FIGS. 11 to 13, is assumed to be employed for the weld heat cool and heat unit 12.

It will be recalled that those one hundred-count units employed to count the squeeze interval (unit 3 of FIG. 1), to count the quench interval (unit 6), to count the hold time (unit 8) and to count the off time (unit 9) are adapted to count the successive cycles of the representative 60-cycle-per-second line frequency (or clocking signals if desired) so that in that use, the one hundred-count unit serves primarily as a timer, transmitting an output pulse a preselected time after an input pulse is received, the accuracy of the timing being determined by the accuracy of the line frequency. In the disclosed system, the preheat weld interval unit 4, the weld heat weld interval unit 5 and the postheat weld interval unit 7 do not directly act as timers but rather are employed to count the number of welding pulses during the preheat period, during the welding period and during the postheat period, respectively. As will be seen, the duration of each such welding pulse and the duration of the interpulse period between consecutive welding pulses may be adjusted and varied by means of the control units 11, 12 and 14, respectively. Therefore, a given count setting of one hundred-count unit 4, 5 or 7 will produce an interval of time which will vary in accordance with the setting of the units 11, 12 and 14, respectively.

The cool-heat unit illustrated in FIG. 10 of the drawings is, as above noted, suitable for employment as any one of the units 11, 12 and 14 in FIG. 1, and two of the FIG. 10 units are assumed to be used as units 11 and 14 of the FIG. 1 system. The equipment of FIG. 10 receives its input from the associated one hundred-count unit, the preheat cool and heat unit 11 (FIG. 1) receiving an initiating signal from the preheat weld interval unit 4 via terminal lead G4, and the postheat cool and heat unit 14 receiving its input or initiating signal from the postheat weld interval 7 via terminal lead G7, either lead G4 or G7 being generically represented as lead G in FIGS. 6 and 10 of the drawings.

In response to this direct-current input signal, the unit of FIG. 10 counts pulses derived from the clocking signals on conductor 202 from the phase inverter (FIG. 7) to measure the cooling period, and at the termination of that cooling period, the unit counts pulses derived from the clocking signal to measure the heating time. During the heating time, output signals are transmitted via conductors N and O to the heat control unit 19 (FIG. 1) as detailed in FIGS. 14 and 15, and via conductors P and Q to the phase adjusters detailed in FIG. 16. At the termination of the heat time, the unit disclosed in FIG. 10 transmits a pulse via terminal lead H (lead H4 for unit 11 and lead H7 for unit 14) to cause the associated one hundred-count unit (units 4 or 7, respectively, in FIG. 1) to make one count. At the same time, the unit of FIG. 10 transmits an output pulse (lead M11 in the case of unit 11 and lead M14 in the case of unit 14) to cause the phase inverter 10 (FIG. 1, detailed in FIG. 7) to invert the phase of the clocking signal. The unit 10 continues to function in this fashion, establishing the successive cool and heat periods, causing its associated one hundred-count unit to make one additional count at the termination of each heating period, and causing the phase inverter to reverse the phase of the clocking signal at each heating cycle.

The clocking signals received via conductor 202 from the phase inverter of FIG. 7 are developed across the primary winding 310 of transformer 91T (FIG. 10), resulting in the induction in the secondary winding 312 of that transformer of a clocking signal which is 180° out of phase with the signal on conductor 202. Since the primary function of transformer 91T is to perform this phase inversion, it will be appreciated that conductor 314, connected to the upper terminal of transformer secondary winding 312, could, if desired, be connected to conductor 200 at FIG. 7, obviating the need for transformer 91T.

The alternating voltage appearing between conductor 314 and ground is applied to the screen grid of vacuum tube 101V via a coupling circuit including capacitor 301C and resistor 601R. Normally, however, conduction is prevented in tube 101V, the tube being biased below grid cutoff by means including a negative 20-volt source of biasing potential and resistors 611R and 602R. When conductor G in the associated one hundred-count circuit (FIG. 6) becomes positive by virtue of the flow of plate current through tube 4VA of that one hundred-count circuit, the voltage at the control grid of tube 101V (FIG. 10) is shifted to the point where that tube can conduct in response to the alternating voltage signal applied to its green grid.

The pulsating voltage developed across cathode load resistor 616R is applied through a coupling circuit including capacitor 302C and resistor 612R, which is returned to a negative 20-volt source of biasing potential, to the control grid of guide switching tube 102VA. This tube operates similarly to the guide switching tubes previously described, applying time-spaced, negative-going pulses to the guide electrodes 12 and 11 of counter tube 106V. As previously discussed, one such pair of time-spaced pulses is applied to the counter tube 106V for each positive half-cycle of the alternating voltage appearing between conductor 314 and ground. As will be seen, due to the periodic inversion of the phase of the alternating voltage between conductor 314 and ground, the time interval between adjacent pairs of the pulses applied to the guide electrodes of the counter tube 106V will, upon occasion, vary. However, that interval will not vary during the course of any one series of counts.

Each of the cathodes of the counter tube 106V is connected to the terminals of a settable switch 41SW, as well as to the terminals of a settable switch 42SW, the former switch being selectively positioned to establish the number of counts in the cool interval and the latter switch being selectively positionable to establish the number of counts in the heat interval. In the disclosed representative arrangement, but a single counter tube is disclosed in FIG. 10 although it will be appreciated that if it is desired to increase the available intervals, two or more counter tubes may be cascaded in a manner similar to that hereinbefore described. In the illustrated showing, it is assumed that switch 41SW is set to its No. 2 terminal and that the heat-interval controlling switch 42SW is connected to its No. 6 terminal.

Upon the initial application of direct voltages to the equipment of FIG. 10, the bistable multivibrator including tubes 104VA and 104VB is rendered initially conductive upon its left-hand side, that is, tube 104VA is conductive and tube 104VB is not conductive, this condition resulting, as before, from the fact that under these initial conditions, the reset lead 146 is open. As a result, the potential at the cathode of section 104VA is at a positive value due to the potential drop across resistor 650R and this positive potential is applied to the left-hand electrode of rectifier 310RE. Rectifiers 310RE and 309RE are elements of a cool-count coincidence or "and" circuit, rectifiers 311RE and 312RE are elements of a heat-count coincidence or "and" circuit, while rectifiers 313RE and 314RE are elements of an "or" circuit. If coincidence is established either at rectifiers 309RE and 310RE, or at rectifiers 311RE and 312RE, tube 102VB is rendered conductive.

In the absence of such coincidence, tube 102VB is held below cutoff. Thus, the anode of tube 102VB is connected to a source of positive 430-volt potential through load resistor 618R, while the cathode is held at a potential above ground by means of a voltage divider circuit including resistors 660R and 657R connected between the positive 430-volt potential and ground, the cathode of tube 102VB being connected to the junction of those two resistors. The values of resistors 660R and 657R are preferably selected so that the cathode potential, in the absence of conduction in tube 102VB, is, for example, around 25 volts.

An additional voltage divider comprising resistors 655R and 615R is connected between the positive 430-volt source of potential and ground so that conductor 318, interjoining those resistors, is at a potential which is positive relative to ground. The establishing of this positive potential between conductor 318 and ground tends to produce conventional current flow via a plurality of paths including (a) conductor 318, resistor 653R, rectifier 309RE, No. 2 terminal of switch 41SW, resistor 622R and to ground at the zero line 172, (b) conductor 318, resistor 653R, rectifier 310RE, conductor 320 (which is connected to the cathode of tube 104VA), and resistor 650R to ground, (c) conductor 318, resistor 653R, rectifier 313RE and resistor 652R to ground, (d) conductor 318, resistor 654R, rectifier 311RE, No. 6 terminal of switch 42SW, and resistor 626R to the ground on the zero line 172, (e) conductor 318, resistor 654R, rectifier 312RE, conductor 324 (which is connected to the cathode of section 104VB), rectifier 307RE and resistor 651R to ground, and (f) conductor 318, resistor 654R, rectifier 314RE, and resistor 652R to ground. The value of resistors 652R, 653R and 654R is preferably very high (e.g., 4.3 megohms) relative to the value of resistors 622R and 626R (e.g., 68,000 ohms) and relative to the value of resistors 650R and 651R (e.g., 5,100 ohms).

The bistable multivibrator including tubes 104VA and 104VB is, at any time, in one or the other of its two stable states. If the section including tube 104VA is conducting, the resultant current flow produces a potential drop across resistor 650R which applies a positive potential to the left-hand electrode of rectifier 310RE of sufficient value to very substantially reduce or prevent the previously noted flow of current through resistor 653R and rectifier 310RE. Conversely, if section 104VB of the bistable multivibrator is conducting, the previously described conventional current through resistor 654R and rectifier 312RE is greatly reduced or terminated. However, independently of whether current is flowing through rectifier 310RE or rectifier 312RE, if the discharge path in the counter tube 106V does not include either the No. 2 or the No. 6 cathode of that tube, current flows through resistor 653R and rectifier 309RE as well as through resistor 654R and rectifier 311RE, with the major portion of the voltage between conductor 318 and ground being dropped across those resistors. As a result, the junction of rectifiers 309RE, 310RE and 313RE is but slightly positive relative to ground and the voltage at the junction of rectifiers 311RE, 312RE and 314RE is also but very slightly positive relative to ground potential. These voltages are applied through rectifiers 313RE and 314RE and developed across resistor 652R, as above noted, so that the control grid of triode 102VB, which is connected to the junction of rectifiers 313RE and 314RE and resistor 652R, is but very slightly positive relative to ground. Since the cathode of that tube is at a substantial positive potential relative to ground, tube 102VB is biased well below grid cutoff. This same condition obtains even though the discharge path in tube 106 includes the No. 2 cathode of that tube if the bistable multivibrator is at that time in the state in which tube 104VB is conductive and tube 104VA not conductive since only one of the two elements required for coincidence in the "and" circuit 309RE and 310RE is met. Similarly, tube 102VB continues to be biased well below grid cutoff even though the conductive path in tube 106V includes the No. 6 cathode if, at that time, the bistable multivibrator is conductive on its left side, with tube 104VA conductive and tube 104VB cut off, since again only one of the two requisite elements required for coincidence has been met.

As before stated, when the equipment of FIG. 10 is first energized, tube 104VA is conducting and tube 104VB is cut off, so that a positive voltage is applied to the left-hand electrode of rectifier 310RE. Consequently, when the discharge path in the counter tube 106V has been advanced to the No. 2 cathode, a positive voltage is applied to the left-hand electrode of rectifier 309RE, so that both of the requirements for coincidence are met. As a result, the circuits including rectifier 309RE and rectifier 310RE both present a high impedance to conventional current flow (in parallel with resistor 652R) so that substantially all of the current passing from conductor 318 through resistor 653R will be directed through rectifier 313RE and resistor 652R to ground. As a result, resistors 653R and 652R act as a voltage divider, resulting in the development of a voltage across resistor 652R which raises the control grid of tube 102VB to a positive value relative to ground which is of sufficient magnitude to caues that tube to become conductive. In the preferred practice, the sizes of resistors 655R and 615R are so selected in the light of the other circuit parameters that the grid will be driven to a potential which is positive relative to the cathode potential to insure that tube 102VB will conduct to saturation and to insure stable, consistent operation.

Since but a pulse output is required from tube 102VB and since the presence of resistor 657R in the cathode circuit of that tube would tend to produce self-biasing and a tendency to reduce the plate current in tube 102VB, resistor 657R is by-passed with the capacitor 320C which is of adequate size to effectively prevent such self-biasing action for a period long enough to permit the output pulse to perform its function.

Tube 102VB controls a monostable multivibrator including tube sections 103VA and 103VB which is conventional in form. The anodes of those two tube sections are connected to a positive 430-volt source of potential through individual plate resistors 609R and 610R and both cathodes are grounded. Under the initial conditions, section 103VB is provided with a positive bias, to insure conductivity therethrough, by means including resistor 656R, connected to the positive 430-volt source of potential, and resistor 649R, connected to ground and shunted by capacitor 319C. Conversely, section 103VA is biased negatively and below grid cutoff under the initial circuit conditions by means including grid return resistor 648R and a negative 150-volt source of potential. In the normal fashion, the two tube sections are cross-coupled, the anode of section 103VA being connected to the control grid of section 103VB by means including capacitor 311C, and the anode of section 103VB being connected to the control grid of section 103VA by means including a parallel connected resistance-capacitance network 642R and 312C.

When tube 102VB is rendered conductive, a sharp reduction in the potential at the anode thereof occurs due to the potential drop across resistor 618R, resulting in the transmission of a negative-going pulse through capacitor 313C and resistor 637R to the control grid of section 103VB of the monostable multivibrator. As a result, section 103VB will be cut off, producing a sharp rise in the potential at the anode of that section which is communicated to the control grid of section 103VA to render that section conductive. The resultant reduction in the potential at the anode of section 103VA is communicated to the control grid of section 103VB.

After a capacitor-discharge time-delay period determined by the parameters of the monostable multivibrator, the input pulse having terminated, the circuit will restore to its initial condition with section 103VB conducting and section 103VA cut off. As a result, a relatively short duration, negative-going square-wave voltage pulse appears at the anode of tube 103VA. This voltage pulse is applied to reset the counter tube 106V and to trigger the bistable multivibrator including sections 104VA and 104VB.

Thus, the sharp reduction in potential at the anode of section 103VA is applied via conductor 322 across a circuit including capacitor 306C, resistor 630R, capacitor 305C, and resistor 631R. As a result, the No. 10 cathode of counter tube 106V is transiently driven sharply negative relative to the remaining cathodes in the tube, causing the tube to be reset so that the discharge path exists between the anode and the No. 10 cathode thereof. While capacitor 305C is included in this resetting circuit, it will be observed that once tube 106V is reset, conduction is maintained between the anode and the No. 10 cathode thereof through resistor 630R and rectifier 308RE, which also serves to by-pass positive-going pulses received via conductor 322 to ground.

The momentary sharp reduction in the potential at the anode of tube 103VA is also communicated through capacitor 318C to the bistable multivibrator to cause section 104VA thereof to be cut off and to therefore produce conduction in section 104VB. As will be seen, the resultant negative-going pulse applied to terminal lead H through capacitor 317C performs no useful function at this time, and the resultant positive-going pulse applied to terminal lead M through capacitor 308C also performs no useful function in the disclosed arrangement. However, this triggering of the bistable multivibrator to its other stable state marks the initiation of the heat interval so that the bistable multivibrator serves to transfer the counting and signaling system including tubes 106V and 102VB from its cool period counting condition to its heat period counting condition.

The reduction in potential at the cathode of section 104VA effectively to ground potential serves effectively to re-establish the circuit including the rectifier 310RE as a low-impedance circuit in shunt of resistor 652R, preventing coincidence from occurring in the "and" cool-count circuit, whereas the rise in potential at the cathode of section 104VB is applied via conductor 324 to the left-hand electrode of rectifier 312RE, establishing one of the elements of the requisite coincidence for the heat time by converting the sub-circuit including rectifier 312RE to its high-impedance value so as to terminate its functioning as a low-impedance shunt around the sub-circuit including rectifier 314 RE and resistor 652R.

Additionally, the positive voltage developed across the cathode load resistor 651R is applied, in series with a negative 20-volt source of biasing potential, across resistors 607R and 606R, raising the voltage at the junction of those resistors and consequently raising the voltage at the control grid of thyratron 105V.

The cathode of thyratron 105V is connected to ground and the anode is connected to the source of alternating-voltage clocking signals on conductor 202 through the primary winding 326 of transformer 90T. As a result, thyratron 105V is rendered conductive, and the clocking voltage is induced in the secondary windings 328, 330 and 332 of transformer 90T.

Corresponding ends of secondary windings 328 and 332 are connected to ground and the upper terminals thereof are connected to conductors N and O, respectively, through rectifiers 301RE and 302RE, respectively. The resultant positive half-wave pulsating voltages appearing on these output conductors (in phase with one another) are applied to the heat control circuit detailed on FIGS. 14 and 15 of the drawings.

Secondary winding 330 is connected to output conductors P and Q through a full-wave bridge rectifier including rectifiers 303RE, 304RE, 305RE and 306RE. The resultant signal between conductors P and Q is employed to trigger the operation of the phase adjust circuits of FIG. 16 as will be described in detail hereinafter.

With counter 106V having been reset and the multivibrator including sections 104VA and 104VB having been triggered to its other stable state, both as a result of the transmission of a pulse by the monostable multivibrator including sections 103VA and 103VB, the restoration to normal of that monostable multivibrator will produce no change in these elements. It will be apparent that since the output signal of tube 102VB causes the multivibrator to be triggered to its other stable state and causes the counter 106V to be reset, thereby terminating the condition which caused tube 102VB to produce an output pulse, it is advisable to include a monostable multivibrator; such as that shown in the circuit, to insure that tube 102VB can remain conductive sufficiently long to perform these functions.

Since conductor G (FIG. 10) continues to be at a positive potential, tube 101V will continue to pass pulses at the clocking signal frequency to produce stepping of counter tube 106V, the counter tube now counting out the duration of the heat interval. Since the bistable multivibrator section 104VA is no longer conducting, coincidence cannot now be established at the cool time "and" circuit, but since tube 104VB is conducting, rectifier 312RE is effectively converted to its high impedance condition so that when the conductive path in counter tube 106V exists between the anode and the No. 6 cathode thereof (in the representatively disclosed arrangement), coincidence will be established and tube 102VB will be rendered conductive in a manner similar to that above described. As before, this results in a triggering of the monostable or single-shot multivibrator including sections 103VA and 103VB which transmits a triggering pulse to the bistable multivibrator including sections 104VA and 104VB and transmits a resetting pulse to the counter tube 106V.

The termination of conduction in section 104VB terminates the coincidence at the "and" circuit including rectifiers 311RE and 312RE while the reinitiation of conduction through section 104VA again enables the cool-interval coincidence circuit including rectifiers 309RE and 310RE in preparation for the counting of the next cool interval. The termination of conduction through section 104VB terminates the signal which was applied to the control grid of thyratron 105B so that that thyratron will extinguish upon the next negative half cycle of the applied voltage on conductor 202, terminating the application of output signals to terminal leads P and Q and to terminal leads N and O.

Additionally, the termination of conduction in section 104VB results in a sharp rise in the potential at the anode thereof which is communicated through capacitor 317C and to terminal lead H which extends to the one hundred-count unit with which the particular cool and heat controller of FIG. 10 is associated, and terminal lead H again appears on FIG. 6 of the drawings in which it is shown to be connected to the upper terminal of resistor 75R, the lower terminal of which is connected to the negative source of biasing potential for thyratron 5V.

It will be recalled that in the one hundred-count units (FIG. 6) which are associated with the FIG. 10 units, terminal lead K (connected to the anode of tube 5V through primary winding 214) is connected to the clocking signal on conductor 200 as is illustrated in FIG. 1 of the drawings which shows conductor 200 connected to terminal lead K4 of the preheat weld interval unit 4 and to terminal K7 of the postheat weld interval unit 7. Since the clocking signals on conductors 200 and 202 from the phase inverter 10 (detailed in FIG. 7 are 180° out of phase with one another, the voltage at terminal lead K in FIG. 6 and the voltage on conductor 314 in FIG. 10 are in phase with one another, both being derived from the clocking signal.

As was stated hereinbefore, the counter 106 is stepped at or near the beginning of the positive half cycle of the alternating voltage on conductor 314, producing, at the instant of the transfer of conduction to the selected cathode, coincidence and operation of tube 102VB which substantially instantaneously operates the monostable multivibrator including sections 103VA and 103VB which substantially instantaneously reverses the state of the bistable multivibrator including sections 104VA and 104VB. Therefore, the positive-going output pulse is applied to conductor H at or shortly after the beginning of the positive half cycle of the alternating voltage on conductor 314 and therefore at or shortly after the beginning of the positive half cycle of the voltage on conductor 200 which is applied to the anode of tube 5V in FIG. 6 of the drawings. Therefore, a short-duration positive-going pulse is applied to the control grid of thyratron 5V at a time concurring with the application of positive voltage between the plate and cathode of that tube. Consequently, thyratron 5V fires during that positive half cycle. This produces a pulse through transformer 2T to advance the count by one in the counters 8V and 9V of FIG. 6. The input pulse to the control grid of tube 5V terminates well prior to the next positive half cycle of the voltage applied to terminal K in FIG. 6 so that but a single pulse is counted in the one hundred-count circuit at and in response to the termination of a heat interval established by the cool heat unit shown in FIG. 10.

After making that single count, the circuit of FIG. 6 remains static while the circuit of FIG. 10 continues to count the input pulses. The circuit of FIG. 10 continues to operate in this fashion, applying output signals to conductors N, P, Q and O during each heat interval, transmitting a negative-going pulse at the end of each heat interval via conductor M to reverse the phase of the clocking signals on conductors 200 and 202 from the phase inverter of FIG. 7, and transmitting a positive-going pulse at the end of each heat interval via conductor H to step the associated one hundred-count unit of FIG. 6. The phase of the clocking signals is reversed, as previously noted, so that the polarity of the next weld will be reversed and so that the several counters in the system which are controlled by the clocking signal will be in proper time phase with the welding currents.

When the preset count in the FIG. 6 unit has been reached, that unit operates in the manner previously described to shift the state of the multivibrator including sections 4VA and 4VB in FIG. 6 to terminate the application of a positive voltage to conductor G. Since this occurs in response to the termination of the heat interval counted by the cool-heat unit of FIG. 10, it concurs with the resetting of the FIG. 10 unit to its initial condition and occurs before counter 106V can be stepped from its initial position. As a result, the unit of FIG. 10 is prepared for future operation at the next time that a positive voltage is applied to conductor G by the associated one hundred-count unit.

COOL-HEAT WITH CURRENT DECAY
(FIGS. 11–13)

As was before noted, it is assumed for purposes of illustration that the weld heat cool and heat unit 12 (FIG. 1) is provided with a capability of establishing current decay at the end of the final weld pulse. It will be appreciated that unit 12 need not be provided with this capability and, conversely, that the preheat cool and heat unit 11 and the postheat cool and heat unit 14 may, if the welding operations to be performed render such desirable, also be provided with the current decay feature. Similarly, it will be appreciated from the following discussion of a cool-heat circuit with current decay at the end of the final weld pulse, that the circuit may be modified in the light of the presented teachings to provide current decay after each or any other selected one or ones of the weld pulses if desired.

A suitable cool-heat unit with current decay is illustrated in FIGS. 11 to 13 of the drawings which, among themselves, should be placed with FIG. 12 immediately below FIG. 11 and FIG. 13 immediately below FIG. 12 for proper orientation.

When power is applied to the system, conduction will exist in counting tube 120V (FIG. 11) between the anode and the No. 10 cathode thereof as established by the signal condition existing on the zero line 172, in the manner previously described. Additionally, by virtue of the connection of the control grid of tube 111VB (FIG. 12) and the control grid of tube 115VB (FIG. 13) through appropriate resistors to the reset line 146, those tubes are both initially conducting.

Tube 111VB is an element of a bistable multivibrator circuit (similar to those hereinbefore described) also including tube 111VA, which is not conductive under the initial circuit conditions. Similarly, tube 115VA (FIG. 13) is cross-coupled with tube 115VB to serve as another similar bistable multivibrator and that tube is also not conductive under the initial conditions.

These multivibrators are elements of a control means for a plurality of coincidence or "and" circuits including a cool time coincidence circuit 350 (FIG. 12), a heat time coincidence circuit 352 and a current decay coincidence circuit 354. Each of these coincidence circuits includes a plurality of diodes or rectifiers and coincidence is established by concurrently applying to the left-hand electrode of each of the diodes in the coincidence circuit an appropriate positive potential. With tube 111VB conducting, its cathode is at a positive potential relative to ground due to the potential drop across cathode resistor 745R so that a positive potential is applied to the left-hand electrode of rectifier 414RE in coincidence circuit 350. Since tube 111VA is driven below grid cut-off, its cathode is at or substantially at ground potential, and that potential is applied to the left-hand electrode of rectifier 417RE so that the heat coincidence circuit 352 will not meet coincidence even through a positive potential be applied to the left-hand electrode of rectifier 416RE. Since tube 115VA (FIG. 12) is not conducting, its cathode is at or substantially at ground potential and this potential is applied via conductor 356 to the left-hand electrode of rectifier 433RE so that coincidence cannot be met under these initial conditions in the current decay coincidence circuit 354. The positive potential appearing at the cathode of tube 115VB (FIG. 13) as a result of the potential drop across cathode resistor 747R is applied via conductor 358 to the left-hand electrode of rectifier 415RE in the cool coincidence circuit 350.

The circuit remains in this condition until such time as a positive voltage is applied to input lead G shown in FIG. 11 of the drawings. Lead G in FIG. 11 of the drawings is the counterpart of lead G5 in FIG. 1 of the drawings extending from the weld heat weld interval unit 5 to the weld heat cool and heat unit 12, and is connected to lead G in the FIG. 6 detailed representation of the one hundred-count circuit, leads G and H in the FIG. 6 representation not being interconnected when that unit is used as the weld heat weld interval counter 5.

When tube 4VA (FIG. 6) is rendered conductive in the manner hereinbefore described (and as a result, in the present case, of the receipt of an output pulse via lead C from the preheat weld interval unit 4 in FIG. 1), the voltage at conductor G rises. This positive voltage is developed across resistor 707R (FIG. 11) and is applied through resistor 703R to the control grid of a gating vacuum tube 116V. This potential at the control grid of tube 116V enables the tube to conduct in response to a voltage signal which is applied to its screen grid. In the disclosed arrangement, this signal is the clocking signal which is derived from the phase inverter disclosed in FIG. 7 of the drawings. The clocking signal appearing upon conductor 202 in that circuit is applied, via that conductor, across the transformer primary winding 94TP (FIG. 13). The secondary winding 94TS of this transformer appears in FIG. 11 of the drawings. The induced voltage across the secondary is applied through capacitor 519C and developed across resistor 702R and is then applied through resistor 798R to the screen grid of tube 116V. The transformer including primary winding 94TP and secondary winding 94TS is so connected as to invert the phase of the signal so that the alternating voltage applied to the screen grid of tube 116V is 180 degrees out of phase with the voltage on conductor 202. It will be apparent that if desired, the voltage appearing on conductor 200 from the phase inverter (FIG. 7) could be utilized, in which case there would be no necessity for a phase inverting transformer.

In the preferred arrangement, the size of the unbypassed cathode resistor 720R is selected in the light of the amplitude of the input signals so that the voltage developed across that resistor is not a full sine wave but rather consists of a series of positive half waves, that is, tube 116V desirably is operated as or nearly as a half-wave rectifier. These positive output pulses are applied via a coupling network including capacitor 534C and resistor 708R to the control grid of vacuum tube 121V, that coupling circuit acting as a pulse forming or differentiating network if desired. The resultant series of negative-going voltage pulses appearing at the anode of tube 121V are applied through a network including capacitor 518C, resistor 722R and resistor 704R to the No. 12 guide electrodes of counter tube 120V and are applied through a network including capacitor 518C, resistor 721R and capacitor 501C (which is conected to the zero line 172) to the No. 11 guide electrodes of tube 120V.

In the manner hereinbefore described, the provision of capacitor 501C in the latter network results in a slight delay in the application of pulses to electrodes No. 11 relative to the time at which the corresponding pulses are applied to the No. 12 electrodes of counter tube 120V so as to produce the requisite successive transfers which result in the stepping of the discharge in counter tube 120V. In this manner, counter tube 120V will be advanced one count for each positive-going half wave of the input signal at the control grid of tube 116V. As before noted, the time spacing or period of these pulses will vary from the period of a 60-cycle-per-second sine wave each time that the phase of the clocking voltage is reversed.

Counter tube 120V is employed to count the cool time, the heat time, and the current decay time, the duration of each of those times being determined by the setting of switches 53SW, 54SW and 55SW, respectively. Switch 53SW serves to interconnect a selected one of the cathodes of tube 120V and the left-hand electrode of rectifier 413RE (FIG. 12) in the cool time coincidence circuit 350 via conductor 369; switch 54SW serves to interconnect a selected one of the cathodes of tube 120V and the left-hand electrode of rectifier 416RE (FIG. 12) in the heat time coincidence circuit 352 via conductor 371; and switch 55SW serves to interconnect a selected one of the cathodes of tube 120V and the left-hand electrode of rectifier 432RE in the current decay coincidence circuit 354 via conductor 378. In the disclosed arrangement, it is assumed, for purposes of illustration, that all three switches are set to the No. 3 cathode of tube 120V.

With proper operation of the equipment, a three-element coincidence circuit could be employed for the cool period "and" circuit 350, the existence of a discharge between the anode and the No. 3 cathode of tube 120V completing the requirements for full coincidence since the multivibrators including tubes 111VA, 111VB, 115VA and 115VB have been set to their appropriate states. However, it has been found that it is difficult to produce proper operation of the system with such a three-element coincidence circuit. This, if, prior to the time that an input signal is received via conductor G, the operator moves switch 53SW into engagement with the No. 10 cathode of tube 120V, the requisites for coincidence will be met and the ensuing operation of the equipment will be improperly initiated. To avoid this possibility, circuit 350 also includes rectifier 412RE, the left-hand electrode of which is connected via conductor 362 to the junction of series interconnected rectifier 437RE (FIG. 11) and resistor 801R which are connected between conductor G and ground. Prior to the time that the appropriate input signal is received via conductor G, that conductor is at or substantially at ground potential so that coincidence cannot be met in the cool coincidence circuit 350. However, when the positive direct voltage input signal is applied to conductor G, the left-hand electrode of rectifier 412RE is appropriately raised in potential so that coincidence will be obtained the next time thereafter that the discharge path in tube 120V reaches the cathode to which switch 53SW is set.

Coincidence circuit 350 is connected through rectifier 418RE (an "or" circuit also including rectifier 419RE) to the control grid of vacuum tube 112V. In the absence of coincidence, this tube is held below grid cutoff. The cathode is at a positive potential (e.g., 30 volts) by virtue of its connection to a voltage divider including a 430 volt source of potential, resistor 757R and resistor 754R which is connected to ground. Conductor 364 is held at a somewhat higher positive potential (e.g., 75 volts) by virtue of its connection to the junction of resistors 715R and 756R which are connected between the 430 volt source of potential and ground. The voltage between conductor 364 and ground is applied across a first group of parallel circuits, each of which includes resistor 753R shunted by capacitor 542C, one of which further includes rectifier 412RE, another of which further includes rectifier 413RE, another of which further includes rectifier 414RE, another of which further includes rectifier 415RE, and another of which further includes rectifier 418RE connected in series with resistor 751R to ground. Resistors 753R and 751R desirably both have high values of resistance (e.g., 4.3 megohms). Consequently, if the left-hand electrode of any one of the rectifiers 412RE to 415RE is connected to a potential which is at or substantially at ground, a low-impedance path is established in shunt of resistor 751R so that substantailly no voltage appears across that resistor and so that the control grid of tube 112V is held at or substantially at ground potential. As a result, tube 112V is biased below grid cutoff, as noted.

When coincidence is met, the impedance of the several parallel circuits including rectifiers 412RE to 415RE is high relative to the impedance of the circuits including rectifier 418RE and resistor 751R so that current flows from conductor 364 through resistors 753R and 751R in series, producing a potential drop across resistor 751R and raising the potential of the grid of tube 112V to the point where that tube will conduct.

Conduction through tube 112V will result in a potential drop across load resistor 717R, resulting in a sharp drop of the potential at the anode of that tube and the resultant application of a negative-going pulse by capacitor 512C and resistor 769R (interconnected by conductor 379 which extends to FIG. 11), which is developed across resistor 724R and applied to the input circuit of vacuum tube 114VB.

Tubes 114VA and 114VB are cross-coupled in a manner to form a conventional single-shot or monostable multivibrator. Prior to the receipt of the noted negative-going pulse, tube 114VB is conducting and tube 114VA is not as a result of the connection of the control grid of tube 114VB to ground through resistor 724R and the connection of the control grid of tube 114VA to a source of negative 150-volt potential through resistor 725R. When the negative-going pulse is applied to the control grid of section 114VB, that section is driven below grid cutoff, which results in an increase of its anode potential which is communicated through a coupling network including resistor 734R shunted by capacitor 504C, resistor 725R and resistor 739R to the control grid of section 114VA to render that section conductive. The resultant reduction in potential at the anode of section 114VA is communicated through capacitor 505C back to the control grid of section 114VB to assist in driving and holding that section below grid cutoff. By virtue of the nature of a monostable multivibrator, this condition is unstable, but during the time that that multivibrator is shifted to its unstable state, the reduced potential at the anode of section 114VA is communicated as a negative-going pulse through capacitor 503C, rectifier 402RE and resistor 787R to the No. 10 cathode of tube 120V to reset that counter. After a time determined by the parameters of the monostable multivibrator circuit, tube 114VB is again rendered conductive and section 114VA is driven below grid cutoff.

The resetting of counter tube 120V of course disestablishes coincidence for the cool circuit 350.

When the monostable multivibrator including tubes 114VA and 114VB is tripped to its transient state, the resultant reduction in the potential at the anode of tube 114VA also results in the production of a negative-going pulse by capacitor 506C which is applied via conductor 366 and developed across resistor 748R which is connected to ground. This results in the application of a negative-going pulse to the control grid of tube 111VA through a network including capacitor 527C, resistor 726R and resistor 740R, and in the application of a negative-going pulse to the control grid of section 111VB through a corresponding circuit. The application of the negative pulse to the grid of tube 111VB drives that tube below grid cutoff, resulting in the application of a positive voltage to the control grid of section 111VA, producing conduction in that section and resulting in a reduction in the anode potential thereof which is communicated back to the control grid of section 111VB so that the bistable multivibrator including those tubes is shifted to its second stable state.

This shift results in a reduction in the potential at the cathode of section 111VB which places rectifier 414RE in its low-impedance condition. The corresponding rise in potential at the cathode of section 111VA is applied to the left-hand electrode of rectifier 417RE to convert that rectifier to its high-impedance condition in preparation for the establishing of coincidence in the circuit 352.

If the current-decay capability of the system of FIGS. 11, 12 and 13 is to be employed, then the two-position switch including mechanically ganged sections 46SW*a* (FIG. 12), 46SW*b*, 46SW*c* (FIG. 13), 46SW*d*, 46SW*e* and 46SW*f* is set to its illustrated condition. In that event, when the multivibrator including sections 111VA and 111VB is tripped to its second stable state at the end of the cool interval, the positive voltage appearing at the cathode of section 111VA is applied through switch section 46SW*b* and the capacitor 524C, resulting in the application of a positive-going pulse through resistor 791R to conductor D. Conductor D appears in the hundred-count circuit illustrated in FIG. 6 of the drawings, and this interconnection is identified as conductor D5 in FIG. 1 of the drawings. The positive-going pulse applied to conductor D appears at the control grid of triode 6V (FIG. 6) resulting in the application of a pair of time-spaced pulses to the guide electrodes of counter tube 8V to cause the conductive path in that tube to be stepped so that it exists between the anode and the No. 1 cathode of that tube. Thus, the one hundred-count unit associated with the cool-heat and current decay unit is pulsed to produce a stepping of the count at the end of the cool interval and prior to the beginning of the heat interval (differing in that respect from the circuits of FIG. 10).

In the event that it is not desired to employ the current decay feature, then the one hundred-count unit can be pulsed at the end of the heat interval and this is accomplished by changing the switch including sections 46SW*a* and 46SW*b* to its second position in which the condition of each of the several individual switch sections is reversed. In that case, the positive output pulse applied to conductor D will occur each time that the multivibrator including sections 111VA and 111VB is triggered back to its initial stable state with section 111VB conducting, which occurs, as will be seen, at the end of the heat interval.

Whether the current-decay feature is switched on or off, the operation of tube 111VA at the end of the cool interval will result in a positive voltage being applied to conductor 370 which extends to FIG. 13, and this voltage is applied in series with a biasing voltage (which is developed across resistor 794R) through resistor 765R to the control grid of thyratron 117V.

An alternating voltage is connected across the primary winding 97TP (at the right side of FIG. 13) of a transformer which is provided with secondary winding 94TSA and secondary winding 97TSB. The induced voltage across secondary winding 97TSB is half-wave rectified by rectifier 410RE, is filtered by capacitor 528C and the portion thereof which is not dropped across resistor 792R is developed across resistor 794R with a polarity such that thyratron 117V is normally not conducting. It may be observed that a similar biasing circuit is provided for thyratron 118V, that circuit including secondary winding 94TSA, rectifier 411RE, resistor 793R and capacitor 537C for developing a negative biasing voltage across resistor 795R for a purpose to be described.

At the receipt of the positive voltage via conductor 370, thyratron 117V is rendered conductive, its cathode being connected to ground and its anode being connected to the clocking voltage on conductor 202 through the primary winding 95TP of the transformer 95T. The flow of plate current through primary winding 95TP results in the development of an alternating voltage related to the clocking voltage across secondary windings 95TSA, 95TSB and 95TSC. Since windings 95TSA and 95TSC are connected in phase with one another, positive voltage pulses are applied to conductors N' and O', through rectifiers 420RE and 425RE at each cycle of the clocking voltage. These signals are transmitted to the heat control circuit as will be described. Conductors N' and O' are counterparts of conductors N and O in the cool and heat circuit illustrated in FIG. 10 of the drawings, corresponding reference characters being employed to indicate the connections since the unit of FIG. 10 and the unit of FIGS. 11 through 13 are intended to be interchangeable, as previously noted.

The alternating voltage developed across transformer secondary 95TSB is full-wave rectified by rectifiers 421RE to 424RE to produce a voltage difference between conductors P' and Q', which are also connected to the heat control in a manner to be described, and correspond to conductors P and Q in FIG. 10 of the drawings. These output signals on conductors N', O', P' and Q' continue to be transmitted as long as thyratron 117V is conducting and hence as long as the multivibrator including tubes 111VA and 111VB is conducting on its left-hand section.

It will be observed that since the clocking voltage signal which is modified and employed to step the counter 120V is reversed in phase relative to the clocking voltage applied to the anode of thyratron 117V, tube 117V fires one-half cycle after the signal is received via conductor 370, that signal being received at the time that the anode of tube 117V is negative. As a result, consistency of operation is insured.

The above series of events, of course, occurs very rapidly so that the system is ready for the next step in its operation prior to the receipt of the fourth pair of discharge-advancing pulses applied to the counter tube 120V (FIG. 11). Since prior to the receipt of this fourth pair of pulses, counter tube 120V has been reset, that pair will result in a transfer of the conduction in the tube so that it exists between the anode and the No. 1 cathode.

Appropriate conditions having now been established for the counting of the heat intervals, no other change in the circuit will occur until the discharge path in counter tube 120V again includes the No. 3 cathode. At that point, a positive voltage will be applied through switch 54SW and via conductor 371 to the left-hand electrode of rectifier 416RE, converting that rectifier to its high-impedance condition. Since rectifier 417RE has been prepared for coincidence by the tripping of the multivibrator including tubes 111VA and 111VB, coincidence is met, a positive voltage will be developed across resistor 751R as a result of curent flow therethrough from conductor 364 and through resistor 750R and recitifier 419RE, and tube 112V will again be rendered conductive. This tube again transmits a pulse to trigger and monostable multivibrator including tubes 114VA and 114VB (FIG. 11) which results in resetting of the counter tube 120V and the application of a negative-going pulse via conductor 366 to trigger the multivibrator including sections 111VA and 111VB (FIG. 12) back to its initial condition in which tube 111VB is conducting.

The termination of conduction in tube 111VA (FIG. 12) disables the heat control circuit 352 to meet coincidence. The establishing of conduction of section 111VB prepares the cool circuit 350 for coincidence and also terminates (at the next negative half-cycle of the anode voltage) conduction in tube 117V (FIG. 13). Therefore, the output signal is applied to conductors N', O', P' and Q' during and only during the duration of the heat period.

As before noted, the multivibrator including tubes 115VA and 115VB (FIG. 13) is initially rendered conductive on its right-hand section and no signal has, to this point in the description, been received to trigger that multivibrator to its other stable state. Consequently, the cathode of tube 115VB is at a potential appreciably above ground potential due to the voltage drop across resistor 747R, and this positive voltage is applied via conductor 372 to the upper terminal of resistor 767R (FIG. 12), the lower terminal of which is connected to a negative source of biasing potential. As a result, a voltage is applied through resistor 764R to the control grid of vacuum tube 119V of a value to permit that tube to conduct at such time as an appropriate signal is applied to its screen grid. This signal is received at the time that the multivibrator including tubes 111VA and 111VB is triggered back to its initial state, that is, when conduction is cut off in section 111VA. When this occurs, the anode of that tube rises in potential, resulting in the development of a positive-going pulse by capacitor 510C and resistor 763R. This positive pulse results in corresponding conduction in tube 119V, producing a transient drop in the potential at the anode of that tube and the resultant development of a negative-going signal by capacitor 513C. This signal is applied to conductor M12 which also appears at the phase inverter shown on FIG. 7 of the drawings. The negative-going signal will trigger the phase inverter multivibrator to produce a reversal of the phase of the clocking signals appearing on conductors 200 and 202 which extend throughout the system as before noted.

The system has therefore measured out one cool interval and one heat interval, and has shifted the phase of the clocking signals. At the end of this sequence of operations, the circuit of FIGS. 11, 12 and 13 is restored to its normal condition in preparation for the counting of the second cool interval at the completion of which a signal is transmitted to the associated one hundred-count circuit to advance the count of that circuit by one, the second heat interval is then measured, and a signal is transmitted to the phase inverter of FIG. 6 to again invert the phase of the clocking signals.

In the case of all of the one hundred-count units, except for unit 5 associated with the weld heat controller, conductor E is connected to conductor F, and this normal condition is evidenced by a dotted-line jumper in FIG. 6 of the drawings. In the case of the weld interval one hundred-count circuit 5 (FIG. 1), however, conductors E and F are not interconnected and conductor E, in fact, serves no useful function, being connected to no other point in the system. Conductor F5 in FIG. 1 (conductor F in FIG. 6) is connected to lead F12 (FIGS. 1 and 13). It will be a apparent that if it is desired to use a unit such as that shown in FIGS. 11 to 13 for the preheat controller 11 (FIG. 1) or for the postheat controller 14, the one hundred-count units associated therewith should also be connected in this manner.

At the end of that cool interval which immediately precedes the final heat interval as determined by the setting of the one hundred-count unit, the count will be reached and coincidence met to render tube 7VB (FIG. 6) conductive; a negative-going pulse is applied through capacitor 19C and via conductor F to the portion of the heat-cool current decay unit which is represented in FIG. 13 of the drawings. That negative-going pulse, appearing on conductor F12 in FIG. 13, is applied through switch 46SWd (assuming the switch to be in the shown postion) and through capacitor 536C and resistor 743R to the control grid of tube 115VB whereby the bistable multivibrator including that tube is triggered to its other stable state.

It will be observed that if it is desired to disable the current decay capability of the equipment shown in FIGS. 11 to 13, switch section 46SWd is opened to prevent this change of state of the multivibrator including tube sections 115VA and 115VB, and switch sections 46SWc and 46SWe are closed so that the negative-going pulse appearing upon conductor F12 is communicated through those switch sections and through capacitor 521C to conductor E12 which extends back to lead E of the one hundred-count unit shown in FIG. 6, that lead being identified as conductor E5 in FIG. 1 of the drawings. Therefore, if the current decay capability is disabled, the conductors E and F in the one hundred-count unit of FIG. 6 are in effect interconnected from an alternating current standpoint, so that the counter tubes in the one hundred-count circuit would be reset in the manner initially described.

However, where it is desired to take advantage of the current decay capability of the circuit of FIGS. 11 through 13, it is desirable to retain the information in the one hundred-count unit that the count has been reached. Consequently, while the change of state of the multivibrator including tubes 115VA and 115VB at this point does result in a pulse being transmitted through closed switch section 46SWf and capacitor 521C to conductor E12 which extends to FIG. 6, the pulse at this time is a positive-going pulse which will not produce resetting of the one hundred-count circuit.

The termination of conduction in tube 115VB (FIG. 13) results in a reduction in the potential on conductor 358 to disable the cool concidence circuit 350 (FIG. 12)

to prevent coincidence being achieved by that circuit. This reduction in the potential at the cathode of tube 115VB is also communicated via conductor 372 to the control grid circuit of tube 119V (FIG. 12) to permit the negative source of potential connected to resistor 767R to block that tube. This is done so that tube 119V will not operate at the end of the final heat time to trip the phase inverter since it is desired that the current decay occur in the same weld pulse and hence in the same phase.

The establishment of conduction through tube 115VA (FIG. 13) results in a rise in the potential at the cathode of that tube which is applied via conductor 356 to the left-hand electrode of rectifier 433RE (FIG. 12) in the current decay coincidence circuit 354, converting that rectifier to its high-impedance condition. The rise in cathode potential of tube 115VA is also applied via conductor 374 to rectifier 435RE to convert that rectifier to its high-impedance condition. Rectifier 435RE is an element of the coincidence circuit also including rectifier 436RE which, by virtue of the connection via conductor 376 to the cathode of tube 111VB (FIG. 12), is now in its low-impedance condition since tube 111VB is not conducting.

Counter tube 120V (FIG. 11) then continues to count pulses for the final heat interval. When the discharge path in that tube includes the No. 3 cathode, a positive voltage is applied via conductor 371 to rectifier 416RE (FIG. 12) to again establish coincidence in circuit 352 so as to render tube 112V conductive which serves, through the monostable multivibrator including tubes 114VA and 114VB (FIG. 11), to reset the counter tube 120V and to trip the bistable multivibrator including tubes 111VA and 111VB (FIG. 12) back to the right so that section 111VB is conducting. The resultant rise in the potential at the cathode of tube 111VB is communicated to rectifier 436RE (FIG. 13) by conductor 376. Since a positive voltage has been applied to rectifier 435RE via conductor 374 as above described, the conditions for coincidence are met.

In this coincidence circuit, the voltage between conductor 378 and ground is applied, in series with the negative biasing voltage which is developed across resistor 795R in the manner hereinbefore described, and through resistor 766R to the control grid of thyratron 118V. Conductor 378 is connected to conductor 364 through high-resistance resistor 797R and a steady direct voltage (e.g., 75 volts) is applied to conductor 364 in the manner hereinbefore described.

The voltage appearing between conductor 364 and ground is applied across three parallel circuits, one of which includes resistor 797R and resistor 796R, another of which includes resistor 797R and rectifier 435RE, and another of which includes resistor 797R and rectifier 436RE. If either rectifier 435RE or rectifier 436RE is connected to a point at or substantially at ground potential, that rectifier constitutes a low-impedance path in shunt of resistor 796R so that conductor 378 is held substantially at ground potential and thyratron 118V is prevented from firing. However, when coincidence is met so that the circuits including rectifiers 435RE and 436RE present an impedance to conventional current flow which is relatively high, current flows from conductor 364 through resistors 797R and 796R in series, producing a potential drop across resistor 796R to raise the voltage at conductor 378 to a point sufficient to overcome the negative bias voltage appearing across resistor 795R so as to fire thyratron 118V.

The anode circuit of tube 118V includes primary winding 96TP of transformer 96T and the alternating clocking voltage appearing on conductor 202. As a result, a voltage related in phase to the clocking voltage is induced in the secondary windings 96TSA, 96TSB and 96TSC. Windings 96TSA and 96TSC are connected through half-wave rectifiers 426RE and 431RE, respectively, to conductors N' and O' and thence to the commutation circuit in the heat control as will be described. The alternating voltage appearing across winding 96TSB is full-wave rectified by rectifiers 427RE to 430RE to produce a voltage difference between conductors P" and Q", these conductors being connected to the current decay portion of the phase shifter in the heat control circuit as will be described. In this fashion, current decay is initiated.

Counter tube 120 (FIG. 11) then counts the set current decay interval. At the appropriate count the positive voltage appearing at the selected cathode is applied through switch 55SW and via conductor 378 (which extends to FIG. 12) to the left-hand electrode of rectifier 432RE in the current decay coincidence circuit 354. Rectifier 433RE has been converted to its high-impedance condition in the manner above described and as a result of the triggering of the multivibrator including sections 115VA and 115VB.

If only a two-element coincidence circuit were provided for the current decay coincidence, no problem would be raised unless, under particular circumstances, the switches 54SW (FIG. 11) and 55SW are so set that the decay time is less than the heat time. In that event, coincidence would be met in the current decay coincidence circuit 354 during the final heat period. To avoid this occurring, the circuit is arranged so that the current decay coincidence cannot be met until the heat time is completed. This is accomplished by imposing conductivity of tube 118V as a condition precedent to the establishing of coincidence in the current decay coincidence circuit 354. When tube 118V is rendered conductive at the end of the heat interval so as to energize transformer 96T, an alternating voltage is induced in secondary winding 96TSD (FIG. 12) and this voltage is rectified by rectifier 404RE and applied through a voltage divider network including resistor 789R and resistor 788R to the left-hand electrode of rectifier 434RE to convert that rectifier to its high-impedance condition. Therefore, when the counter tube 120V (FIG. 11) reaches its count, all three elements of the coincidence are met and tube 113V is rendered conductive. It may be noted that there is a phase reversal of the clocking signal by transformer 96T, so the pulsating voltage which is applied to rectifier 434RE (in the absence of a filter network) is in appropriate phase relation with the applied pulse from the counter tube 120V.

The coincidence circuit itself is similar to those previously described, there being very little current through resistor 752R and hence very little voltage drop across that resistor as long as any one of the rectifiers 432RE to 434RE is in its low-impedance condition. However, when all three rectifiers are concurrently in their high-impedance condition, the voltage drop appearing across resistor 800R is reduced, and the total voltage between conductor 364 and ground is divided in proportion to the relative resistances of resistors 800R and 752R, establishing conditions for conductivity through tube 113V.

Conduction in tube 113V results in a drop in its anode potential which is applied by conductor 382 to capacitor 502C (FIG. 11), resulting in the application of a negative-going pulse through rectifier 401RE and resistor 787R to the No. 10 cathode of tube 120V to reset that counter tube. The reduction in potential at the anode of tube 113V (FIG. 12) is also applied to capacitor 735C, resulting in the application of a negative-going pulse via conductor 384 and through capacitor 531C and resistor 742R to the control grid of tube 115VA, terminating conduction in that tube and thereby resulting in the re-establishment of conduction in section 115VB. The restoration of that multivibrator to normal results in the reduction in the potential at the anode of tube 115VB which is communicated through switch 46SWf to capacitor 521C, whereupon a negative-going pulse is applied via conductor E12 (which extends to FIG. 6 and appears thereon as lead E) to reset the multivibrator including tubes 4VA and 4VB in the one hundred-count circuit.

The reduction in potential at the anode of tube 115VB is also applied via conductor 386 to capacitor 514C (FIG. 12) to result in the application of a negative-going pulse via rectifier 407RE to conductor M12 to trip the phase inverter which, it will be recalled, was not tripped at the end of the final heat interval so as to insure that the current decay would be of the same polarity as the final heat pulse.

The rise in potential at the cathode of section 115VB (FIG. 13) is communicated via conductor 358 to rectifier 415RE (FIG. 12) in the cool coincidence circuit 350 to prepare that element of the system for subsequent operation. The reduction in potential at the cathode of section 115VA (FIG. 13) results in a reversion of rectifier 433RE to its low-impedance condition to disestablish coincidence in the current decay coincidence circuit 354, and the same reduction in voltage, as applied via conductor 374 (FIG. 13), serves to terminate the coincidence at rectifiers 435RE and 436RE so as to terminate conduction in thyratron 118V at the next negative half-cycle of the anode supply voltage. When this occurs, the voltage signals applied to conductors N', O', P'' and Q'' are terminated.

HEAT CONTROL AND ADJUSTMENT AND FIRING CIRCUIT

(FIGS. 14–19)

The previously described signals which are transmitted via conductors P and Q by the cool-heat circuit of FIG. 10 and via conductors P', Q', P'', and Q'' of the cool-heat plus current-decay circuit of FIG. 13 are employed to control the several heat or phase adjust circuits identified as blocks 15, 16, 17 and 18 in FIG. 1 of the drawings and representative ones of which are detailed in FIG. 16 of the drawings.

On the basis of the foregoing assumption that the preheat cool and heat panel 11 (FIG. 1) and the post heat cool and heat panel 14 are of the type illustrated in FIG. 10 of the drawings, while the weld heat cool and heat panel 12 is of the type represented in FIGS. 11 to 13 of the drawings, the P and Q output conductors from the preheat cool and heat panel 11, identified as conductors P11 and Q11, are connected to the preheat phase adjust unit 15 as shown in FIGS. 1 and 16, the P' and Q' conductors from the weld heat cool and heat panel 12 (FIG. 1), identified as P'12 and Q'12, are connected to the weld heat phase adjust unit 16 shown in FIGS. 1 and 16, the output conductors P14 and Q14 from the post heat cool and heat panel 14 are connected to the post heat phase adjust unit 18 and the corresponding current-decay conductors P''12 and Q''12 from the weld heat cool and heat panel 12 are connected to the current-decay phase adjust panel 17, shown in FIGS. 1 and 16.

Considering first the preheat phase adjust panel 15 detailed on FIG. 16 of the drawings, a positive direct voltage of appropriate magnitude (derived in a fashion to be hereinafter described) is applied to the anodes of the paralleled-section vacuum tube 27VP via conductor 400 and through plate load resistor 214R-P. The cathodes of tube 27VP are connected to ground through a resistance network and the control grid is connected to a negative 20-volt source of biasing potential through resistors 211R-P, 210R-P and 212R-P. A transient filtering capacitor 80C-P is connected in shunt of resistor 210R-P and the two terminals of that capacitor are connected to conductors Q11 and P11 which extend from the cool-heat circuit of FIG. 10 and are there generically identified as leads Q and P.

In the absence of a signal via conductors P11 and Q11, tube 27VP is biased near or below grid cutoff. As before described, during each heat period of the preheat time a positive direct voltage is developed between conductors P11 and Q11 with a polarity such that the right-hand terminal of resistor 210R-P is positive relative to the left-hand terminal of that resistor and hence at a proper polarity to render tube 27VP conductive. That tube acts as a switch and hence may, if desired, be driven to saturation by this signal. The flow of plate current to ground occurs over the one of a plurality of paths which is selected by the setting of switch 18SW-P. As shown, switch 18SW-P is a two-pole, nine-position switch, the two movable poles of which are connected to the respective ends of the resistive element of a potentiometer 4P-P. In the shown setting of switch 18SW-P, the cathodes of tube 27VP are connected through resistor 222R-P, through the resistive element of potentiometer 4P-P, and through resistor 224R-P to ground. The resulting voltage drop across resistor 224R-P and across the portion of the resistive element of potentiometer 4P-P which is proximate thereto will establish the magnitude of the positive potential between the wiper of potentiometer 4P-P and ground. This direct voltage is applied through rectifier 44RE-P and appears between conductor 402 and ground. That voltage is employed for purpose hereinafter to be described. If switch 18SW-P were moved upwardly one step, then the plate current through tube 27VP would flow through a path including resistors 221R-P and 253R-P. Resistor 221R-P is lower in resistance, by a selected amount, than resistor 222R-P, but the sum of the series-connected resistors 221R-P and 253R-P is equal to the resistance of resistor 222R-P so that the total cathode resistance remains constant. However, with the same setting of the potentiometer 4P-P, the voltage developed between conductor 402 and ground would be increased by a selected amount. Similarly, resistors 220R-P to 215R-P are successively smaller in resistance, while resistors 252R-P to 228R-P are successively and correspondingly larger in resistance, resistor 228R-P being equal in value to resistor 222R-P. Thus, the resistance network connectable to the cathode of tube 27VP is set up essentially as a decade resistance unit capable of providing a constant cathode load for tube 27VP. In the shown position of switch 18SW-P, the voltage developed between conductor 402 and ground is a minimum, with that voltage increasing as switch 18SW-P is successively moved upwardly until, at its uppermost position, the voltage developed between conductor 402 and ground is a maximum. As will be seen, this output voltage is employed to control the percent heat so that switch 18SW-P may be calibrated in terms of percent of heat, running from 90 to 100 percent heat at the shown position of switch 18SW-P to 10 to 20 percent heat when that switch is moved to its uppermost position. Potentiometer 4P-P is selected in resistance value so that moving its wiper from one extreme to the other will produce approximately a 10 percent change in heat so that by conjointly setting switch 18SW-P to a selected one of its positions and moving the wiper of potentiometer 4P-P, any degree of heat from 10 percent to 100 percent may be selected.

At the end of each heat period of the preheat time, the direct voltage between conductors P11 and Q11 effectively disappears so that conduction through tube 27VP terminates and the voltage difference between conductor 402 and ground drops, in the preferred arrangement, to or effectively to, zero. Similarly, the potential difference between the wiper of potentiometer 4P-P and ground is zero at all times other than during the heat periods of the preheat time.

The other units in FIG. 16 operate similarly, the weld heat phase adjust unit 16 receiving a direct voltage input signal between conductors Q'12 and P'12 during and only during the heat periods of the weld heat interval and producing during those periods a direct voltage between conductor 402 and ground which varies in accordance with its setting, and the post heat phase adjust unit 18 operating similarly.

The current decay phase adjust unit, including tube 27VS, operates similarly, producing a direct voltage signal between conductor 402 and ground of a selected magnitude whenever the cool-heat and current-decay panel of FIG. 13 produces a direct voltage between conductors Q''12 and P''12, which occurs during the heat periods of the current decay time. It will be observed that conductors Q″12 and P″12 are multiplied to illustrate that unit 17 may be employed as common equipment for a plurality of current decay units if such be provided, that is, if the preheat and post heat panels be in the nature of the cool-heat current decay units illustrated in FIGS. 11 to 13, then the conductors corresponding to conductors Q″ and P″ in those circuits should be connected in multiple with conductors Q″12 and P″12 in the FIG. 16 representation.

The direct voltage signal developed between conductor 402 and ground is applied to the heat control panel shown in FIGS. 14 and 15 of the drawings, conductor 402 appearing on FIG. 15. In general, this signal is applied through a voltage compensating system including tube 40V to an amplifier 33V, resulting in the development between conductors 400 and 404 of the direct voltage which varies in accordance with the functioning and settings of the heat adjust panel shown in FIG. 16 and the magnitude of which varies in accordance with the magnitude of the supply voltage so as to compensate for the welding current variations which would otherwise occur as a result of supply voltage variations.

To develop a suitable source of fixed, direct, reference voltage, a suitable source of alternating voltage 406 (FIG. 15), which may, for example, be taken from one of the phases of the three-phase supply, is applied through transformer 19T, full-wave rectified by means of rectifiers 64RE to 67RE and filtered by means including resistor 256R and capacitors 84C-1 and 84C-2. The resultant direct voltage appearing across capacitor 84C-1 is applied across series-interconnected resistor 255R and gaseous discharge device 39V which serves as a voltage-regulating diode so that a regulated positive direct voltage is developed between conductors 408 and 410.

This voltage is employed as the B-plus voltage for paralleled-section vacuum tube 40V, the plate circuit of that tube extending from conductor 408, resistor 257R, variable resistor 9P, resistor 244R, voltage compensator on/off switch 12SW, anodes of tube 40V, cathodes of tube 40V, and conductor 410.

Tube 40V operates as an amplifier, with the magnitude of the plate current through the above traced path being determined by the magnitude of the line voltage. In the illustrated arrangement, the primary winding of transformer 18T is connected between conductors 502 and 503 of the group of conductors 501 to 503 which are connected to the three-phase welding-current source (see FIG. 19). As a result, the primary winding of transformer 18T is connected across the "B" phase although any of the other phases could equally well be sensed and, if desired, polyphasing could be employed.

The resultant alternating voltage which is induced across the center-tapped secondary winding of transformer 18T is full-wave rectified and filtered by rectifiers 62RE and 63RE, resistor 261R and capacitors 88C and 89C, a direct voltage being developed across capacitor 89C having a polarity as indicated and having a magnitude which varies as a function of the magnitude of the "B" phase of the three-phase supply voltage. This voltage is applied across serially-interconnected resistors 234R and 233R, the lower terminal of resistor 234R being more positive than the upper terminal of that resistor.

Resistor 234R is connected in series with resistor 235R between the control grids and cathodes of tube 40V. A fixed direct voltage is developed across resistor 235R of a polarity tending to bias tube 40V positively. Thus, the anode of voltage regulating tube 39V is connected via conductor 408 through resistor 254R and through resistor 235R to the cathode of tube 39V so that a regulated direct voltage is developed across resistor 235R with the upper terminal of that resistor being positive relative to the lower terminal. This voltage, connected in series with the voltage across resistor 234R in the input circuit of tube 40V, is in a direction to oppose the voltage across resistor 234R and under all normal line voltage conditions, will have a value in comparison with the magnitude of the voltage across resistor 234R such that tube 40V will conduct, a rise in the supply voltage producing an increased potential difference across resistor 234R and a reduction in the conductivity of tube 40V, while a reduction in the supply voltage magnitude will result in a decreased potential drop across resistor 234R and a consequent increase in the current conducted by tube 40V.

The flow of plate current through the previously traced output circuit of tube 40V will result in a potential drop across resistor 257R, with the upper terminal of that resistor being negative relative to the lower terminal, and with the magnitude of that drop varying as a function of the conductivity of tube 40V and hence as a function of the magnitude of the supply voltage.

This voltage is applied, in series with the signal voltage appearing between conductor 402 and ground, to an amplifier tube 33V. Thus, the voltage appearing between conductor 402 and ground is developed across resistor 258R, the right-hand terminal of which is connected to the cathode of tube 33V and to ground. Resistor 258R is connected in series with resistor 257R between the cathode and control grid of tube 33V. The signal voltage across resistor 258R is of a polarity to cause tube 33V to conduct, whereas the voltage across resistor 257R is of a polarity to cause tube 33V to be driven below grid cut-off. Under all normal supply voltage conditions, the presence of a signal on conductor 402, regardless of the setting of the heat adjust units of FIG. 16, will be adequate to produce conduction through tube 33V, whereas in the absence of a signal on conductor 402 (in other words, at all times except during the heat periods of the preheat, weld, current decay or post heat intervals) conduction through tube 33V will either not exist or will be of such a low magnitude as to not produce any effective output signal.

Tube 33V is supplied with a regulated plate voltage. In the representative arrangement disclosed, this voltage is derived by full-wave rectification of a suitable alternating voltage 407. This voltage is applied across transformer primary winding 21TP and the resultant alternating voltage developed across the center-tapped secondary winding 21TS2 is full-wave rectified by means of double diode 36V so as to produce a positive direct voltage across capacitor 90C-1 which is an element of a filter network also including capacitor 90C-2 and inductor 3L. That direct voltage is applied across serially interconnected resistor 237R and voltage-regulating diodes 34V and 35V so that a regulated positive direct voltage is developed between conductor 400 and ground. It is this voltage which is employed to supply the plate circuits of the tubes in the heat adjust panel of FIG. 16.

As before noted, the cathode of tube 33V is grounded and the anode is connected to the positive direct voltage on conductor 400 through plate load resistor 236R which is shunted by capacitor 95C. As a result of the potential drop across resistor 236R, conductor 404 will be at potential which is lower than that on conductor 400 by an amount (during the several heat periods) which varies in accordance with the magnitude of the line voltage and in accordance with the magnitude of the signal between conductor 402 and ground and hence in accordance with the setting of the then-effective one of the heat adjust units 15 to 18 (FIG. 16).

Conductor 400 is connected to the two cathodes of each of the dual-triode vacuum tubes 30V, 31V and 32V (FIG. 14). Conductor 404 is connected to the control grids of tube 30V through resistor 230R, to the control grids of tube 31V through resistor 231R, and to the control grids of tube 32V through resistor 232R. If during any one of the heat periods, the selector switch in the then-effective heat adjust panel 15 to 18 (FIG. 16) is set, for example, to 100 percent heat, a minimum-magnitude voltage is developed between conductor 402 and ground, tube 33V is conducting minimally, and the voltage difference between conductors 400 and 404 is at a minimum so that tubes 30V to 32V (FIG. 14) are conducting to an effective maximum value and presenting a minimum effective resistance to the flow of plate current therethrough. Conversely, if, during that same interval, the selector switch of the then-effective heat adjust panel (FIG. 16) had been set to low heat, a voltage approaching maximum would have been developed between conductor 402 and ground, conduction through tube 33V would approach its maximum value, a relatively large potential difference would be developed between conductors 400 and 404 and tubes 30V to 32V would be conducting to a minimum value, offering a relatively large resistance to the flow of plate current therethrough.

Tubes 30V, 31V and 32V act as unidirectional current conducting devices of variable conductivity and serve as the variable resistance elements of phase-shifting circuits associated with the "A," "B" and "C" phases, respectively.

The two paralleled primary windings of transformer 15T are connected between the three-phase supply conductors 501 and 502 and hence are connected across the "A" phase, the two paralleled primary windings of transformer 16T are connected between conductors 502 and 503 and hence are connected across the "B" phase, while the two paralleled primary windings of transformer 17T are connected between conductors 503 and 501 and hence across the "C" phase of the three-phase supply.

To assist in the understanding of the phase relationships, the transformer windings in FIGS. 14 through 19 are marked at one end with an "S" (denoting the "start" end of the winding). In any one transformer, all of the winding ends which bear that designation may be considered, for purposes of analysis of the polarities, to be interconnected.

Since the three phase-shifting circuits are identical, only the "A" phase shifter will be described in detail. Transformer 15T is provided with two secondary windings 15TS1 and 15TS2. Under the assumption that, as an instantaneous condition, the left-hand terminals of the two primaries of transformer 15T are positive relative to the right-hand terminals of those primary windings, the left-hand terminal of secondary 15TS1 and the left-hand terminal of secondary winding 15TS2 will both be positive relative to their right-hand terminals. The left-hand terminal of transformer secondary 15TS1 is connected to the anodes of tube 30V through rectifier 50RE and to the cathodes of tube 30V through rectifier 52RE, while the right-hand terminal of transformer secondary 15TS1 is connected through the primary winding of transformer 22T to the anodes of tube 30V through rectifier 51RE and to the cathodes of that tube through rectifier 53RE.

Assuming tube 30V to be conductive as a result of the application of an appropriate potential difference between conductors 400 and 404, under the illustrated instantaneous conditions, conventional current will flow from the left-hand terminal of secondary 15TS1, through unidirectional current conducting device or rectifier 50RE (which is poled for low impedance to conventional current flow in the direction of its arrow), through the paralleled anode-cathode paths in tube 30V, through rectifier 53RE, primary winding of transformer 22T, and back to the right-hand terminal of secondary 15TS1. As a result of this current flow, a voltage will be developed across the primary winding of transformer 22T of an instantaneous polarity such that the lower terminal thereof is positive relative to the upper terminal, which will result in the induction of correspondingly poled potentials in the secondary windings of that transformer.

At the opposite half-cycle of the "A" phase signal, conventional current will flow from the right-hand terminal of transformer 15TS1, through primary winding 22T, rectifier 51RE, through the paralleled anode-cathode paths of tube 30V, rectifier 52RE, and back to the left-hand terminal of transformer secondary 15TS1, reversing the polarity of the voltage across the primary winding of transformer 22T and resulting in a reversal of the voltages induced in the secondary windings of that transformer. It is important to observe that the current flow during both half-waves of the "A" phase signal is through the same tube 30V so that, with a constant applied signal between conductors 400 and 404, the resistance offered to that current flow will be constant and equal during both half-cycles of the applied alternating voltage. While different pairs of the rectifiers 51RE–52RE and 50RE–53RE are employed during the two half-cycles, such rectifiers do not normally vary greatly in their forward resistance and, in any event, their forward resistance is so small relative to the effective plate resistance of tube 30V that variations in their forward resistances will not produce a significant variation in the current flow during the two half-cycles of the supplied alternating current. It will be appreciated that a single triode could well be used for tube 30V under this arrangement, although it has been found to be advantageous in the averaging out of variations to employ paralleled dual triodes as shown.

When the left-hand terminal of secondary winding 15TS2 is positive relative to the right-hand terminal of that secondary, conventional current will flow from the left-hand terminal, through the primary winding of transformer 22T, and through a reactive means in the form of capacitor 85C, and back to the right-hand terminal of secondary 15TS2, and a reverse current flow will occur during the opposite half-cycle of the applied "A" phase alternating voltage. This signal through the primary winding of transformer 22T is phase shifted, by the action of capacitor 85C, 90 degrees with respect to the current through that primary winding and through the tube which acts as the resistive component of the phase shifting apparatus. The effective output signal, therefore, will be shifted in phase in relation to the "A" phase supply voltage by an amount determined by the conductivity of tube 30V and hence by the voltage difference between conductors 404 and 400, which voltage difference in turn reflects the setting of the heat adjust unit and the magnitude of the effective supply voltage, as before described. This phase shifted voltage is developed across the secondary windings of transformer 22T so that it appears between terminal leads 410 and 412 and between terminal leads 414 and 416.

Transient suppressing capacitors 132C, 97C and 98C are shown connected across the secondaries of transformers 15T and 22T.

It will be observed that by virtue of the establishment of a common path through tube 30V for both half waves of the alternating voltage, the two half-cycle currents will be closely identical so that the amount of the effective phase shift of the signal at the output terminals 410 to 416 will be equal on the two half cycles so as to contribute to the establishment of balanced positive and negative half-cycle currents in the welding transformer.

In a similar fashion, an alternating voltage is developed between terminal leads 418 and 420 and between terminal leads 422 and 424 which is phase-shifted from the "B" phase voltage by an amount determined by the direct voltage difference between conductors 400 and 404 and an alternating signal is developed between terminal leads 426 and 428 and between terminal leads 430 and 432 which is phase-shifted from the "C" phase voltage by an amount determined by the potential difference between conductors 400 and 404.

Leads 414 and 416 are connected to the A-positive controller including tube 51V in FIG. 18 of the drawings, leads 410 and 412 are connected to the A-negative controller including tube 52V shown in FIG. 18 of the drawings, conductors 422 and 424 are connected to the B-positive controller including tube 53V in FIG. 18 of the drawings, conductors 418 and 420 are connected to the B-negative controller including tube 54V on FIG. 19 of the drawings, conductors 430 and 432 are connected to the C-positive controller including tube 55V in FIG.

19 of the drawings, and conductors 426 and 428 are connected to the C-negative controller including tube 56V shown in FIG. 19 of the drawings. The operation of these controllers will be described hereinafter.

As before noted, it is assumed that a cool-heat unit of the type illustrated in FIG. 10 of the drawings is employed for the preheat cool and heat unit 11 (FIG. 1) and for the post heat cool and heat unit 14. It will be recalled that the equipment of FIG. 10 serves to supply to output conductors N and O a series of positive-going pulses at a nominal rate of 60 pulses per second, the pulses on conductors N and O being in phase with one another. These pulses are transmitted for the duration of each heat period and are not transmitted during each cool period or at any other time. It will be further recalled that the phase of the pulses on conductors N and O is inverted at the end of each heat period if full-cycle welding is employed. Thus, during one heat period, the pulses on conductors N and O will be in phase with the positive half cycles of the "C" phase of the three-phase supply, while during the next succeeding heat period, those positive pulses will be in phase with the negative half cycles of the "C" phase of the three-phase supply. Similarly, if the cool-heat plus current decay equipment illustrated in FIGS. 11 to 13 is employed, corresponding positive pulses will be transmitted via conductors N' and O' (FIG. 13) during each heat period, with the phase of those pulses being inverted preliminary to each of the successive heat periods.

The signals are applied to the portion of the heat control unit which is shown in FIG. 15 of the drawings in which conductors N'12 and O'12 are the counterparts of conductors N' and O' in the unit of FIG. 13 when that unit is employed as the weld heat cool and heat with optional current decay equipment 12 of FIG. 1. Similarly, conductors N11 and O11 in FIG. 15 are connected to conductors N and O of FIG. 10 unit which is employed as the preheat cool and heat equipment 11 in FIG. 1, and conductors N14 and O14 are connected to the N and O conductors of the FIG. 10 circuit when that circuit is employed as the post heat cool and heat equipment 14 of FIG. 1.

Pulses received via conductors N'12, N11 or N14 are developed across resistor 315R (FIG. 15) and are applied through a network including capacitor 94C, resistor 239R, and resistor 238R (which is connected to a source of negative biasing potential) to the control grid of thyratron 37V. In a similar manner, the pulses received via conductors O'12, O11 and O14 are applied to the control grid of thyratron 38V.

The cathodes of both thyratrons are grounded. The anode of thyratron 37V is connected through primary transformer winding 13TP to one terminal of transformer secondary winding 25TS1, the other terminal of which is grounded. Correspondingly, the anode of thyratron 38V is connected through primary transformer winding 14TP to one side of transformer secondary winding 25TS2, the other terminal of which is grounded. Secondary windings 25TS1 and 25TS2 are associated with primary winding 25TP which is connected across the "C" phase of the three-phase welding supply by virtue of its connection between conductors 501 and 503. Instantaneous voltage conditions at the transformer 25T are indicated upon FIG. 15 of the drawings to demonstrate the polarization of the several windings and to indicate that the two secondary windings 25TS1 and 25TS2 are connected so as to effectively be 180 degrees out of phase with one another, that is, the instant in the cycle at which the anode of thyratron 38V is positive, the anode of thyratron 37V will be negative, and vice versa.

It will be recalled that whenever an input signal is received, it will be concurrently received via terminal leads N'12 and O'12, or via terminal leads N11 and O11, or via terminal leads N14 and O14, and it will further be recalled that these concurrently received input pulses are in phase with one another. Since those pulses were derived, as previously discussed, from the "C" phase voltage, the concurrently received positive pulses applied via one of the pairs of conductors N'12–O'12, N11–O11, or N14–O14, will be in phase with the positive half cycles of the alternating voltage applied to the anode of one of the thyratrons 37V and 38V and out of phase with the positive half cycle of the anode voltage applied to the other one of those thyratrons. Under that condition, only the thyratron which receives the in-phase signal voltage will fire, conducting an alternating voltage signal through the associated transformer primary winding 13TP or 14TP. Therefore, only one of the primary windings 13TP or 14TP will be energized at any given time.

It will further be recalled that due to the operation of the phase inverter of FIG. 7, the positive pulses applied to any one of the pairs of conductors N'12–O'12, N11–O11, or N14–O14 will be inverted in phase relative to the "C" phase prior to the commencement of each heat interval (and normally immediately the termination of each heat interval). As a result of this phase inversion, the grid voltage and plate voltage of the other one of the two thyratrons 37V and 38V will be in phase so that the other one of the two transformer primaries 13TP and 14TP will be energized. Thus, with full-cycle welding, transformer primaries 13TP and 14TP will be alternately energized for the successive heat periods.

The secondary windings 13TS and 14TS which are associated with the transformer primary windings 13TP and 14TP, respectively, are located, for clarity of representation, in FIG. 17 of the drawings, appearing in the grid circuits of thyratrons 45V and 46V, repectively. Tubes 45V and 46V form a part of a commutation circuit also including tubes 47V to 50V.

As a source of fixed bias for the thyratrons 45V to 50V, a suitable source of alternating voltage 406 is connected across the primary winding of transformer 510, and the resulting voltage induced in the secondary is applied through a resistor 280R to a full-wave rectifying bridge including rectifiers 81RE through 84RE. In view of the full-wave rectification and the filtering of the alternating voltage, it is not imperative that source 406 have any necessary phase relationship to the "C" phase of the three-phase supply. In practice, however, the secondary winding of transformer 510 has been an additional secondary winding on transformer 37T (FIG. 19) which, it will be observed, is connected to the "C" phase of the three-phase welding current source.

The full-wave rectified voltage is filtered and reduced in magnitude by means of the network including capacitors 113C–1 and 113C–2 and resistors 279R and 278R, resulting in the establishment of a direct voltage between conductors 512 and 514 of an appropriate amplitude and of a polarity such that conductor 512 is positive relative to conductor 514. Conductor 512 is connected to the cathode of each of the thyratrons 45V to 50V, and conductor 514 is connected to the control grid of each of the thyratrons via a plurality of similar circuits, such as the circuit for tube 45V including resistors 262R and 263R, the latter of which is bypassed by capacitor 106C–1. The resultant voltage difference between the grid and the cathode of each of the thyratrons 45V to 50V is such as to hold those tubes in their extinguished conditions.

Secondary winding 13TS and rectifier 75RE are connected in series with one another across resistor 263R and secondary winding 14TS and rectifier 76RE are connected in series with one another across resistor 264R which is connected, via resistor 265R, to the control grid of thyratron 46V. As before noted, transformer secondaries 13TS and 14TS are alternatively energized. When transformer secondary 13TS is energized, the alternating voltage appearing thereacross is half-wave rectified by rectifier 75RE so as to develop a pulsating direct voltage across resistor 263R of a polarity to make the left-hand terminal of that resistor positive relative to the right-hand terminal, capacitor 106C–1 being too small to fully filter the ripple frequency. This signal voltage is applied through the transient suppression network including resistor 262R and capacitor 105C to the control grid of thyratron 45V and overcomes the negative bias applied between the control grid and cathode of that thyratron. The anode of thyratron 45V is connected through primary transformer winding 29TP to the left-hand terminal of transformer secondary winding 26TS1, the right-hand terminal of which is connected, as a return, to the cathodes of the several thyratrons.

Correspondingly, transformer secondary 14TS, when energized, will function with rectifier 76RE to develop a pulsating direct voltage across resistor 264R of a polarity to tend to render the grid of thyratron 46V positive relative to the cathode of that thyratron and to overcome the applied negative bias and to cause that thyratron to conduct over a path including primary winding 30TP and secondary winding 26TS2. The two parallel-connected, in-phase primary windings 26TP1 and 26TP2 of transformer 26T are connected between conductors 501 and 502 so that they are connected across the "A" phase of the three-phase welding voltage supply. Transformer secondary windings 26TS1 and 26TS2 are connected 180 degrees out of phase with one another, in relation to their connections to the anodes of thyratrons 45V and 46V. Thus, when coductor 501 is positive and conductor 502 is negative, the left-hand terminal of secondary 26TS1 will be positive as will the left-hand terminal of transformer secondary 26TS2.

While the rectified alternating voltage across transformer secondary 13TS or 14TS could be filtered to substantially completely eliminate the ripple frequency, it has been found that improved precision of operation can be achieved if the ripple is permitted to remain and if the phasing of the secondary windings 13TS and 14TS is selected to insure precision of the firing point of tubes 45V and 46V. Thus, in the preferred arrangement in which transformer secondaries 13TS and 14TS are energized from a "C" phase supply, the polarity of winding 13TS is selected so that its left-hand terminal will start positive while the anode voltage of tube 45V is negative and will be sufficiently positive to permit discharge of tube 45V prior to the time that the potential at the anode of tube 45V has risen sufficiently positive to initiate discharge in that tube. Since the positive pulsating voltage which is applied to the control grid of tube 45V leads the anode voltage of that tube by approximately 60 degrees, it is the anode voltage supplied to tube 45V which will determine the instant of firing.

Similarly, the polarity of secondary winding 14TS is selected so that the pulsating positive voltage applied to the control grid of tube 46V will lead the anode voltage of that tube by approximately 60 degrees. Therefore, when thyratron 37V (FIG. 15) is discharged, thyratron 45V will conduct at the next ensuing positive half cycle of the "A" phase supply voltage (conductor 501 positive relative to conductor 502) while when thyratron 38V (FIG. 15) is discharged, thyratron 46V will fire on the next positive half cycle of the alternating voltage applied to its anode which, as above noted, is 180 degrees out of phase with the "A" phase voltage existing between conductors 501 and 502. This, of course, is as it should be since tube 38V conducts on the opposite "C" phase half cycles from thyratron 37V.

Therefore, tube 45V operates as an A-positive switch, controlling the energization of transformer primary 29TP and thyratron 46V operates as an A-negative switch, controlling the energization of primary winding 30TP.

Transformer primary 29TP is magnetically linked with secondary windings 29TS1 (FIG. 18) as well as with secondary winding 29TS2 (FIG. 17) at the B-positive switch including thyratron 47V. Similarly, transformer primary 30TP is magnetically associated with secondary winding 30TS1 in FIG. 18 and with secondary winding 30TS2 at the B-negative switch including thyratrons 48V in FIG. 17 of the drawings. Therefore, when thyratron 45V is fired at a precisely determined point of the rising portion of an "A" phase positive half cycle, both secondary 29TS1 and secondary 29TS2 are energized.

The resultant "A" phase voltage induced in secondary winding 29TS2 is half-wave rectified by rectifier 77RE (FIG. 17) and developed across the parallel resistor 269R and capacitor 107C–1, the filtering again being inadequate to prevent a pulsating voltage from appearing at the junction of resistors 268R and 269R and being applied to the control grid of thyratron 47V. The polarity of the voltage developed across resistor 269R is again such as to overcome the negative biasing voltage applied to thyratron 47V and to produce firing of that thyratron.

The anode of thyratron 47V is connected through primary winding 31TP to the left-hand terminal of secondary winding 27TS1 of transformer 27T, the right-hand terminal of which is connected to the cathode of thyratron 47V. The primary windings of transformer 27T are connected between conductors 502 and 503 and hence to the "B" phase of the welding current supply, and a voltage is induced in secondary winding 27TS1 which is in phase with the "B" phase supply voltage. Therefore, the pulsating voltage applied to the control grid of thyratron 47V (derived as described from the "A" phase voltage) leads the applied anode voltage by approximately 60 degrees so as to again insure accuracy of the firing point of thyratron 47V.

Similarly, when thyratron 46V is fired to energize primary winding 30TP, a voltage which is 180 degrees out of phase with the "A" phase voltage is induced in secondary winding 30TS1 (FIG. 18) and secondary winding 30TS2 (FIG. 17). The energization of secondary winding 30TS2 will cause thyratron 48V to be fired to energize primary winding 32TP with a voltage which is 180 degrees out of phase with the "B" phase voltage.

The energization of primary winding 31TP will result in the induction of "B" phase voltages in secondary winding 31TS1 (FIG. 18) and in secondary winding 31TS2 (FIG. 17). The energization of secondary winding 31TS2 results, in a manner similar to that above described, in the firing of thyratron 49V at the next positive half cycle of the "C" phase voltage since the anode supply for thyratron 49V is derived through transformer 28T the primaries of which are connected between conductors 501 and 503. This results in the energization of the primary winding 33TP with a voltage which is in phase with the "C" phase voltage.

Similarly, the energization of primary winding 32TP in the anode circuit of thyratron 48V results in voltages which are 180 degrees out of phase with the "B" phase voltage being induced in secondary winding 32TS1 (FIG. 19) and in secondary winding 32TS2 (FIG. 17). The energization of secondary winding 32TS2 results in the firing of thyratron 50V since the anode of thyratron 50V is connected through primary winding 34TP to a source of voltage which is 180 degrees out of phase with the "C" phase of the supply voltage. Thyratron 50V will fire at the next positive half cycle of that voltage, producing energization of primary winding 34TP with a voltage which is 180 degrees out of phase with the "C" phase voltage.

The energization of primary winding 33TP as a result of the firing of thyratron 49V results in the induction in secondary winding 33TS1 (FIG. 19) of an alternating voltage which is in phase with the "C" phase voltage and the energization of primary winding 34TP (FIG. 17) as a result of the firing of thyratron 50V results in the induction in secondary winding 34TS1 (FIG. 19) of an alternating voltage which is 180 degrees out of phase with the "C" phase voltage.

In summary, it will be appreciated that, assuming full-cycle welding, at the initiation of one heat period by unit 11, 13 or 14 (FIG. 1), transformer secondary windings 29TS1 (FIG. 18) in the A-positive commutation control circuit, secondary winding 31TS1 in the B-positive commutation control circuit, and transformer secondary 33TS1 (FIG. 19) in the C-positive commutation control circuit will be energized in sequence with "A," "B" and "C" phase voltages, respectively. At the initiation of the next heat period, transformer secondary winding 30TS1 (FIG. 18) in the A-negative commutation control circuit, transformer secondary 32TS1 (FIG. 19) in the B-negative commutation control circuit and transformer secondary 34TS1 in the C-negative commutation control circuit will be sequentially energized with voltages which are 180 degrees out of phase with the "A," "B" and "C" phase voltages, respectively. Once secondaries 29TS1, 31TS1 and 33TS1 or secondaries 30TS1, 32TS1 and 34TS1 are energized during any single heat period, they will continue to be energized throughout the duration of that heat period.

The firing control equipment shown in FIGS. 18 and 19 of the drawings includes a first pair of back-to-back connected ignitrons IA1 and IA2 (FIG. 18) for controlling the application of the "A" phase voltage to primary winding 530 (FIG. 19) of the welding transformer TRW, a second pair of back-to-back connected ignitrons IB1 and IB2 (FIG. 19) for controlling the application of the "B" phase voltage to primary winding 532 of transformer TRW, and a third pair of back-to-back connected ignitrons IC1 and IC2 for controlling the application of the "C" phase welding supply voltage to primary winding 534 of the welding transformer TRW.

Six individual thyratron control circuits control the individual ignitrons, the A-positive controller including thyratron 51V (FIG. 18) controlling ignitron IA1, the A-negative controller including thyratron 52V controlling ignitron IA2, the B-positive controller including thyratron 53V controlling ignitron IB1 (FIG. 19), the B-negative controller including thyratron 54V controlling ignitron IB2, the C-positive controller including thyratron 55V controlling ignitron IC1, and the C-negative controller including thyratron 56V controlling ignitron IC2.

The circuits of FIGS. 18 and 19 are energized from a three-phase supply voltage appearing at conductors 501, 502 and 503 which extend to FIGS. 18 and 17 and which preferably are and are illustrated to be the same conductors which appear in FIGS. 14 and 15 of the drawings to demonstrate the phase relationships. The welding current conductors 501a, 502a and 503a (FIG. 19) are connected through the individual fuses 536, 538 and 540 and through contactor 542 to conductors 501, 502 and 503, respectively.

The anode of thyratron 51V (FIG. 18) is connected to conductor 501a through contact 4CRa and the cathode of that tube is connected to conductor 502a via a circuit including resistor 548, fuse 550, the igniter circuit of ignitron IA1, conductor 552 and primary winding 530 (FIG. 19) of transformer TRW. The anode of thyratron 52V is connected to conductor 502a through the primary winding 530 of transformer TRW, conductor 552 and contacts 5CRa, while the cathode of that tube is connected to conductor 501a via a circuit including resistor 554, fuse 556 and the igniter circuit of ignitron IA2. Contacts 4CRb, 5CRb, 4CRc and 5CRc are similarly connected in the anode circuits of thyratrons 53V, 54V, 55V and 56V, respectively.

It will be recalled that in the discussion of FIG. 2 of the drawings, it was stated that relay 4CR is operated to control the positive firing tubes and relay 5CR is operated to control the negative firing tubes, and under the assumed conditions, both relays are operated so that all of thte contacts 4CRa to 4CRc and 5CRa to 5CRc are closed.

The control means for each of the firing control thyratrons includes a source of negative biasing voltage, a keying or enabling means and a firing means. It is well recognized that in thyratron control circuits of this nature, it is important to provide means for absorbing transient pulses so as to prevent the possibility of random firing of the thyratrons. A common form of such means was above described in connection, for example, with thyratron 45V in FIG. 17 of the drawings in which capacitor 106C–1 and, primarily, the RC network including resistor 262R and capacitor 105C are provided to fulfill that function. While such means can be designed to be fully effective, it is apparent that a time delay is necessarily imposed by the provision of such an RC network, delaying the application of the full voltage to the control grid of the thyratron. While it is necessary to prevent transient pulses from producing improper firing of thyratrons 51V to 53V (FIG. 18) and 54V through 56V (FIG. 19), the time delay imposed by the use of a resistance-capacitance transient-absorbing or by-passing network is undesirable, and even more importantly, variations in the firing points of those several thyratrons resulting from variations of the time constants of the individual transient-absorbing networks associated therewith are to be avoided.

Consequently, the control circuits of FIGS. 18 and 19 have been devised so that the resistance component of the normal resistance-capacitance transient-absorbing network is reduced to a negligible value so that the time constant is also reduced to a negligible value. As a result, variations in the size of the transient-absorbing capacitors will produce no significant change in the firing points of the several thyratrons, and in practical embodiments of the invention, it was found that the values of the transient-absorbing capacitors in the thyratron control circuits could be changed materially without producing any significant change in the firing points, even though the values of the capacitors associated with the several thyratrons 51V to 56V varied substantially from one another.

Considering first the control circuit for thyratron 51V, the source of negative biasing potential is derived from rectification of an alternating voltage appearing across secondary winding 35TS1 of transformer 35T (FIG. 18). The primary winding 35TP of that transformer is connected across the "A" phase voltage between conductors 501 and 502. While, as will be described, the alternating voltage appearing across transformer secondary 35TS1 is rectified and filtered, it will be observed that the polarities of the transformer windings are such that the grid-to-cathode biasing voltage produced by this arrangement is in phase with the "A" phase voltage and hence in phase with the anode-to-cathode voltage of thyratron 51V (as well as in phase with the hereafter described keying or enabling voltage) so that the effect of any unfiltered ripple frequency (with half-wave rectification) is without significance.

The alternating voltage developed across secondary winding 35TS1 is rectified by unidirectional current conducting device 87RE and developed across resistor 284R and capacitor 115C which are connected in parallel with one another. Rectifier 87RE is polarized so that the right-hand terminal of resistor 284R, which is connected to the cathode of tube 51V, is positive relative to the left-hand terminal of that resistor. The left-hand terminal of resistor 284R is connected, through a circuit to be described, to the control grid of thyratron 51V. The value of the voltage across resistor 284R is such as to hold thyratron 51V well below its critical grid value.

The voltage across resistor 284R and capacitor 115C is connected, in the grid-cathode circuit of tube 51V, in series with a voltage developed across resistor 281R and its paralleled capacitor 114C. This latter voltage is designed to effectively nullify the negative biasing voltage appearing across resistor 284R and capacitor 115C.

It will be recalled from the foregoing discussion of the circuits of FIG. 17 that secondary winding 29TS1 (FIG. 18) is energized with a voltage which is in phase with the "A" phase voltage during each positive-firing heat interval. This voltage (which may be stepped up by the transformer including the primary winding 29TP of FIG. 17 and the secondary winding 29TS1 of FIG. 18) is half-wave rectified by unidirectional current conducting device 85RE and developed across resistor 281R and capacitor 114C. Device 85RE is polarized so that the right-hand terminal of resistor 281R is positive relative to the left-hand terminal of that resistor, the latter terminal being connected to the left-hand terminal of resistor 284R. Further, the transformer including secondary winding 29TS1 is appropriately polarized so that the pulsating voltage appearing across resistor 281R as a result of inadequate filtering by capacitor 114C is in phase (as viewed from grid to cathode) with the plate voltage of thyratron 51V. In a practical embodiment of the invention, resistors 281R and 284R each had a value of 100,000 ohms, capacitor 115C had a value of 2 microfarads and capacitor 114C had a value of 0.1 microfarad.

The voltage across resistor 284R is applied in series with the voltage across resistor 281R from the cathode of tube 51V to the control grid of that tube through resistors 282R and 283R (each of which, in the noted practical embodiment, had a value of 51,000 ohms). However, a network including rectifier 86RE shunted by capacitor 116C is connected from a point between resistors 282R and 283R to the cathode of tube 51V and hence in shunt of the above-noted sources of biasing and enabling voltages. Consequently, the voltage at the junction of resistors 282R and 283R cannot rise above cathode potential. Therefore, while the keying or enabling voltage developed across resistor 281R is preferably greater than the voltage developed across resistor 284R to insure consistent operation, the control grid of the thyratron 51V will not be effectively raised above cathode potential by that voltage.

Thyratron 51V is now prepared to fire but is prevented from firing as a result of the application of an alternating voltage between its grid and cathode via conductors 414 and 416 from FIG. 14 and through rectifier 88RE which is poled to tend to prevent the control grid from being rendered positive relative to the cathode by this source of alternating voltage.

Reverting to FIG. 14, it will be recalled that the phase-shifting circuit including tube 30V causes an alternating voltage to be developed across capacitor 98C and between terminal leads 414 and 416 for the duration of each heat period, that alternating voltage being derived from the "A" phase voltage but being phase-shifted therefrom (in a lagging direction) by an amount determined by the setting of the then-effective one of the phase adjust circuits of FIG. 16 and by the effective line voltage as detected by the voltage compensator equipment of FIG. 15. The polarity of this alternating voltage is established so that the voltage signal from grid to cathode of thyratron 51V is lagging the plate supply voltage of thyratron 51V by an appropriate amount (e.g., from 30 degrees to 150 degrees). Since the effect of the enabling circuit including resistor 281R is to overcome the action of the negative biasing circuit including resistor 284R, so as to tend to establish a zero-bias condition for tube 51V, and since rectifier 88RE is poled to prevent the alternating voltage between conductors 414 and 416 from driving the control grid of tube 51V positive relative to the cathode, it will be apparent that the alternating voltage holds thyratron 51V from conducting until it rises from its most negative value to a point at which the grid-to-cathode voltage of tube 51V reaches the critical grid value, a point which, of course, will be determined by the amount of phase shift which has been selected to produce the desired amount of heat. When that point is reached, thyratron 51V will fire to initiate conduction in ignitron IA1 to produce energization of primary winding 530 (FIG. 19) of the welding transformer TRW.

It will be observed that resistor 283R at the control grid of tube 51V (FIG. 18) serves an isolating function to prevent rectifier 86RE from having any significant effect upon the alternating voltage appearing between terminal leads 414 and 416.

Capacitor 116C (FIG. 18) connected in shunt of rectifier 86RE and capacitor 98C (FIG. 14) connected between conductors 414 and 416 by-pass those transient signals which would tend improperly to fire thyratron 51V (FIG. 18). However, it will be observed that the only resistance in series with capacitor 98C between the grid and cathode of tube 51V is the forward resistance of rectifier 88RE which is very small. Therefore, while transients which would otherwise be applied between the control grid and cathode of thyratron 51V from and through the secondary winding of transformer 22T (FIG. 14) are by-passed, yet there is effectively no delaying of the application of the signal between conductors 414 and 416 to the control grid of thyratron 51V. Since the time constant of the filter circuit is very short, variations in the value of these capacitors among the several thyratron control circuits do not produce any significant change in the firing points of those several thyratrons.

The other thyratron control circuits function in a similar manner and need not be described in detail except to note that the enabling voltage for thyratron 52V is derived from the alternating voltage signal across secondary winding 30TS1 which is 180 degrees out of phase with the "A" phase voltage, that the biasing voltage is derived from an alternating voltage which is in phase with the enabling voltage source, and that the firing potential is applied from the circuit of FIG. 14 via terminal leads 410 and 412. The remaining B-positive, B-negative, C-positive and C-negative thyratron control circuits are each individually associated with appropriately phased alternating voltages from which the biasing and enabling potentials are derived and with appropriately phase shifted firing voltages.

VOLTAGE DEVIATION AND AIR PRESSURE DIFFERENTIAL
*(FIGS. 20A and 20B)*

The voltage deviation circuit represented in FIG. 20A of the drawings is adapted to shut down the equipment in the event the supply voltage deviates from its nominal value by more than a preselected percentage, such as 10% in either direction..

Terminals 501, 502 and 503 are connected to the same source of three-phase voltage which is employed elsewhere in the system so that phase A is applied across the primary winding of transformer 65T, phase B is applied across the primary winding of transformer 66T, and phase C is applied across the primary winding of transformer 67T. In the illustrated arrangement, a common core structure for all three of those transformers is depicted.

The voltage appearing across each of the secondary windings of transformers 65T, 66T and 67T is full-wave rectified, and the resultant pulsating direct voltages are averaged so as to apply across a voltage divider comprising resistors 490R and 491R a direct voltage the magnitude of which varies in accordance with the average amplitude of the three phases of the applied input alternating voltage. To the upper terminal of the secondary winding of transformer 65T and the lower terminal of the secondary winding of transformer 67T is connected a forward current conducting rectifier 180RE and a return current conducting rectifier 181RE; to the common terminal between the secondary windings 65T and 66T is connected a forward current conducting rectifier 182RE and a return current conducting rectifier 183RE; and to the common terminal of the secondary windings of transformers 66T and 67T is connected a forward current conducting rectifier 184RE and a return current conducting rectifier 185RE. The forward and return current conducting rectifiers are respectively multipled. The multipled output terminals of the forward current conducting rectifiers 180RE, 182RE and 184RE are connected to one terminal of a low-pass filter comprising capacitors 197C1 and 197C2 and choke 4L, the other input terminal to that filter being connected to the input terminals of the three multipled return-current conducting rectifiers 181RE, 183RE and 185RE. The voltage divider network including resistors 490R and 491R is connected across the output of the filter.

When the mechanically-coupled switches 13SWA and 13SWB are closed, a positive direct voltage is connected across the series interconnected resistors 492R and 493R, this direct voltage being of a magnitude, for example, of 300 volts and desirably being regulated. As a result, a fixed voltage appears across resistor 493R and hence between the junction of resistors 492R and 493R and ground, as well as between the junction of resistors 490R and 491R and ground. As an example, this voltage may be in the order of 90 volts.

The system parameters are preferably selected so that the voltage drop appearing across resistor 491R as a result of the rectification of the input alternating voltage is somewhat greater than the representative 90 volt reference voltage, as for example, 105 volts when the alternating line voltage is at its nominal value. As a result, a direct voltage which is negative relative to ground is applied through resistor 494R to the control grid of vacuum tube 78V. The anode of tube 78V, which may be a power pentode connected as a triode, is connected through load resistor 495R to the positive 300 volt supply voltage and the cathode of that tube is grounded.

With the switch element 13SWB closed, the alternating voltage appearing between terminals 501 and 503 is applied both across the primary winding of transformer 55T and the coil of a time delay relay TD1. After a preselected period of time, relay TD1 operates to close its contacts TD1a which, since contacts VCRc are normally closed, completes the circuit for applying the output signal from tube 78V to meter M1. The upper terminal of the coil M1A of the meter M1 is connected to the anode of tube 78V while the lower terminal of that coil is connected through the closed contacts TDa and VCRc to the movable element of a variable voltage divider or potentiometer 10P, the resistance element of which is connected between the 300-volt source and ground, that potentiometer permitting adjustment of the meter. With the three-phase supply voltage at its normal value, there is no voltage difference appearing across the coil M1A so that the meter is not deflected. If the three-phase line voltage becomes reduced in amplitude, the voltage drop across resistor 491R will diminish, the voltage of the control grid of tube 78V will become less negative, the voltage at the anode of tube 78V will decrease, and current will flow through the coil M1A in a direction to deflect the needle to the left (in the illustrated arrangement). The reverse is true upon an increase in the three-phase supply voltage. If the deviation exceeds the preselected amount, the low or high contacts of the meter M1 will be closed.

A capacitor 199C is connected in series with a rectifier 187RE across the secondary winding of transformer 55T and another capacitor 198C is connected in series with a rectifier 186RE across that same secondary winding, the two rectifiers being reversely poled. As a result, a half-way rectified direct voltage appears across each of the capacitors 198C and 199C. If the low contacts of the meter M1 are closed, meter winding M1B and the winding of relay 11CR are connected in series with one another across capacitor 198C, whereas if the high contacts of the meter M1 are closed, the voltage across capacitor 199C is applied across a series circuit including meter winding M1B and the winding of relay 12CR. Thus, if the three-phase voltage becomes too low, relay 11CR is operated, and if the three-phase voltage becomes too high, relay 12CR is operated, winding M1B being energized in either case. Winding M1B operates as the coil of an electromagnet to hold the meter contacts closed, in the well-known manner, until reset switch 14SW is depressed.

If relay 11CR is operated, its contacts 11CRa and 11CRb close to operate relay VCR and to energize the low limit lamp, whereas if relay 12CR operates, its contacts 12CRa and 12CRb close to operate relay VCR and to energize the high limit lamp. The two normally closed contacts VCRa and VCRb of relays VCR appear on FIG. 3 of the drawings, and the opening of those contacts results in termination of the operation of the equipment at the end of the instant cycle of operation, as previously discussed.

Since relay VCR is adapted to terminate or prevent automatic operation of the system, it may also be employed to perform that same function if it is desired to set the equipment for tip dressing (by operating switch 295 in FIG. 9 as above described), or if the air pressure applied for the pneumatically operated equipment in the system falls below or rises above preselected limits.

The former control is exercised through contacts 8CRa which are contacts of relay 8CR in the forge delay circuit shown on FIG. 9, while the latter control is exercised through contacts 15CRb and 16CRb. These three sets of contacts are each connected in series with the winding of relay VCR and are connected in parallel not only with each other but also with contacts 11CRa and 12CRa so that the closure of any one of those five sets of contacts will produce operation of relay VCR.

Referring now to FIG. 20B, the high-pressure limit switch and the low-pressure limit switch are respectively operated if the pneumatic pressure in the system exceeds or falls below the preselected limit values. Closure of the high-pressure limit switch connects the winding of relay 15CR and the high-pressure lamp across the source of alternating line voltage, assuming the "on" switch 19SW has been operated. Relay 15CR, in operating, closes its contact 15CRa to complete a locking or sealing circuit for itself and additionally closes contacts 15CRb. If the low-pressure limit switch is operated, relay 16CR and the low-pressure lamp are energized, relay 16CR locking itself energized and closing contacts 16CRb. Once operated, relay 15CR or 16CR will remain operated until the reset switch 20SW is depressed.

DOWNSLOPE INVERSION
*(FIGS. 21–23)*

As a result of the functioning of the equipment described to this point, the first or positive group of ignitrons are sequentially fired one or more times, the second or negative group of ignitrons are similarly fired, and so forth, so that the current in the secondary winding of the welding transformer TRW (FIG. 19) is periodically reversed at a frequency determined by the setting of the equipment.

It has previously been recognized that in welders of the nature of the subject equipment, the period required for the current to decay at the termination of any half-cycle of energy application may be excessively long, leading to an effective short-circuiting condition and a tendency to damage the ignitrons. It has also previously been recognized that the decay period can be shortened by refiring the first ignitron in either the first or second group (i.e., ignitron IA1 or ignitron IA2) at a lower heat and subsequent to the firing of the last one of that group of ignitrons to fire (i.e., ignitron IC1 or ignition IC2) during that particular half-cycle of the welding current. Such action inverts or forces the current down so that the decay period is shortened. In accordance with certain of the principles of the present invention, means are provided for adjusting the period of the delay between firing of the last ignitron in the group and the supplementary or inversion-producing firing of the first ignitron in that group.

In some cases, particularly with highly inductive loads, a single pulse of energy will not adequately force the collapse of energy and means are provided for firing the second ignitron of the group (i.e., ignitron IB1 or IB2), to assist in current inversion, at an adjustable point on the downslope of the current and prior to the time that the first tube of the other group of tubes (ignitron IA2 or IA1) is intended to fire on the other half-cycle of the applied welding current. Both the firing of the second ignitron on the downslope and the adjustability of the firing time of that second ignitron are significant features of the present invention. Optionally usable means are also disclosed for firing the third ignitron of the group (ignitron IC1 or ignitron IC2) to further assist in the current inversion if necessary.

To insure that those skilled in the art will be able to fully practice all of the principles of the present invention, a representative means for producing adjustable triple downslope inversion is shown in FIGS. 21 through 23 of the drawings and it will be apparent from the ensuing description of that circuitry that a portion of portions of the equipment may be disabled to produce adjustable double downslope inversion or adjustable single downslope inversion.

The equipment of FIGS. 21 through 23 is controlled by the commutation control circuit of FIG. 17 and by the heat control circuits on FIGS. 14 and 15 and exerts its control upon the firing control circuits of FIGS. 18 and 19 of the drawings.

It will be recalled that the commutation circuits of FIG. 17 act to produce the enabling voltages for the thyratron control circuits of FIGS. 18 and 19, and that the transformer primary windings 33TP and 34TP (FIG. 17) are energized for an appropriate interval and at one or more appropriate times during each heat period, transformer winding 33TP being energized with a voltage which is in phase with the C-phase supply voltage and transformer primary winding 34TP being energized with a voltage which is 180 degrees out of phase with the C-phase supply voltage.

As before noted, the transformer including primary winding 33TP is provided with a secondary winding 33TS1 (FIG. 19) in the C-positive thyratron control circuit, and the transformer including primary winding 34TP is provided with a secondary winding 34TS1 in the C-negative thyratron fire control circuit. These transformers are additionally provided with secondary windings 33TS2 and 34TS2 in the inversion circuits of FIG. 22. These transformer secondary windings are elements of enabling voltage sources for thyratrons 93V and 94V, respectively, which control the A positive and A negative, respectively, current inversion pulse generation. The generation of the B-positive, B-negative, C-positive and C-negative current inversion pulses is similarly controlled by circuits including thyratrons 95V, 96V, 97V and 98V, respectively.

To provide a suitable source of negative biasing potential for the several thyratrons 93V through 98V, an alternating voltage from source 630 is applied through resistor 452R to a full-wave rectifier circuit including unidirectional current conducting devices 151RE through 154RE and the resulting direct voltage is filtered and reduced in value by a network including capacitors 424C–1 and 424C–2 and resistors 450R and 451R and applied between conductors 632 and 634, the voltage on conductor 632 being positive relative to the voltage on conductor 634.

Conductor 632 is connected to the cathode of each of the thyratrons 93V through 98V, while the voltage on conductor 634 is applied to the control grid of each of those thyratrons through individual grid circuits, such as the circuit including resistors 422R, 421R and 445R for thyratron 93V.

As a result of the connection of transformer primary windings 86TP, 87TP and 75TP to the source of welding voltage on conductors 501 through 503 (or to a source of three-phase voltage related in phase to the welding supply voltage) alternating voltages are developed in transformer secondary windings 86TS1, 86TS2, 87TS1, 87TS2, 75TS1 and 75TS2. Transformer secondary winding 86TS1 is connected in series with transformer primary winding 80TP between the anode and cathode of thyratron 93V, transformer secondary winding 86TS2 is connected in series with transformer primary winding 81TP between the anode and cathode of thyratron 94V, and the remaining secondary windings 87TS1, 87TS2, 75TS1 and 75TS2 are connected in series with transformer primary windings 82TP, 83TP, 84TP and 85TP, respectively, between the anodes and cathodes of thyratrons 95V, 96V, 97V and 98V, respectively.

Despite the application of these alternating voltages to the plate circuits of the several thyratrons, those thyratrons are held nonconductive by the direct negative biasing voltage at least until enabling-voltage signals are applied to the individual thyratron circuits. The enabling signal for thyratron 93V appears at transformer secondary winding 33TS2, and that for thyratron 94V appears at secondary winding 34TS2.

Assuming that it is desired to place the circuitry of FIGS. 21 through 23 in operation so that switch 636 is closed, the alternating voltage which appears across secondary winding 33TS2 is half-wave rectified by unidirectional current conducting device 145RE and developed across resistor 422R, which is shunted by capacitor 416C–1, element 145RE being polarized so that the left-hand terminal of resistor 422R is positive relative to the right-hand terminal of that resistor as far as this enabling voltage is concerned. Since resistor 422R is in the negative-biasing-potential circuit as above described, the algebraic sum of those voltages is applied between the control grid and cathode of thyratron 93V over a circuit including resistors 421R and 445R. This enabling voltage is preferably larger in magnitude than the negative biasing potential to insure that thyratron 93V will be enabled to fire, but to prevent the enabling voltage from imposing a positive bias upon thyratron 93V, a network including rectifier 169RE shunted by capacitor 415C is connected from a point intermediate resistors 445R and 421R to the cathode of that thyratron.

While thyratron 93V is thereby enabled to fire, it is prevented from firing by means including transformer secondary winding 77TS1. It will be observed that secondary winding 77TS1 is connected between the grid and cathode of thyratron 93V in series with rectifier 173RE, being shunted by transient by-passing capacitor 427C, the connection being similar to that previously described in connection with FIGS. 18 and 19 of the drawings whereby the transient absorbing function is accomplished without imposing a significant time delay.

Similarly, the development of an alternating voltage across secondary winding 34TS2 results in the development of an enabling voltage across resistor 423R to prepare thyratron 94V to fire, with conduction in that tube being presently prevented by means including secondary winding 77TS2.

The energization of transformer secondary windings 77TS1 and 77TS2 is produced as a result of the energization of primary winding 77TP in FIG. 21 of the drawings which represents a phase adjusting system. This circuit is controlled in part by the heat control and phase adjust circuits of FIGS. 14 through 16.

It will be recalled from the prior discussion of the circuits of FIGS. 15 and 16 that during any heat interval there is developed between the control grid and cathode of tube 33V (FIG. 15), and hence between terminal lead 624 and ground, a direct voltage the magnitude of which is determined by the magnitude of the welding current supply voltage as sensed by the voltage compensator system including tube 40V, and by the settings of the then-effective one of the phase adjusting circuits of FIG. 16. That direct voltage between terminal lead 624 and ground is also applied between the control grid and cathode of tube 99V in FIG. 21 of the drawings. Vacuum tube 99V is operated effectively as a D.C. amplifier, its cathode being grounded and its anode being connected to a positive 300 volt source through load resistor 449R (which is shunted by relatively large capacitor 429C for a reason to be noted) so that the voltage at the anode of tube 99V varies inversely with changes in the voltage between terminal lead 624 and ground.

Since the cathodes of dual-triode 100V are connected to the positive 300 volt source of potential, and since the anode of tube 99V is connected to the two control grids of vacuum tube 100V through individual resistors 453R and 444R, the voltage appearing across load resistor 449R is applied between the control grids and cathodes of the two sections of tube 100V. Tube 100V is connected in a circuit similar to the phase shifting circuit previously described in connection with FIG. 14 of the drawings except that but one triode section is employed for each of the two phase shifting circuits shown in FIG. 21 of the drawings.

The A-phase voltage appearing between conductors 501 and 502 is connected across transformer primary winding 76TP and is accordingly developed across secondary winding 76TS. When the lower terminal of that secondary is positive, conventional current will flow through rectifier 163RE, through the anode-to-cathode path of the left-hand section of tube 100V, through rectifier 161RE, through variable resistor 20P, through resistor 454R and through transformer primary winding 77TP. At the other half-cycle, the current will flow through primary winding 77TP, resistor 454R, variable resistor 20P, rectifier 164RE, through the anode-to-cathode path in the left-hand section of tube 100V, through rectifier 162RE and back to secondary winding 76TS. An impedance means in the form of capacitor 425C is connected between the upper terminal of secondary winding 76TS and the right-hand terminal of resistor 454R. Consequently, an alternating voltage is induced in primary winding 77TP and hence in secondary windings 77TS1 and 77TS2 (FIG. 22) which lags the A-phase supply voltage by an amount determined by the magnitude of the direct voltage between terminal lead 624 and ground (FIG. 21) and by the setting of variable resistor 20P.

When the voltage appearing across secondary winding 77TS1 or 77TS2 rises from its negative peak to a critical value, thyratron 93V or 94V will fire to produce energization of transformer primary winding 80TP or 81TP, respectively. This firing will not occur, during any heat interval, prior to the time determined by the setting of the phase adjust circuits of FIG. 16 as sensed by the direct voltage between terminal lead 624 and ground and will occur a selectable delay period thereafter as determined by the setting of variable resistor 20P.

While, as will be seen, thyratron 93V exerts its control upon the A-positive thyratron control circuit of FIG. 18, and thyratron 94V exerts its control upon the A-negative thyratron control circuit of FIG. 19, it has been found that improved results can be obtained, including an improvement in the magnitude of the signal transmitted from the FIGS. 22 and 23 circuits to the FIGS. 18 and 19 circuits, if the thyratrons shown in FIG. 22 are not energized from the alternating voltage phase corresponding to the phases which they are to control. Thus, to insure that the anode voltage of thyratrons 93V and 94V is high at the time those tubes are called upon to fire, the primary winding of transformer 86TP is connected between conductors 501 and 503 with the polarities being such that the voltage between the anode and cathode of thyratron 93V is 180 degrees out of phase with the C-phase of the supply voltage and such that the anode-to-cathode voltage of thyratron 94V is in phase with the C-phase of the welding supply voltage.

As a representative example of the magnitudes of the delays which may be employed in practice, the signal developed across secondary winding 77TS1 may be such as to cause thyratron 93V to fire in the order of 90 degrees to 150 degrees after the A-phase of the supply voltage crosses the zero axis to commence its positive half-cycle. If an A-phase voltage were applied to the anode of tube 93V, the output voltage developed across transformer primary 80TP would be small, whereas by applying an inverted C-phase voltage to the anode of thyratron 93V, the anode-to-cathode voltage of that thyratron is at its peak positive value at the 150 degree point of the A-phase voltage.

The energization of primary winding 80TP results in corresponding energization of secondary winding 80TS2 (FIG. 23). The alternating voltage appearing across secondary winding 80TS2 is half-wave rectified by unidirectional current conducting device 155RE and is developed across resistor 438R so that a positive pulse of energy occurring at a point during the negative half-cycle of the C-phase of the supply voltage appears between terminal leads 600 and 602.

To incorporate the optional current inversion circuitry of FIGS. 21 through 23 into the rest of the system, terminal leads 600 in FIGS. 18 and 23 of the drawings are interconnected as are terminal leads 602, and the jumper between terminals 600 and 602 on FIG. 18 is removed. Similarly, the jumper between terminal leads 604 and 606 in FIG. 18 is removed, with terminal lead 604 in FIG. 23 being connected to terminal lead 604 in FIG. 18 and with terminal lead 606 in FIG. 23 being connected to terminal lead 606 in FIG. 18. Similar connections are made, as indicated by the designations on the drawings, at the B-positive, B-negative, C-positive and C-negative control circuits in FIGS. 18 and 19.

It will be recalled from the foregoing discussion of the firing control circuits of FIGS. 18 and 19 that a negative biasing voltage is applied to the several thyratrons including the A-positive thyratron 51V, and that an enabling voltage, serving to overcome the negative biasing voltage is applied to the input circuit of the thyratron for the duration of each heat period, each such period continuing, in accordance with the settings of the equipment, for a time equal to one or more periods of the 60-cycle-per-second C-phase voltage, in the illustrated arrangement. The actual firing of the thyratrons is then controlled by the application of a phase shifted alternating voltage to the inputs of the several thyratrons from the circuits of FIG. 14, the amount of phase shift determining the percent of heat. Assuming, for example, that the heat period is selected to be equal to two periods of the 60-cycle-per-second C-phase voltage, and further assuming that the equipment is operating in the positive period, the thyratrons of FIGS. 18 and 19 will fire in the sequence 51V, 53V, 55V, 51V, 53V and 55V. At the termination of that sequencing, under the noted assumptions, the enabling voltage applied to transformer secondary winding 29TS1 (FIG. 18) at the A-positive thyratron 51V as well as the enabling voltages for the B-positive thyratron 53V and the C-positive thyratron 55V will terminate and thyratrons 51V, 53V and 55V will not again fire during that heat period. Concurrently with the termination of these enabling voltages, the application of the signaling potentials to the several Q and P terminal leads of FIG. 16 is terminated so that conduction in the several 27V dual triodes in that figure ceases. As a result, the voltage on conductor 402 tends to drop toward ground potential, reducing the voltage at the control grid of vacuum tube 33V in FIG. 15 and hence at terminal lead 624, and shifting the potential difference between conductors 400 and 404 to the point where the phase shifting circuits of FIG. 14 are reverted to the condition of 100 percent heat. Therefore, the alternating voltage appearing between conductors 414 and 416 at the A-positive firing control circuit of FIG. 18 and the corresponding alternating voltages applied between corresponding terminals of the other firing control circuits of FIGS. 18 and 19 are not such as to prevent conduction in their associated thyratrons. As noted, however, the absence of an enabling voltage prevents conduction in those thyratrons.

It will be observed that while the potential at terminal lead 624 tends to shift in value at the end of the heat interval, the information as to the percent heat is effectively preserved for the requisite period (less than one period of the 60-cycle-per-second frequency) in the circuits of FIG. 21 due to the presence of capacitor 429C shunting load resistor 449R of vacuum tube 99V. This short-term memorization of the heat adjust value insures proper operation of the circuits.

With the equipment of FIGS. 21 through 23 in operation, and continuing with the assumption as above set forth that the C-positive fire control thyratron 55V (FIG. 19) has just completed its second and final operation at the termination of the given heat period, the positive pulse which is developed across resistor 438R (FIG. 23) as applied between terminal leads 600 and 602 (FIG. 18) is sufficient to overcome the negative biasing potential applied to thyratron 51V even though the enabling voltage applied through transformer secondary winding 29TS1 is absent so that thyratron 51V is rendered conductive to fire ignitron IA1. In a practical embodiment of the invention, this firing can be made to occur, by adjustment, in a range from the 90 degree point on the A-phase voltage curve to the 150 degree point on that curve. In practice, the setting may be such, for example, as to produce firing at the 100 degree point on that curve.

Similar means are provided for establishing an auxiliary firing of the B-positive thyratron 53V (FIG. 18) following the auxiliary firing of the A-positive thyratron 51V. Thus, the right-hand section of vacuum tube 100V (FIG. 21) is an element of a phase shifting circuit including transformer primary winding 78TP (connected between terminal leads 502 and 503 and hence energized with the B-phase supply voltage) and transformer primary winding 79TP, the amount of the phase shift being adjustable by variable resistor 21P. The secondary windings of the transformer including primary 79TP are associated with the B-phase inversion thyratrons 95V and 96V, secondary winding 79TS1 being connected in series with rectifier 175RE between the control grid and cathode of thyratron 95V and secondary winding 79TS2 being connected in series with rectifier 176RE between the control grid and cathode of thyratron 96V, both in a manner similar to that previously described in connection with thyratrons 93V and 94V. When thyratron 93V fires, as above noted, producing energization of primary winding 80TP, a voltage is induced in secondary winding 80TS1 to effectively enable thyratron 95V. Therefore, at a time determined by the setting of the heat adjust circuits, by the sensed magnitude of the supply voltage, and by the setting of variable resistor 21P (FIG. 21) thyratron 95V will fire. For reasons similar to those above discussed in connection with the utilization of an inverted C-phase voltage for plate supply for thyratrons 93V and 94V, thyratrons 95V and 96V are energized with an inverted A-phase voltage, power transformer primary winding 87TP being connected between terminal leads 502 and 501.

When thyratron 95V fires to energize transformer primary 82TP, a voltage is induced in secondary winding 82TS2 (FIG. 23) which results in the development of a positive pulse between terminal leads 608 and 610 to fire the B-positive control thyratron 53V (FIG. 18) with resulting operation of ignitron IB1 (FIG. 19). Again, the equipment may have the capability of operating the B-positive firing control thyratron 53V in the range from 90 degrees to 150 degrees on the B-phase voltage supply curve, with firing at the 120 to 130 degree point being a representative satisfactory value.

The energization of primary winding 82TP (FIG. 23) also results in the energization of secondary winding 82TS1 which results in the production of a positive voltage across resistor 434R of sufficient magnitude to overcome the negative biasing potential applied to thyratron 97V. While the C-phase current inversion thyratrons 97V and 98V may be provided with means for adjusting their firing points similar to those above described, in the representatively illustrated arrangement, no such means is provided. Since the primary winding 75TP of the power transformer is connected between leads 501 and 502 and hence across the A phase of the supply voltage, thyratron 97V will fire as the A-phase voltage rises in its positive half-cycle, energizing transformer primary winding 84TP to produce energization of secondary winding 84TS (FIG. 23) and the application of a positive pulse via terminal leads 616 and 618 to the C-positive firing control circuit of FIG. 19. This will cause thyratron 55V to fire at approximately the 150 degree point on the C-phase voltage curve to render ignitron IC1 conductive and to complete the triple downslope inversion operation for the positive heat period. It will be apparent that the same operations will occur at the termination of each negative heat period except that thyratrons 94V, 96V and 98V of FIG. 22 will be fired to control the A-negative, B-negative and C-negative firing control thyratrons 52V (FIG. 18), 54V (FIG. 19) and 56V, respectively.

It will be observed that if the equipment of FIGS. 21 through 23 is utilized, pulses therefrom may be transmitted to the firing control circuits of FIGS. 18 and 19 not only immediately the termination of the heat period but also during the heat period. However, since the several firing control thyratrons will each already be fired at the time that the individual signals are received from the circuits of FIGS. 21 through 23, those signals will not produce any change in the operation of the equipment of FIGS. 18 and 19 during the heat period.

While it will be apparent that the embodiments of the invention herein disclosed are well calculated to fulfill the objects of the invention, it will be appreciated that the invention is susceptible to modification, variation and change without departing from the proper scope or fair meaning of the subjoined claims.

What is claimed is:

1. In a control equipment for a welder having a welding transformer controllably energizable from a source of alternating voltage, the combination of a plurality of individually adjustable and sequentially effective means for controlling the magnitude of the current supplied to the welding transformer during their individually effective periods, a single pulse producing means common to said sequentially effective means for producing a series of electrical pulses, and control means individual to each of said sequentially effective means and each including an individual counting means connected to said single pulse producing means for counting said electrical pulses and each responsive to the receipt of individually selectable numbers of said electrical pulses for controlling the operation of the individual ones of said sequentially effective means.

2. The combination of claim 1 in which said electrical pulses are derived from and time-related to the alternating voltage from the source of alternating voltage.

3. The combination of claim 2 in which the source of alternating voltage is a polyphase source and in which the electrical pulses are derived from one of the phases.

4. In a control equipment for a welder having a pair of welding electrodes and force-controlling means for variably controlling the force of engagement between the electrodes and the work, the combination of a plurality of separately effective control means for controlling said force-controlling means, means for producing a series of electrical pulses, and means individual to each of said control means and responsive to the receipt of individually selectable numbers of said electrical pulses for controlling the duration of the effectiveness of the individual ones of said control means.

5. In a control equipment for a welder having a pair of welding electrodes controllably energizable from a source of alternating voltage and force-controlling means for variably controlling the force of engagement between the electrodes and the work, the combination of a plurality of individually adjustable and sequentially effective means for controlling the magnitude of the current supplied to the welding electrodes during their individually effective periods, a plurality of individually and separately effective control means for controlling said force-controlling means, means for producing a series of electrical pulses, means individual to each of said sequentially effective means and responsive to the receipt of individually selectable numbers of said electrical pulses for controlling the duration of the effectiveness of the individual ones of said sequentially effective means, and means individual to each of said control means and responsive to the receipt of individually selectable numbers of said electrical pulses for controlling the duration of the effectiveness of the individual ones of said control means.

6. The combination of claim 5 in which each of said means which is responsive to individually selectable numbers of said electrical pulses includes digital counting means for counting said pulses and in which said electrical pulses are derived from and time-related to the alternating voltage from the source of alternating voltage.

7. In a control equipment for a welder having a welding transformer controllably energizable from a source of alternating voltage, the combination of an electron discharge device for controlling the connection of the welding transformer to the source, control means including a plurality of alternatively effective and individually adjustable heat adjusting means for controlling the operation of said device, a single pulse producing means common to said sequentially effective means for producing a series of electrical pulses, and means individual to each of said plurality of heat adjusting means and each including an individual counting means connected to said single pulse producing means for counting said electrical pulses and each responsive to the receipt of individually selectable numbers of said electrical pulses for controlling the operation of the individual ones of said heat adjusting means.

8. In a control equipment for a welder having a welding transformer controllably energizable from a source of alternating voltage, means for alternately energizing and de-energizing the transformer to establish successive heat and cool periods comprising means for producing a series of electrical pulses, a counting device for counting said pulses having an initial condition, and input circuit, and a plurality of output terminals which are selectively energized in accordance with the count, means connecting said means for producing a series of electrical pulses to said input circuit of said counting device, means effective while said counting device is counting one group of said pulses for energizing the transformer, means effective when said counting device has counted a preselected number of said pulses and when a preselected one of said output terminals has been energized for de-energizing the transformer and for resetting said counting device to said initial condition, and means effective when said counting device has counted another preselected number of said pulses applied to said input circuit and when another preselected one of said output terminals has been energized for again energizing the transformer and for resetting said counting device to the same said initial condition.

9. In a control equipment for a welder having a welding transformer controllably energizable from a source of alternating voltage, means for alternately energizing and de-energizing the transformer to establish successive heat and cool periods comprising a pulse counting device having an input circuit, means for applying a series of pulses to said input circuit of said device, a two-state device, means effective only while said two-state device is in one of its states for energizing the transformer for establishing the heat period, means effective only after said counting device has counted a preselected number of said pulses for shifting said two-state device to the other state for preparing for the cool period, and means effective only after said counting device has counted a succeeding preselected number of said pulses during the cool period for shifting said two-state device to said one state.

10. In a control equipment for a welder having a welding transformer controllably energizable from a source of alternating voltage, means for alternately energizing and de-energizing the transformer to establish successive heat and cool periods comprising a pulse counting device having an input circuit, means for applying a series of pulses to said input circuit of said device, a two-state device, means effective only while said two-state device is in one of its states for energizing the transformer for establishing the heat period, means effective only after said counting device has counted a preselected number of said pulses for shifting said two-state device to the other state and for resetting said counting device to an initial condition for preparing for the cool period, and means effective only after said counting device has counted a succeeding preselected number of said pulses during the cool period for shifting said two-state device to said one state and for resetting said counting device to said initial condition.

11. In a control equipment for a welder having a welding transformer controllably energizable from a source of alternating voltage, means for alternately energizing and de-energizing the transformer to establish successive heat and cool periods comprising a pulse counting device, means for applying a series of pulses to said device, a bistable multivibrator, means including a coincidence circuit effective when said bistable multivibrator is in one of its stable states and when said counting device completes the count of a preselected number of said pulses for shifting said bistable multivibrator to the other stable state, means including another coincidence circuit and effective when said bistable multivibrator is in said other stable state and when said counting device completes the count of another preselected number of said pulses for shifting said bistable multivibrator to said first stable state, and means effective only while said bistable multivibrator is in one of its states for energizing the transformer.

12. The combination of claim 11 in which said counting device is reset to an initial condition concurrently with the shifting of the state of said bistable multivibrator.

13. The combination of claim 12 in which means are provided for preventing resetting of the counting device from prematurely shifting the state of said bistable multivibrator comprising a monostable multivibrator for controlling said bistable multivibrator, and a pulsing device responsive to said coincidence circuits for applying pulses to reset said counting device and for triggering said monostable multivibrator to its unstable state.

14. In a control equipment for a welder having a welding transformer controllably energizable from a source of alternating voltage, means for applying pulses of energy to the transformer of alternating polarities, means for producing an alternating voltage signal, means for producing a series of voltage pulses time-related to said signal, counting means for counting said voltage pulses, means including said counting means for controlling the application of said energy pulses to the transformer, and means effective prior to the beginning of each of said energy pulses for inverting the phase of said alternating voltage signal.

15. In a control equipment for a welder having a welding transformer controllably energizable from a source of alternating voltage, means for applying pulses of energy to the transformer of alternating polarities, means for deriving an alternating voltage signal from the alternating voltage, means for producing a series of voltage pulses time-related to said signal, counting means for counting said voltage pulses, means including said counting means for controlling the application of said energy pulses to the transformer, and means effective prior to the beginning of each of said energy pulses for inverting the phase of said alternating voltage signal.

16. In a control equipment for a welder having a welding transformer controllably energizable from a source of alternating voltage, means for applying pulses of energy to the transformer of alternating polarities, means for producing an alternating voltage signal, means for deriving from the half cycles of one polarity of said alternating voltage signal a series of voltage pulses time-related to said signal, counting means for counting said voltage pulses, means including said counting means for controlling the application of said energy pulses to the transformer, and means effective prior to the beginning of each of said energy pulses for inverting the phase of said alternating voltage signal.

17. The combination of claim 8 further including means effective at the end of each period of energization of the transformer for producing an electrical control signal, additional counting means for counting said signals, and means controlled by said additional counting means and effective when said additional counting means has counted a preselected number of said control signals for terminating the operation of said means for alternately energizing and de-energizing the transformer.

18. The combination of claim 8 further including means effective at the end of each period of de-energization of the transformer for producing an electrical control signal, additional counting means for counting said signals, and means controlled by said additional counting means and effective when said additional counting means has counted a preselected number of said control signals for terminating the operation of said means for alternately energizing and de-energizing the transformer.

19. In a control equipment for a welder having a welding transformer controllably energizable from a source of alternating voltage, means for applying a plurality of groups of individually selectable numbers of pulses of energy to the transformer comprising control means including a plurality of sequentially effective means for alternately energizing and de-energizing the transformer; each of said sequentially effective means controlling the application of a different one of said plurality of groups of pulses of energy to the transformer; each of said sequentially effective means comprising means effective prior to the commencement of each of certain of said pulses of energy for producing an electrical control signal, counting means for counting said signals, and means controlled by said counting means and effective when said counting means has counted a preselected number of control signals for terminating the operation of said control.

20. In a control equipment for a welder having a welding transformer controllably energizable from a source of alternating voltage, means for applying a selectable number of pulses of energy of controlled durations to the transformer comprising pulse generating means for producing a series of electrical pulses, first counting means having an input circuit connected to said pulse generating means for repetitively alternately counting first and second preselected numbers of said electrical pulses, control means controlled by said first counting means for energizing the transformer whenever said first counting means is counting each of said first preselected numbers of said electrical pulses and for de-energizing the transformer whenever said first counting means is counting each of said second preselected numbers of said electrical pulses, means effective prior to the commencement of the counting of each of at least certain of said preselected numbers of electrical pulses for producing a control signal, second counting means for counting said control signals, and means controlled by said second counting means and effective when said second counting means has counted a preselected number of said control signals for terminating the operation of said first counting means.

21. The combination of claim 20 in which means are provided for applying an additional pulse of lesser energy content to the welding transformer at the end of the last one of said pulses of energy for producing current decay.

22. In a control equipment for a welder having a welding transformer controllably energizable from a source of alternating voltage, means for applying a plurality of groups of individually selectable numbers of pulses of energy of individually controlled durations and with a controlled inter-pulse time to the transformer comprising a plurality of sequentially effective means for alternately energizing and de-energizing the transformer; each of said sequentially effective means controlling the application of a different one of said plurality of groups of pulses of energy to the transformer, control means for alternately energizing and de-energizing the transformer, means for producing a series of electrical pulses; each of said sequentially effective means comprising first counting means for alternately counting first and second groups of said electrical pulses, means controlled by said counting means for causing said control means to energize the transformer while said first counting means is counting each of said first groups of electrical pulses and for causing said control means to de-energize the transformer while said first counting means is counting each of said second groups of electrical pulses, means effective each time said first counting means completes the counting of one of said groups of electrical pulses for producing a control signal, second counting means for counting said control signals, and means controlled by said second counting means and effective when said second counting means has counted a preselected number of said control signals for terminating the operation of said control means subject to reinitiation of operation of said control means by any next succeeding one of said sequentially effective means.

23. In a control equipment for a welder having a welding transformer controllably energizable from a source of alternating voltage, means for applying a selectable number of pulses of energy of controlled durations to the transformer comprising means for producing a series of electrical pulses, first counting means for repetitively counting preselected numbers of said electrical pulses, control means controlled by said first counting means for energizing the transformer whenever said first counting means is counting each of the groups of said electrical pulses, means effective prior to the commencement of the counting of each of at least certain of said groups of electrical pulses for producing a control signal, second counting means for counting said control signals, means controlled by said second counting means and effective when said second counting means has counted a preselected number of said control signals for terminating the operation of said first counting means, and means controlled by said first control means and effective prior to the commencement of each of at least certain of said energy pulses for inverting the polarity of said energy pulses.

24. In a control equipment for a welder having a welding transformer controllably energizable from a source of alternating voltage, means for applying a selectable number of pulses of energy of controlled durations to the transformer comprising means for producing a series of electrical pulses, first counting means for repetitively counting preselected numbers of said electrical pulses, control means controlled by said first counting means for energizing the transformer whenever said first counting means is counting each of the groups of said electrical pulses, means effective prior to the commencement of the counting of each of at least certain of said groups of electrical pulses for producing a control signal, second counting means for counting said control signals, means controlled by said second counting means and effective when said second mounting means has counted a preselected number of said control signals for terminating the operation of said first counting means, and means controlled by said first counting means and effective each of at least certain of the times that said first counting means completes counting each of one of said groups of electrical pulses for inverting the polarity of said energy pulses.

25. The combination of claim 24 in which said electrical pulses are derived from the half cycles of one polarity of an alternating voltage signal which is in turn derived from the source of alternating voltage, and in which the phase of the alternating voltage signal is inverted each of at least certain of the times that the polarity of said energy pulses is inverted.

26. The combination of claim 25 in which said electrical pulses are derived from the half cycles of one polarity of an alternating voltage signal which is in turn derived from the source of alternating voltage, and in which the phase of the alternating voltage signal is inverted each of at least certain of the times that the polarity of said energy pulses is inverted.

27. The combination of claim 26 in which said one of said groups of electrical pulses is said second group of electrical pulses and in which means are provided for applying an additional pulse of lesser energy content to the welding transformer at the end of the last one of said pulses of energy for producing current decay.

28. The combination of claim 27 in which an additional counting means is provided for counting a preselected number of said electrical pulses for controlling the duration of said additional pulse of electrical energy.

29. In a control equipment for a welder having a welding transformer controllably energizable from a source of alternating voltage, the combination of control means including a plurality of sequentially operated means for alternately energizing and de-energizing the transformer; each of said sequentially operated means comprising a pulse counting device having an input circuit, means for applying a series of pulses to said input circuit of said device, a two-state device, means effective only while said two-state device is in one of its states for energizing the transformer, means effective only after said counting device has counted a preselected number of said pulses for shifting said two-state device to the other state, and means effective only after said counting device has counted a succeeding preselected number of said pulses for shifting said two-state device to said one state; and programming means effective after the last one of said sequentially operated means has completed its operation for causing all of said two-state devices to be placed in a certain one of their states and for causing all of said counting devices to be reset to preselected initial conditions.

30. In a control equipment for a welder having a welding transformer controllably energizable from a source of alternating voltage, control means for controlling the energization of the transformer comprising a voltage-responsive load device, first and second electron discharge devices each having an anode, a cathode, and a control electrode, a resistance-capacitance network connecting the anode of said first device to the control electrode of said second device, a resistance-capacitance network connecting the anode of said second device to the control grid of said first device, a plate circuit for said first device comprising a source of potential and a load resistor connected between the source of potential and the anode of said first device, a plate circuit for said second device comprising a source of potential, a load resistor connected to the anode of said second device and a cathode-load resistor connected to the cathode of said second device, and means including said cathode-load resistor for applying a voltage to said voltage-responsive load device.

31. In a control equipment for a welder having a welding transformer controllably energizable from a source of alternating voltage, control means for controlling the energization of the transformer comprising a voltage-responsive load device, first and second electron discharge devices each having an anode, a cathode, and a control electrode, a resistance-capacitance network connecting the anode of said first device to the control electrode of said second device to the control grid of said first device, a plate circuit for said first device comprising a source of potential and a load resistor connected between the source of potential and the anode of said first device, a plate circuit for said second device comprising a source of potential, a load resistor connected to the anode of said second device and a cathode-load resistor connected to the cathode of said second device, and means including said cathode-load resistor and a unidirectional current conducting device for applying a voltage to said voltage-responsive load device.

32. In a control equipment for a welder having a welding transformer controllably energizable from a source of alternating voltage, control means for controlling the energization of the transformer comprising a voltage-responsive load device, first and second electron discharge devices each having an anode, a cathode, and a control electrode, a resistance-capacitance network connecting the anode of said first device to the control electrode of said second device, a resistance-capacitance network connecting the anode of said second device to the control grid of said first device, a plate circuit for said first device comprising a source of potential and a load resistor connected between the source of potential and the anode of said first device, a plate circuit for said second device comprising a source of potential, a load resistor connected to the anode of said second device and a cathode-load resistor and a unidirectional current conducting device connected to the cathode of said second device, and means including said cathode-load resistor and a unidirectional current conducting device for applying a voltage to said voltage-responsive load device.

33. In a control equipment for a welder having a welding transformer controllably energizable from a source of alternating voltage, control means for controlling the energization of the transformer comprising a plurality of resistors, means individual to each of said resistors for developing across each of said resistors either a first or a second voltage, an electron discharge device having an anode, a cathode electrode and a control electrode, resistance means connected between said cathode electrode and said control electrode, a unidirectional current conducting device individual to each of said resistors connecting one of said electrodes to said resistors, and means for applying a voltage to the other one of said electrodes of a magnitude to produce current of a selected magnitude through said resistance means whenever said first voltage is developed across any one of said resistors, said unidirectional current conducting devices preventing current of said preselected magnitude through said resistance means whenever said second voltage is developed across all of said resistors.

34. In a control equipment for a welder having a welding transformer controllably energizable from a source of alternating voltage, control means for controlling the energization of the transformer comprising an electron discharge device having an anode, a cathode and a control electrode, a resistor connected between said cathode and said control electrode, a plurality of unidirectional current conducting devices connected in parallel with each other to said control electrode, circuit means including all of said unidirectional current conducting devices and a source of voltage for producing current flow of one magnitude through said resistor, and means individual to each of said unidirectional current conducting devices and responsive to individual conditions for selectively applying voltages to said unidirectional current conducting devices to cause them to present high impedances to said current flow.

35. In a control equipment for a welder having a welding transformer controllably energizable from a source of polyphase alternating voltage, means for terminating energization of the transformer if the average magnitude of the polyphase supply voltage departs from a preselected value by more than a preselected amount comprising a direct-voltage responsive control device, means for rectifying each of the individual phase voltages, means for deriving a direct voltage which varies in accordance with the magnitudes of the rectified phase voltages, and means for applying said direct voltage to said direct-voltage responsive control device.

36. The combination of claim 35 in which said deriving means includes a low-pass filter in which each of the phase voltages is full-wave rectified, and in which the rectified voltages are applied in parallel to the low-pass filter.

37. In a control equipment for a welder having a welding transformer controllably energizable from a source of alternating voltage, circuit means responsive to the phase relations between an input voltage and the source voltage for controlling the effective magnitude of the current in the transformer, a phase-shifting circuit including an electron discharge device for applying an input voltage to said circuit means which is phase shifted from said source voltage in accordance with the magnitude of a direct voltage applied to said phase-shifting circuit, means for producing a first direct voltage of selectable magnitude, means for deriving a second direct voltage having a magnitude which varies as a function of the average magnitude of the source voltage, and means for applying to said phase-shifting circuit a direct voltage having a magnitude which varies in accordance with the magnitudes of said first and second direct voltages.

38. In a control equipment for a welder having a welding transformer controllably energizable from a source of alternating voltage, a phase-shifting circuit comprising a transformer having primary winding means and a pair of secondary winding means, said primary winding means being energizable from the source of alternating voltage, a full-wave rectifier bridge having a unidirectional current conducting device in each of four legs, an electron discharge device having an anode, a cathode and a control electrode, means connecting the anode-cathode path of said electron discharge device across one diagonal of said bridge, a load impedance connected in series with one of said secondary winding means across the other diagonal of said bridge, means including a capacitor and the other one of said secondary winding means connected across said load impedance, and means for applying a control voltage between said cathode and said control electrode.

39. The combination of claim 38 further including a second electron discharge device having an anode, a cathode, and a control electrode with the several corresponding electrodes of the two electron discharge devices being connected to one another.

40. In a control equipment for a welder having a welding transformer controllably energizable from a source of alternating voltage, control means for controlling the energization of the transformer comprising an electron discharge device having an anode, a cathode and a control electrode, means for applying an alternating voltage from the source between said anode and said cathode, an input transformer having a primary winding and a secondary winding, means for applying an input voltage signal across the primary winding of said input transformer, a unidirectional current conducting device connected in series with said secondary winding between said control electrode and said cathode, and a capacitor connected in parallel with said secondary winding.

41. In a control equipment for a welder having a welding transformer controllably energizable from a source of alternating voltage, control means for controlling the energization of the transformer comprising an electron discharge device having an anode, a cathode and a control electrode, means for applying an alternating voltage from the source between said anode and said cathode, an input transformer having a primary winding and a secondary winding, means for applying an input voltage signal across the primary winding of said input transformer, and circuit means for connecting said secondary winding between said control electrode and said cathode and for effectively preventing transients of a higher frequency than the effective frequency of said input signal from being applied between said control electrode and said cathode, said circuit means including a capacitor connected in parallel with said secondary winding and a unidirectional current conducting device connected in series with said secondary winding, said unidirectional current conducting device constituting the major resistance element in said circuit means.

42. In a control equipment for a welder having a welding transformer controllably energizable from a source of polyphase alternating voltage, control means for controlling the energization of the transformer comprising an electron discharge device for each phase having an anode, a cathode and a control electrode, means for applying the individual phase alternating voltages from the source between the anode and cathode of the respective ones of said devices, and an input circuit for each of said electron discharge devices, each of said input circuits comprising an input transformer having a primary winding and a secondary winding, means for applying an input voltage signal across the primary winding of said input transformer, a unidirectional current conducting device connected in series with said secondary winding between said control electrode and said cathode, and a capacitor connected in parallel with said secondary winding.

43. In a control equipment for a welder having a welding transformer controllably energizable from a source of alternating voltage, control means for controlling the energization of the transformer comprising an electron discharge device having an anode, a cathode and a control electrode, means for applying an alternating plate voltage from the source between the anode and cathode of said device, means for applying a biasing voltage between said control electrode and said cathode for biasing said electron discharge device to a non-conductive condition, enabling means operable in preselected time relationship with said plate voltage for applying an enabling voltage between said control electrode and said cathode tending to permit said electron discharge device to conduct, and means for preventing said electron discharge device from conducting for a selectable interval after the operation of said enabling means.

44. In a control equipment for a welder having a welding transformer controllably energizable from a source of alternating voltage, control means for controlling the energization of the transformer comprising an electron discharge device having an anode, a cathode and a control electrode, means for applying an alternating plate voltage from the source between the anode and cathode of said device, means for applying a biasing voltage between said control electrode and said cathode for biasing said electron discharge device to a non-conductive condition, enabling means operable in preselected time relationship with said plate voltage for applying an enabling voltage between said control electrode and said cathode tending to permit said electron discharge device to conduct, and means for preventing said electron discharge device from conducting for a selectable interval after the operation of said enabling means comprising means for applying an alternating voltage between said control electrode and said cathode having a selectable phase relationship with said plate voltage.

45. In a control equipment for a welder having a welding transformer controllably energizable from a source of alternating voltage, control means for controlling the energization of the transformer comprising an electron discharge device having an anode, a cathode and a control electrode, means for applying an alternating plate voltage from the source between the anode and cathode of said device, means for applying a biasing voltage between said control electrode and said cathode for biasing said electron discharge device to a non-conductive condition, enabling means operable in preselected time relationship with said plate voltage for applying an enabling voltage between said control electrode and said cathode tending to permit said electron discharge device to conduct, and means for preventing said electron discharge device from conducting for a selectable interval after the operation of said enabling means, said enabling means comprising means for producing an alternating voltage signal in phase with said plate voltage, means for rectifying and filtering said alternating voltage signal, and means for applying said rectified and filtered alternating voltage signal between said control electrode and said cathode.

46. In a control equipment for a welder having a welding transformer controllably energizable from a source of alternating voltage, control means for controlling the energization of the transformer comprising an electron discharge device having an anode, a cathode and a control electrode, means for applying an alternating plate voltage from the source between the anode and cathode of said device, means for applying a biasing voltage between said control electrode and said cathode for biasing said electron discharge device to a non-conductive condition, enabling means operable in preselected time relationship with said plate voltage for applying an enabling voltage between said control electrode and said cathode tending to permit said electron discharge device to conduct, and means for preventing said electron discharge device from conducting for a selectable interval after the operation of said enabling means, said enabling means comprising means for producing an alternating voltage signal in phase with said plate voltage means for rectifying and filtering said alternating voltage signal, and means for applying said rectified and filtered alternating voltage signal between said control electrode and said cathode in series with said biasing voltage.

47. In a control equipment for a welder having a welding transformer controllably energizable from a source of alternating voltage, control means for controlling the energization of the transformer comprising an electron discharge device having an anode, a cathode and a control electrode, means for applying an alternating plate voltage from the source between the anode and cathode of said device, means for applying a biasing voltage between said control electrode and said cathode for biasing said electron discharge device to a non-conductive condition, enabling means operable in preselected time relationship with said plate voltage for applying an enabling voltage between said control electrode and said cathode tending to permit said electron discharge device to conduct, and means for preventing said electron discharge device from conducting for a selectable interval after the operation of said enabling means, said means for applying a biasing voltage comprising means for producing an alternating voltage signal in phase with said plate voltage, means for rectifying and filtering said alternating voltage signal, and means for applying said rectified and filtered alternating voltage signal between said control electrode and said cathode.

48. In a control equipment for a welder having a welding transformer controllably energizable from a source of alternating voltage, control means for controlling the energization of the transformer comprising an electron discharge device having an anode, a cathode and a control electrode, means for applying an alternating plate voltage from the source between the anode and cathode of said device, means for applying a biasing voltage between said control electrode and said cathode for biasing said electron discharge device to a non-conductive condition, enabling means operable in preselected time relationship with said plate voltage for applying an enabling voltage between said control electrode and said cathode tending to permit said electron discharge device to conduct, and means for preventing said electron discharge device from conducting for a selectable interval after the operation of said enabling means, said means for applying a biasing voltage comprising means for producing an alternating voltage signal in phase with said plate voltage, means for rectifying and filtering said alternating voltage signal, and means for applying said rectified and filtered alternating voltage signal between said control electrode and said cathode, said enabling means comprising means for producing an alternating voltage signal in phase with said plate voltage, means for rectifying and filtering said alternating voltage signal, and means for applying said rectified and filtered alternating voltage signal between said control electrode and said cathode.

49. In a control equipment for a welder having a welding transformer controllably energizable from a source of alternating voltage, control means for controlling the energization of the transformer comprising an electron discharge device having an anode, a cathode and a control electrode, means for applying an alternating plate voltage from the source between the anode and cathode of said device, an input circuit connected between the control grid and cathode of said electron discharge device, said input circuit including first, second and third serially interconnected resistors, means for developing a biasing voltage across said first resistor, enabling means operable in preselected time relationship with said plate voltage for developing an enabling voltage across said second resistor, and means for applying an alternating voltage signal to a circuit connected directly between said control electrode and said cathode, said alternating voltage signal being selectably shifted in phase from the said alternating plate voltage.

50. In a control equipment for a welder having a welding transformer controllably energizable from a source of alternating voltage, control means for controlling the energization of the transformer comprising an electron discharge device having an anode, a cathode and a control electrode, means for applying an alternating plate voltage from the source between the anode and cathode of said device, an input circuit connected between the control grid and cathode of said electron discharge device, said input circuit including first, second and third serially interconnected resistors, means for developing a biasing voltage across said first resistor, enabling means operable in preselected time relationship with said plate voltage for developing an enabling voltage across said second resistor, and a network connected across a circuit including said first and said second resistor, said network comprising a capacitor and a unidirectional current conducting device connected in parallel with said capacitor.

51. In a control equipment for a welder having a welding transformer controllably energizable from a source of alternating voltage, control means for controlling the energization of the transformer comprising an electron discharge device having an anode, a cathode and a control electrode, means for applying an alternating plate voltage from the source between the anode and cathode of said device, an input circuit connected between the control grid and cathode of said electron discharge device, said input circuit including first, second and third serially interconnected resistors, means for developing a biasing voltage across said first resistor, enabling means operable in preselected time relationship with said plate voltage for developing an enabling voltage across said second resistor, a network connected across a circuit including said first and said second resistor, said network comprising a capacitor and a unidirectional current conducting device connected in parallel with said capacitor, and means for applying an alternating voltage signal to a circuit connected directly between said control electrode and said cathode, said alternating voltage signal being selectably shifted in phase from the said alternating plate voltage.

52. In a control equipment for a welder having a welding transformer controllably energizable from a source of polyphase alternating voltage, control means for controlling the energization of the transformer comprising a plurality of electron discharge devices each having an anode, a cathode and a control electrode, means for applying individual phase alternating plate voltages from the source between the anode and cathode of said devices, means for applying a biasing voltage between said control electrode and said cathode of each of said devices for biasing each of said devices to a non-conductive condition, enabling means for each of said devices operable in preselected time relationship with the said individual plate voltages for applying an enabling voltage between said control electrode and said cathode tending to permit each of said electron discharge devices to conduct, and means for preventing each of said electron discharge devices from conducting for a selectable interval after the operation of the individual enabling means comprising means for applying individual alternating voltages between said control electrodes and said cathodes having selectable phase relationships with the individual plate voltages.

53. In a control equipment for a welder having a welding transformer controllably energizable from a source of polyphase alternating voltage, control means for controlling the energization of the transformer comprising a plurality of electron discharge devices each having an anode, a cathode and a control electrode, means for applying individual phase alternating plate voltages from the source between the anode and cathode of said devices, means for applying a biasing voltage between said control electrode and said cathode of each of said devices for biasing each of said devices to a non-conductive condition, enabling means for each of said devices operable in preselected time relationship with the said individual plate voltages for applying an enabling voltage between said control electrode and said cathode tending to permit each of said electron discharge devices to conduct, and means for preventing each of said electron discharge devices from conducting for a selectable interval after the operation of the individual enabling means comprising means for applying individual alternating voltages between said control electrodes and said cathodes having selectable phase relationships with the individual plate voltages, each of said enabling means comprising means for producing an individual alternating voltage signal which is in phase with the individual plate voltage, means for rectifying and filtering said individual alternating voltage signal, and means for applying said rectified and filtered individual alternating voltage signal between said control electrode and said cathode.

54. In a control equipment for a welder having a welding transformer controllably energizable from a source of polyphase alternating voltage, control means for controlling the energization of the transformer comprising a plurality of electron discharge devices each having an anode, a cathode and a control electrode, means for applying individual phase alternating plate voltages from the source between the anode and cathode of said devices, means for applying a biasing voltage between said control electrode and said cathode of each of said devices for biasing each of said devices to a non-conductive condition, enabling means for each of said devices operable in preselected time relationship with the said individual plate voltages for applying an enabling voltage between said control electrode and said cathode tending to permit each of said electron discharge devices to conduct, and means for preventing each of said electron discharge devices from conducting for a selectable interval after the operation of the individual enabling means comprising means for applying individual alternating voltages between said control electrodes and said cathodes having selectable phase relationships with the individual plate voltages, each of said means for applying a biasing voltage comprising means for producing an individual alternating voltage signal which is in phase with the individual plate voltage, means for rectifying and filtering said individual alternating voltage signal, and means for applying said rectified and filtered individual alternating voltage signal between said control electrode and said cathode.

55. In a control equipment for a welder having a welding transformer controllably energizable from a source of polyphase alternating voltage, circuit means individual to each phase including an electron discharge device having an anode circuit energizable from the individual phase voltage and an input circuit, said circuit means being effective each time said electron discharge device is conductive to apply a pulse of energy to the transformer during a half cycle of one polarity of its individual phase voltage, control means including phase-shifting means for applying voltage signals to said input circuits of said devices in sequence to render said devices conductive in sequence and selected times after the beginning of said one half cycles of their individual phase voltages, said control means being effective to apply said voltage signals for a selected number of said sequences, and means effective after the conductive period of the last one of said devices in the last one of said preselected number of sequences for applying a voltage signal to said input circuit of the first one of said devices a later selected time after the beginning of said one half cycle of its individual phase voltage comprising an additional phase-shifting means and means for selectively adjusting said additional phase-shifting means.

56. In a control equipment for a welder having a welding transformer controllably energizable from a source of polyphase alternating voltage, circuit means individual to each phase including an electron discharge device having an anode circuit energizable from the individual phase voltage and an input circuit, said circuit means being effective each time said electron discharge device is conductive to apply a pulse of energy to the transformer during a half cycle of one polarity of its individual phase voltage, control means including phase-shifting means for applying voltage signals to said input circuits of said devices in sequence to render said devices conductive in sequence and selected times after the beginning of said one half cycles of their individual phase voltages, said control means being effective to apply said voltage signals for a selected number of said sequences, and means effective after the conductive period of the last one of said devices in the last one of said preselected number of sequences for applying voltage signals to said input circuits of the first and second ones of said devices at later selected times after the beginnings of said one half cycles of their individual phase voltages comprising an additional phase-shifting means individual to each of said first and second devices.

57. In a control equipment for a welder having a welding transformer controllably energizable from a source of polyphase alternating voltage, circuit means individual to each phase including an electron discharge device having an anode circuit energizable from the individual phase voltage and an input circuit, said circuit means being effective each time said electron discharge device is conductive to apply a pulse of energy to the transformer during a half cycle of one polarity of its individual phase voltage, control means including phase-shifting means for applying voltage signals to said input circuits of said devices in sequence to render said devices conductive in sequence and selected times at the beginning of said one half cycles of their individual phase voltages, said control means being effective to apply said voltage signals for a selected number of said sequences, and means effective after the conductive period of the last one of said devices in the last one of said preselected number of sequences for applying voltage signals to said input circuits of the first, second and third ones of said devices at later selected times after the beginnings of said one half cycles of their individual phase voltages.

58. In a control equipment for a welder having a welding transformer controllably energizable from a source of polyphase alternating voltage, circuit means individual to each phase including an electron discharge device having an anode circuit energizable from the individual phase voltage and an input circuit, said circuit means being effective each time said electron discharge device is conductive to apply a pulse of energy to the transformer during a half cycle of one polarity of its individual phase voltage, control means including phase-shifting means for applying voltage signals to said input circuits of said devices in sequence to render said devices conductive in sequence and selected times after the beginning of said one half cycles of their individual phase voltages, said control means being effective to apply said voltage signals for a selected number of said sequences, and means effective after the conductive period of the last one of said devices in the last one of said preselected number of sequences for applying voltage signals to said input circuits of the first, second and third ones of said devices at later selected times after the beginnings of said one half cycles of their individual phase voltages comprising an additional phase-shifting means for each of said first and second devices, and means for selectively adjusting at least one of said additional phase-shifting means.

59. In a control equipment for a welder having a welding transformer controllably energizable from a source of polyphase alternating voltage, circuit means individual to each phase including an electron discharge device having an anode circuit energizable from the individual phase voltage and an input circuit, said circuit means being effective each time said electron discharge device is conductive to apply a pulse of energy to the transformer during a half cycle of one polarity of its individual phase voltage, control means including first phase-shifting means for applying voltage signals to said input circuits of said devices in sequence to render said devices conductive in sequence and selected times after the beginning of said one half cycles of their individual phase voltages, said control means being effective to apply said voltage signals for a selected number of said sequences, and means effective after the conductive period of the last one of said devices in the last one of said preselected number of sequences for applying a voltage signal to said input circuit of the first one of said devices a later selected time after the beginning of said one half cycle of its individual phase voltage comprising an additional phase-shifting means individual to said first device, heat control means for varying the amount of phase shift produced by said first phase-shifting means, and means for varying the amount of phase shift produced by said additional phase-shifting means in accordance with changes in the amount of phase shift produced by said first phase-shifting means.

60. In a control equipment for a welder having a welding transformer controllably energizable from a source of polyphase alternating voltage, circuit means individual to each phase including an electron discharge device having an anode circuit energizable from the individual phase voltage and an input circuit said circuit means being effective each time said electron discharge device is conductive to apply a pulse of energy to the transformer during a half cycle of one polarity of its individual phase voltage, control means including first phase-shifting means for applying voltage signals to said input circuits of said devices in sequence to render said devices conductive in sequence and selected times after the beginning of said one half cycles of their individual phase voltages, said control means being effective to apply said voltage signals for a selected number of said sequences, and means effective after the conductive period of the last one of said devices in the last one of said preselected number of sequences for applying a voltage signal to said input circuit of the first one of said devices a later selected time after the beginning of said one half cycle of its individual phase voltage comprising an additional phase-shifting means individual to said first device, heat control means for varying the amount of phase shift produced by said first phase-shifting means, and means including selectively adjustable means and said heat control means for causing the amount of phase shift produced by said additional phase-shifting means to change with changes in the amount of phase shift produced by said first phase-shifting means and to differ therefrom by a selected amount which remains effectively constant with changes in the amount of phase shift produced by said first phase-shifting means.

61. The combination of claim 60 in which a voltage signal is also applied to the input circuit of the second one of said devices a later selected time after the beginning of said one half cycle of the individual phase voltage of said second device, in which another phase-shifting means is provided individual to said second device, and in which the amount of phase shift produced by said another phase-shifting means changes with changes in the amount of phase shift produced by said first phase-shifting means and differs therefrom by a selectable amount.

62. The combination of claim 61 in which said first phase-shifting means includes a pair of phase-shifting circuits individual, respectively, to said first and second device.

63. In a control equipment for a welder having a welding transformer controllably energizable from a source of polyphase alternating voltage, circuit means individual to each phase including an electron discharge device having an anode circuit energizable from the individual phase voltage and an input circuit, said circuit means being effective each time said electron discharge device is conductive to apply a pulse of energy to the transformer during a half cycle of one polarity of its individual phase voltage, control means including phase-shifting means for applying voltage signals to said input circuits of said devices in sequence to render said devices conductive in sequence and selected times after the beginning of said one half cycles of their individual phase voltages, said control means being effective to apply said voltage signals for a selected number of said sequences, and means effective after the conductive period of the last one of said devices in the last one of said pre-selected number of sequences for applying a voltage signal to said input circuit of the first one of said devices a later selected time after the beginning of said one half cycle of its individual phase voltage comprising an additional phase-shifting means, the amount of phase shift produced both by said first phase-shifting means and by said additional phase-shifting means varying in accordance with the magnitude of a direct voltage applied thereto, heat adjusting means for producing a direct voltage of selectively variable magnitude, and means for applying said direct voltage to both said first phase-shifting means and to said additional phase-shifting means.

64. The combination of claim 63 in which said heat adjusting means ceases to produce said direct voltage at the end of said preselected number of sequences, and in which said additional phase-shifting means is provided with means for effectively maintaining an amount of phase shift determined by the magnitude of said direct voltage for a preselected period following the termination of the production of said direct voltage.

65. In a control equipment for a welder having a welding transformer controllably energizable from a source of alternating voltage, means for applying a selectable number of pulses of energy of controlled durations and with a controlled inter-pulse time to the transformer comprising means for producing a series of electrical pulses, first counting means for alternately counting first and second groups of said electrical pulses, control means controlled by said counting means for energizing the transformer while said first counting means is counting each of said first groups of electrical pulses and for de-energizing the transformer while said first counting means is counting each of said second groups of electrical pulses, means effective each time said first counting means completes counting each of one of said groups of electrical pulses for producing a control signal, second counting means for counting said control signals, means controlled by said second counting means and effective when second counting means has counted a preselected number of said control signals for terminating the operation of said control means, and means for applying an additional pulse of lesser energy content to the welding transformer at the end of the last one of said pulses of energy for producing current decay.

66. In a control equipment for a welder for performing a weld cycle including a plurality of cycle portions, the combination of a plurality of sequentially effective means for controlling the welder during their individual effective portions of the weld cycle, a single pulse producing means common to said sequentially effective means for producing a series of electrical pulses, and control means individual to each of said sequentially effective means and each including an individual counting means connected to said single pulse producing means for counting said electrical pulses and each responsive to the receipt of individually selectable numbers of said electrical pulses for controlling the operation of the individual ones of said sequentially effective means.

67. The combination of claim 66 in which said control means control, individually, preheat time, weld time and postheat time.

68. The combination of claim 66 in which said control means control, individually, precompression time, squeeze time and forge delay.

69. The combination of claim 66 in which said control means control, individually, at least five of precompression time, squeeze time, preheat time, weld time, quench time, postheat time, hold time, off time and forge delay.

70. In a control for a multiple impulse welder controllably energized from a source of alternating current of a certain frequency, means for delivering a series of pulses of electrical energy from the source to a workpiece at one selectable rate during a first portion of a single welding cycle, and means for delivering a series of pulses of electrical energy from the source to the workpiece at a different selectable rate during another portion of that same welding cycle.

71. In a control for a multiple impulse welder controllably energized from a source of alternating current of a certain frequency, means for delivering a series of pulses of electrical energy from the source to a workpiece at one selectable rate which is lower than said certain frequency during a first portion of a single welding cycle, and means for delivering a series of pulses of electrical energy from the source to the workpiece at a different selectable rate which is lower than said certain frequency during another portion of that same welding cycle.

72. In a control for a multiple impulse welder controllably energized from a source of alternating current of a certain frequency, means for delivering a series of pulses of a single polarity of electrical energy from the source to a workpiece at one selectable rate during a first portion of a single welding cycle, and means for delivering a series of pulses of a single polarity of electrical energy from the source to the workpiece at a different selectable rate during another portion of that same welding cycle.

73. In a control for a multiple impulse welder controllably energized from a source of alternating current of a certain frequency, means for delivering a series of pulses of alternating polarities of electrical energy from the source to a workpiece at one selectable frequency during a first portion of a single welding cycle, and means for delivering a series of pulses of alternating polarities of electrical energy from the source to the workpiece at a different selectable frequency during another portion of that same welding cycle.

74. In a control for a multiple impulse welder controllably energized from a source of alternating current of a certain frequency, means for delivering a series of pulses of alternating polarities of electrical energy from the source to a workpiece at one selectable frequency which is lower than said certain frequency during a first portion of a single welding cycle, and means for delivering a series of pulses of alternating polarities of electrical energy from the source to the workpiece at a different selectable frequency which is lower than said certain frequency during another portion of that same welding cycle.

75. In a control for a multiple impulse welder controllably energized from a source of alternating current of a certain frequency, means for delivering a series of pulses of electrical energy from the source to a workpiece at one selectable rate during a first portion of a single welding cycle, means for delivering a series of pulses of electrical energy from the source to the workpiece at a differential selectable rate during another portion of that same welding cycle, and means for delivering a series of pulses of electrical energy from the source to the workpiece at a different selectable rate during still another portion of said same welding cycle.

76. In a control for a multiple impulse welder controllably energized from a source of alternating current of a certain frequency, means for delivering a series of pulses of alternating polarities of electrical energy from the source to a workpiece at one selectable frequency which is lower than said certain frequency during a first portion of a single welding cycle, means for delivering a series of pulses of alternating polarities of electrical energy from the source to the workpiece at a different selectable frequency which is lower than said certain frequency during another portion of that same welding cycle, and means for delivering a series of pulses of alternating polarities of electrical energy from the source to the workpiece at a different selectable frequency which is lower than said certain frequency during still another portion of said same welding cycle.

77. The combination of claim 70 in which said portion and said another portion are two of the preheat, weld and postheat portions of the weld cycle.

78. The combination of claim 74 in which said portion and said another portion are two of the preheat, weld and postheat portions of the weld cycle.

79. The combination of claim 75 in which said portion and said another portion and said still another portion are the preheat, weld and postheat portions of the weld cycle.

80. The combination of claim 76 in which said portion and said another portion and said still another portion are the preheat, weld and postheat portions of the weld cycle.

81. In a control for a multiple impulse welder controllably energized from a source of alternating current of a certain frequency, means including first presettable means for delivering a series of pulses of electrical energy from the source to a workpiece at one selectable rate during a first portion of a single welding cycle, and means including second presettable means for delivering a series of pulses of electrical energy from the source to the workpiece at a different selectable rate during another portion of that same welding cycle.

82. In a control for a multiple impulse welder controllably energized from a source of alternating current of a certain frequency, means including first presettable means for delivering a series of pulses of alternating polarities of electrical energy from the source to a workpiece at one selectable frequency which is lower than said certain frequency during a first portion of a single welding cycle, and means including second presettable means for delivering a series of pulses of alternating polarities of electrical energy from the source to the workpiece at a different selectable frequency which is lower than said certain frequency during another portion of that same welding cycle.

83. In a control for a multiple impulse welder controllably energized from a source of alternating current of a certain frequency, means including first presettable means for delivering a series of pulses of electrical energy from the source to a workpiece at one selectable rate during a first portion of a single welding cycle, means including second presettable means for delivering a series of pulses of electrical energy from the source to the workpiece at a different selectable rate during another portion of that same welding cycle, and means including third presettable means for delivering a series of pulses of electrical energy from the source to the workpiece at a different selectable rate during still another portion of said same welding cycle.

84. The combination of claim 70 further including means for producing current decay at the end of any of said portions.

85. The combination of claim 74 further including means for producing current decay at the end of any of said portions.

86. The combination of claim 75 further including means for producing current decay at the end of any of said portions.

87. The combination of claim 76 further including means for producing current decay at the end of any of said portions.

88. In a control for a multiple impulse welder controllably energized from a source of alternating current of a certain frequency, means for delivering electrical current to a workpiece from the source as a plurality of impulses recurring at a rate which is low relative to said certain frequency, and means for producing current decay at the end of said plurality of impulses.

89. In a control for a multiple impulse welder controllably energized from a source of alternating current of a certain frequency, means for delivering electrical current to a workpiece from the source as a plurality of impulses of alternating polarities recurring at a rate which is low relative to said certain frequency, and means for producing current decay at the end of said plurality of impulses.

90. The combination of claim 66 in which said control means including individual counting means controls the duration of the effectiveness of the individual ones of said sequentially effective means.

91. The combination of claim 66 in which the welder is a multiple impulse welder in which energy is supplied to a workpiece at frequencies which are lower than the frequency of the source of energy, and in which each of a plurality of said control means including said individual counting means controls the frequency at which energy is supplied to the workpiece during the period each said control means is effective.

References Cited in the file of this patent
UNITED STATES PATENTS

| | | |
|---|---|---|
| 2,249,869 | Steward | July 22, 1941 |
| 2,301,424 | List et al. | Nov. 10, 1942 |
| 2,302,119 | Hagedorn | Nov. 17, 1942 |
| 2,359,142 | Murcek | Sept. 26, 1944 |
| 2,363,753 | Smith et al. | Nov. 28, 1944 |
| 2,806,142 | Large | Sept. 10, 1957 |
| 2,813,199 | Sciaku et al. | Nov. 12, 1957 |
| 2,859,339 | Brady | Nov. 4, 1958 |
| 2,968,760 | Cater | Jan. 17, 1961 |